US012580693B2

(12) United States Patent
Khoshkholgh Dashtaki et al.

(10) Patent No.: US 12,580,693 B2
(45) Date of Patent: Mar. 17, 2026

(54) HYBRID AUTOMATIC REPEAT REQUEST ACKNOWLEDGMENT SCHEDULING

(71) Applicant: Ofinno, LLC, Reston, VA (US)

(72) Inventors: Mohammad Ghadir Khoshkholgh Dashtaki, Reston, VA (US); Ali Cagatay Cirik, Chantilly, VA (US); Esmael Hejazi Dinan, McLean, VA (US); Hyoungsuk Jeon, Centreville, VA (US); Hua Zhou, Vienna, VA (US); Gautham Prasad, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/918,372

(22) Filed: Oct. 17, 2024

(65) Prior Publication Data

US 2025/0038897 A1 Jan. 30, 2025

Related U.S. Application Data

(63) Continuation of application No. PCT/US2023/019347, filed on Apr. 21, 2023.

(60) Provisional application No. 63/333,672, filed on Apr. 22, 2022.

(51) Int. Cl.
| | |
|---|---|
| *H04L 1/18* | (2023.01) |
| *H04L 1/1812* | (2023.01) |
| *H04L 1/1829* | (2023.01) |

(52) U.S. Cl.
CPC .......... *H04L 1/1864* (2013.01); *H04L 1/1812* (2013.01)

(58) Field of Classification Search
CPC .... H04L 5/0053; H04L 5/0055; H04L 5/0057
See application file for complete search history.

(56) References Cited

U.S. PATENT DOCUMENTS

| | | |
|---|---|---|
| 2021/0105824 A1 | 4/2021 | Lei et al. |
| 2021/0314892 A1 | 10/2021 | Rico Alvarino et al. |
| 2021/0321299 A1 | 10/2021 | Rico Alvarino et al. |
| 2022/0124732 A1* | 4/2022 | Park ..................... H04W 72/20 |

(Continued)

OTHER PUBLICATIONS

3GPP TS 38.211 V17.1.0 (Mar. 2022); Technical Specification; 3rd Generation Partnership Project; Technical Specification Group Radio Access Network; NR; Physical channels and modulation; (Release 17).

(Continued)

*Primary Examiner* — Bo Hui A Zhu
(74) *Attorney, Agent, or Firm* — Matthew Fernandez; Kavon Nasabzadeh; Jacob L. Mangan

(57) ABSTRACT

A wireless device receives one or more configuration parameters indicating a hybrid automatic repeat request (HARQ) feedback of a HARQ process is disabled. The wireless device receives a physical downlink shared channel (PDSCH) carrying a transport block (TB) corresponding to the HARQ process. Based on the HARQ feedback of the HARQ process being disabled, the wireless device determines a PDSCH processing time for the PDSCH. The wireless device transmits, via a physical uplink control channel (PUCCH), a HARQ acknowledgement of the TB, wherein a starting symbol of the PUCCH carrying the HARQ acknowledgment starts no earlier than the PDSCH processing time from a last symbol of the PDSCH.

20 Claims, 27 Drawing Sheets

(56) References Cited

U.S. PATENT DOCUMENTS

2024/0314779 A1\* 9/2024 Park ................. H04W 72/1273

OTHER PUBLICATIONS

3GPP TS 38.212 V17.1.0 (Mar. 2022); Technical Specification; 3rd Generation Partnership Project; Technical Specification Group Radio Access Network; NR; Multiplexing and channel coding; (Release 17).

3GPP TS 38.213 V17.1.0 (Mar. 2022); Technical Specification; 3rd Generation Partnership Project; Technical Specification Group Radio Access Network; NR; Physical layer procedures for control (Release 17).

3GPP TS 38.214 V17.1.0 (Mar. 2022); Technical Specification; 3rd Generation Partnership Project; Technical Specification Group Radio Access Network; NR; Physical layer procedures for data; (Release 17).

3GPP TS 38.300 V16.7.0 (Sep. 2021); Technical Specification; 3rd Generation Partnership Project; Technical Specification Group Radio Access Network; NR; NR and NG-RAN Overall Description; Stage 2; (Release 16).

3GPP TS 38.306 V16.7.0 (Dec. 2021); Technical Specification; 3rd Generation Partnership Project; Technical Specification Group Radio Access Network; NR; User Equipment (UE) radio access capabilities; (Release 16).

3GPP TS 38.321 V17.0.0 (Mar. 2022); Technical Specification; 3rd Generation Partnership Project; Technical Specification Group Radio Access Network; NR; Medium Access Control (MAC) protocol specification; (Release 17).

3GPP TS 38.331 V17.0.0 (Mar. 2022); Technical Specification; 3rd Generation Partnership Project; Technical Specification Group Radio Access Network; NR; Radio Resource Control (RRC) protocol specification; (Release 17).

R1-1800036; 3GPP TSG RAN WG1 Meeting Ad Hoc; Vancouver, Canada, Jan. 22-26, 2018; Agenda Item: 7.3.3.2; Source: Huawei, HiSilicon; Title: Summary of remaining issues on HARQ management; Document for: Discussion and decision.

R1-1800676; 3GPP TSG RAN WG1 Meeting AH 1801; Vancouver, Canada, Jan. 22-26, 2018; Source: NTT Docomo, Inc.; Title: DL/UL scheduling and HARQ management; Agenda Item: 7.3.3.2; Document for: Discussion and Decision.

R1-1800876; 3GPP TSG-RAN WG1 Meeting AH 1801; Jan. 22-26, 2018; Vancouver, Canada; Agenda item: 7.3.3.2; Source: Qualcomm Incorporated; Title: DL/UL Scheduling, Processing Time and HARQ management; Document for: Discussion/Decision.

R1-1802415; 3GPP TSG RAN WG1 Meeting #92; Athens, Greece, Feb. 26-Mar. 2, 2018; Source: Intel Corporation; Title: Remaining details on UE processing times and HARQ operation; Agenda item: 7.1.3.3.2; Document for: Discussion and Decision.

R1-1802697; 3GPP TSG RAN WG1 Meeting #92; Athens, Greece, Feb. 26-Mar. 2, 2018; Agenda Item: 7.1.3.3.2; Source: Huawei, HiSilicon; Title: Remaining issues on HARQ management; Document for: Discussion and decision.

R1-1802842; 3GPP TSG-RAN WG1 Meeting #92; Feb. 26-Mar. 2, 2018; Athens, Greece; Agenda item: 7.1.3.3.2; Source: Qualcomm Incorporated; Title: Remaining Issues on DL/UL Scheduling, Processing Time and HARQ management; Document for: Discussion/Decision.

R1-1807364; 3GPP TSG-RAN WG1 Meeting #93; May 21-25, 2018; Busan, Korea; Agenda item: 7.1.3.3.2; Source: Qualcomm Incorporated; Title: Remaining Issues on DL/UL Scheduling, Processing Time and HARQ management; Document for: Discussion/Decision.

R1-1807752; 3GPP TSG-RAN WG1 Meeting #93; May 21-25, 2018; Busan, Korea; Agenda item: 7.1.3.3.2; Source: Qualcomm Incorporated; Title: Summary of Maintenance for DL/UL Scheduling; Document for: Discussion/Decision.

R1-1810756; 3GPP TSG RAN WG1 Meeting #94bis; Chengdu, China, Oct. 8-12, 2018; Source: Intel Corporation ; Title: Remaining issues on NR scheduling & HARQ; Agenda item: 7.1.3.3; Document for: Discussion and Decision.

R1-1811891; 3GPP TSG-RAN WG1 Meeting #94bis; Oct. 8-12, 2018; Chengdu, China; Agenda item: 7.1.3.3; Source: Qualcomm Incorporated; Title: Summary for Rel-15 DL/UL data scheduling and HARQ procedure; Document for: Discussion/Decision.

R1-2009695; 3GPP TSG RAN WG1 #103e-E; e-Meeting, Oct. 26-Nov. 13, 2020; Source: Moderator (ZTE); Title: Summary#3 of AI 8.4.3 for HARQ for NTN; Agenda Item: 8.4.3; Document for: Discussion and Decision.

R1-2100158; 3GPP TSG RAN WG1 #104-e; e-Meeting, Jan. 25-Feb. 5, 2021; Source: OPPO; Title: Discussion on HARQ enhancement; Agenda Item: 8.4.3; Document for: Discussion and Decision.

R1-2100443; 3GPP TSG RAN WG1 #104-e; e-Meeting, Jan. 25-Feb. 5, 2021; Source: vivo; Title: Discussion on HARQ enhancements for NR-NTN; Agenda Item: 8.4.3; Document for: Discussion and Decision.

R1-2100928; 3GPP TSG-RAN WG1 Meeting #104-e; e-Meeting, Jan. 25-Feb. 5, 2021; Agenda Item: 8.4.3; Source: Ericsson; Title: On HARQ enhancements for NTN; Document for: Discussion.

R1-2101466; 3GPP TSG RAN WG1 #104-e; e-Meeting, Jan. 25-Feb. 5, 2021; Agenda item: 8.4.3; Source: Qualcomm Incorporated; Title: Enhancements on HARQ for NTN; Document for: Discussion/ Decision.

R1-2101903; 3GPP TSG RAN WG1 #104e; e-Meeting, Jan. 25-Feb. 5, 2021; Source: Moderator (ZTE); Title: Summary of AI 8.4.3 for HARQ for NTN; Agenda Item: 8.4.3; Document for: Discussion and Decision.

R1-2201273; 3GPP TSG RAN WG1 #108-e; e-Meeting, Feb. 21-Mar. 3, 2022; Source: OPPO; Title: Discussion on remaining issue for HARQ enhancements; Agenda Item: 8.4.3; Document for: Discussion and Decision.

R1-2202622; 3GPP TSG RAN WG1 #108-e; e-Meeting, Feb. 21-Mar. 3, 2022; Source: Moderator (ZTE); Title: Summary#1 of AI 8.4.3 for HARQ in NTN; Agenda Item: 8.4.3; Document for: Discussion and Decision.

R2-2201007; 3GPP TSG-RAN WG2 Meeting #116bis Electronic; Elbonia, Jan. 17-25, 2022; Agenda item: 8.10.2.1; Source: Nokia, Nokia Shanghai Bell; Title: Discussion on RACH open issues and TA reporting aspects; WID/SID: NR_NTN_solutions-Core— Release 17; Document for: Discussion and Decision.

R2-2203532; 3GPP RAN WG2 Meeting #117-e; eMeeting Feb. 21-Mar. 3, 2022; Agenda Item: 8.10.2.1.1; Source: InterDigital; Title: Report of [AT117-e][103][NTN] MAC open issues; Document for: Discussion, Decision.

R2-2203567; 3GPP Ran WG2 Meeting #117-e; eMeeting Feb. 21-Mar. 3, 2022; Agenda Item: 8.10.2.1.1; Source: InterDigital; Title: Report of [AT117-e][103][NTN] MAC open issues: Third Round; Document for: Discussion, Decision.

R2-2203512; 3GPP TSG-RAN WG2 Meeting #117 electronic; Online, Feb. 21-Mar. 3, 2022; Agenda item: 10.2; Source: Vice Chairman (ZTE Corporation); Title: Report from Break-out session on R17 NTN, REDCAP and CE; Document for: Approval.

Lin et al.; 5G from Space: An Overview of 3GPP Non-Terrestrial Networks; IEEE Communications Standards Magazine; Dec. 2021; pp. 147-153.

International Search Report and Written Opinion of the International Searching authority mailed Oct. 6, 2023, in International Application No. PCT/US2023/019347.

R2-2103230; 3GPP TSG-RAN WG2 Meeting #113bis Electronic; Elbonia, Apr. 12-20, 2021; Agenda item: 8.10.2.2; Source: Nokia, Nokia Shanghai Bell; Title: On DRX and LCP impact for NTN; WID/SID: NR NTN solutions-Core—Release 17; Document for: Discussion and Decision.

R2-2107563; 3GPP TSG-RAN WG2 Meeting #115-e; E-Meeting: Aug. 9-27, 2021; resubmission R2-2105431; Agenda item: 8.10.2.2; Source: Qualcomm Incorporated, Huawei, HiSilicon, Xiaomi, Samsung; Title: LCP restriction for an UL HARQ process; Document for: Discussion and Decision.

\* cited by examiner

FIG. 5B

Uplink

FIG. 5A

Downlink

Logical Channels

Transport Channels

Physical Channels

Physical Signals

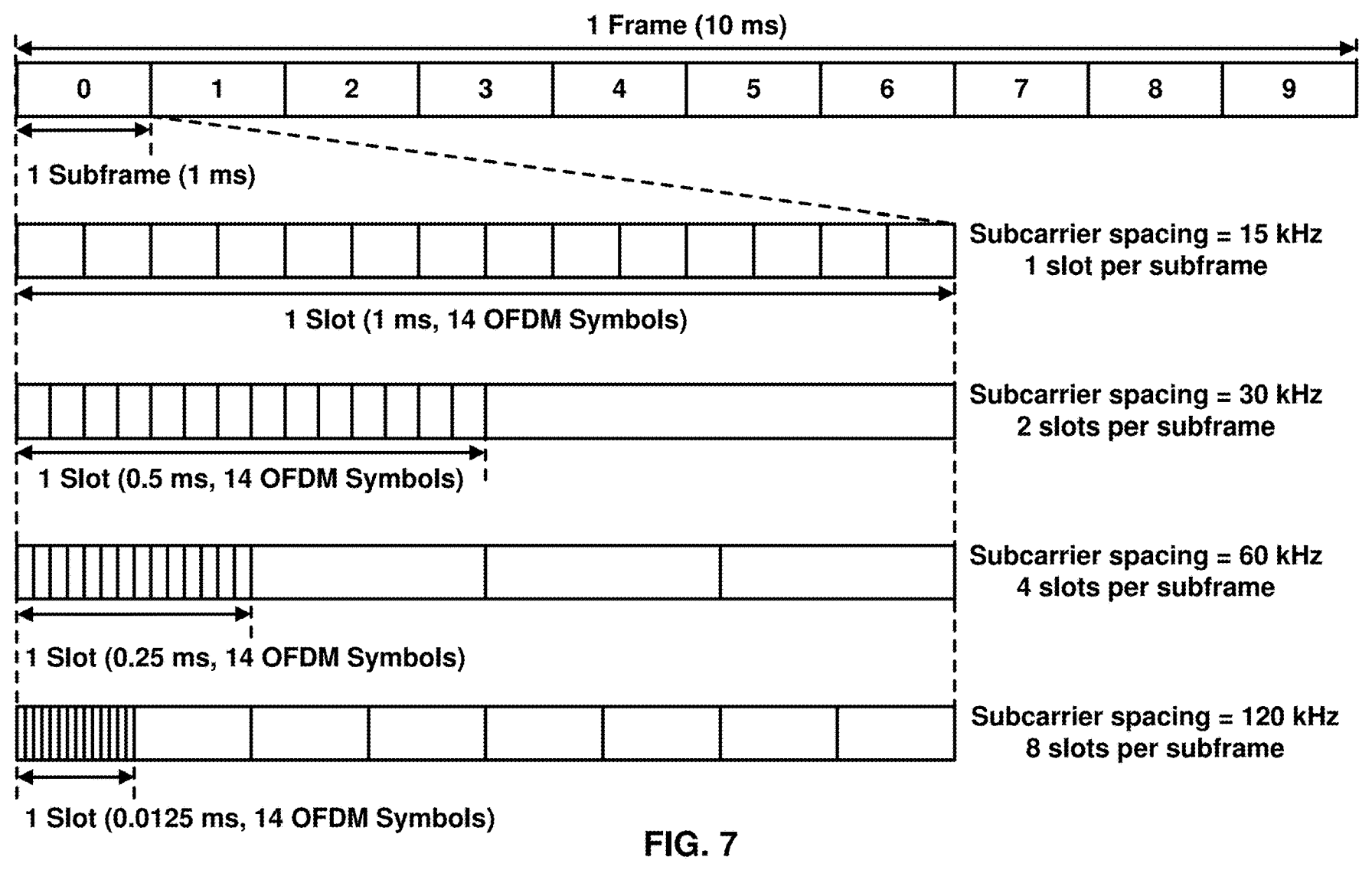

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

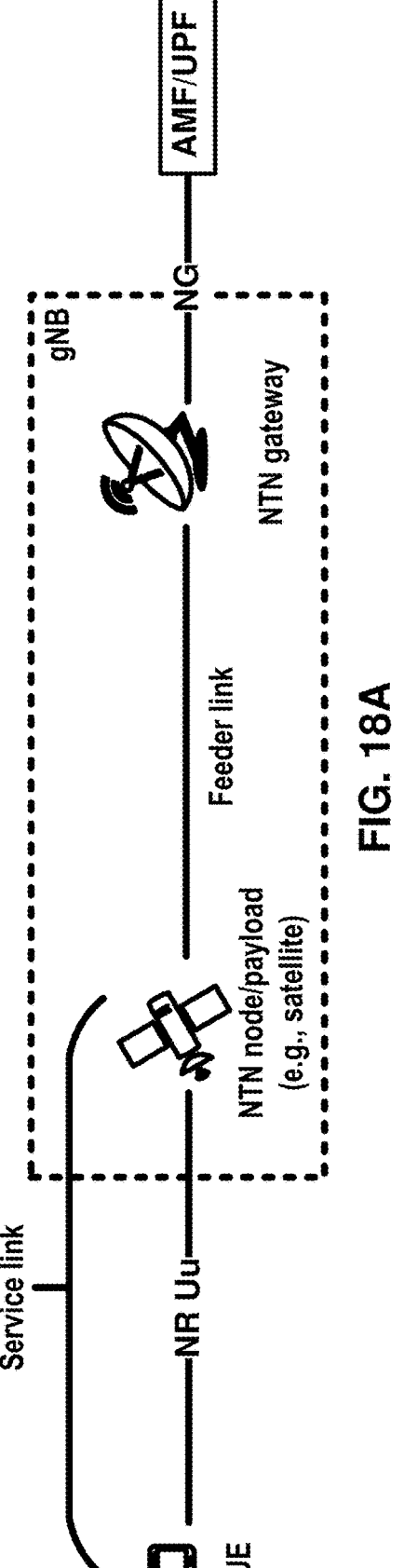

FIG. 18A

Types of NTN platforms/nodes/payloads

| NTN Platforms | Altitude range | Orbit | Typical beam footprint size |
|---|---|---|---|
| LEO satellite | 300 – 1500 km | Circular around the earth | 100 – 1000 km |
| MEO satellite | 7000 – 25000 km | | 100 – 1000 km |
| GEO satellite | 35,786 km | Notional station keeping position fixed in terms of elevation/azimuth with respect to a given earth point | 200 – 3500 km |
| UAS platform | 8-50 km (20km for HAPS) | | 5 – 200 km |
| HEO platform | 400 – 50000km | Elliptical around the earth | 200 – 3500 km |

FIG. 18B

| Class of Orbit | Elevation angle (degrees) | | |
|---|---|---|---|
| Altitude (km) | 0 | 10 | 90 |
| LEO satellite | Propagation delay – satellite to UE (ms) | | |
| 800 | 11.0 | 7.9 | 2.7 |
| 1400 | 14.8 | 11.6 | 4.7 |
| MEO satellite | Propagation delay – satellite to UE (ms) | | |
| 8000 | 43.0 | 39.4 | 26.7 |
| GEO satellite | Propagation delay – satellite to UE (ms) | | |
| 35,786 | 138.9 | 135.3 | 119.3 |

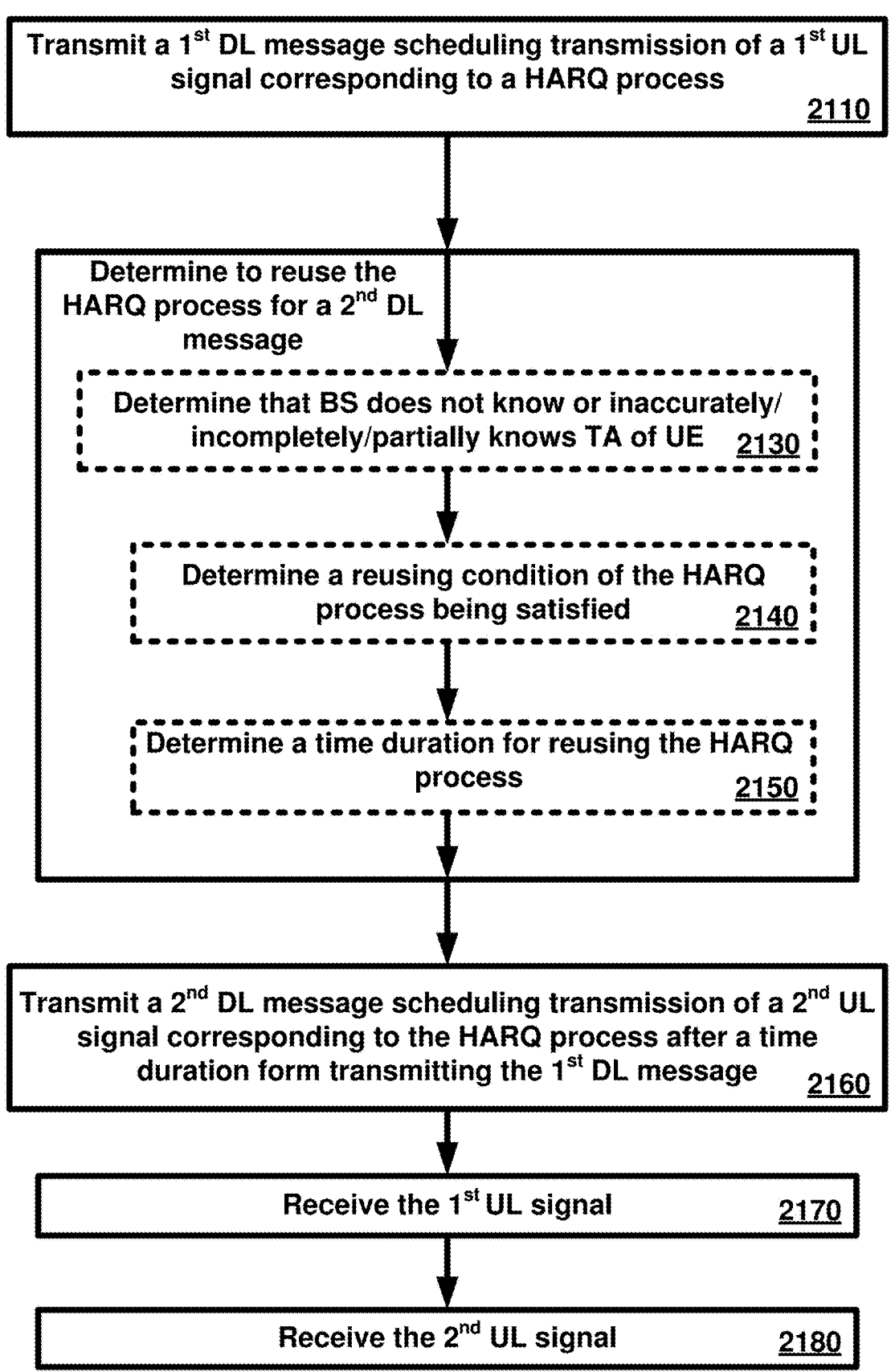

Transmit a 1$^{st}$ DL message scheduling transmission of a 1$^{st}$ UL signal corresponding to a HARQ process
2110

Determine to reuse the HARQ process for a 2$^{nd}$ DL message

Determine that BS does not know or inaccurately/ incompletely/partially knows TA of UE    2130

Determine a reusing condition of the HARQ process being satisfied    2140

Determine a time duration for reusing the HARQ process    2150

Transmit a 2$^{nd}$ DL message scheduling transmission of a 2$^{nd}$ UL signal corresponding to the HARQ process after a time duration form transmitting the 1$^{st}$ DL message    2160

Receive the 1$^{st}$ UL signal    2170

Receive the 2$^{nd}$ UL signal    2180

FIG. 21

HYBRID AUTOMATIC REPEAT REQUEST ACKNOWLEDGMENT SCHEDULING

CROSS-REFERENCE TO RELATED APPLICATIONS

This application is a continuation of International Application No. PCT/US2023/019347, filed Apr. 21, 2023, which claims the benefit of U.S. Provisional Application No. 63/333,672, filed Apr. 22, 2022, all of which are hereby incorporated by reference in their entireties.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

FIG. 17 shows several DCI formats.

FIG. 18A shows an example of a non-terrestrial network.

FIG. 18B is an example figure of different types of NTN platforms/nodes.

FIG. 21 shows a flowchart illustrating a method that supports reusing HARQ process per an aspect of the present disclosure.

DETAILED DESCRIPTION

Figures 1A, 1B:
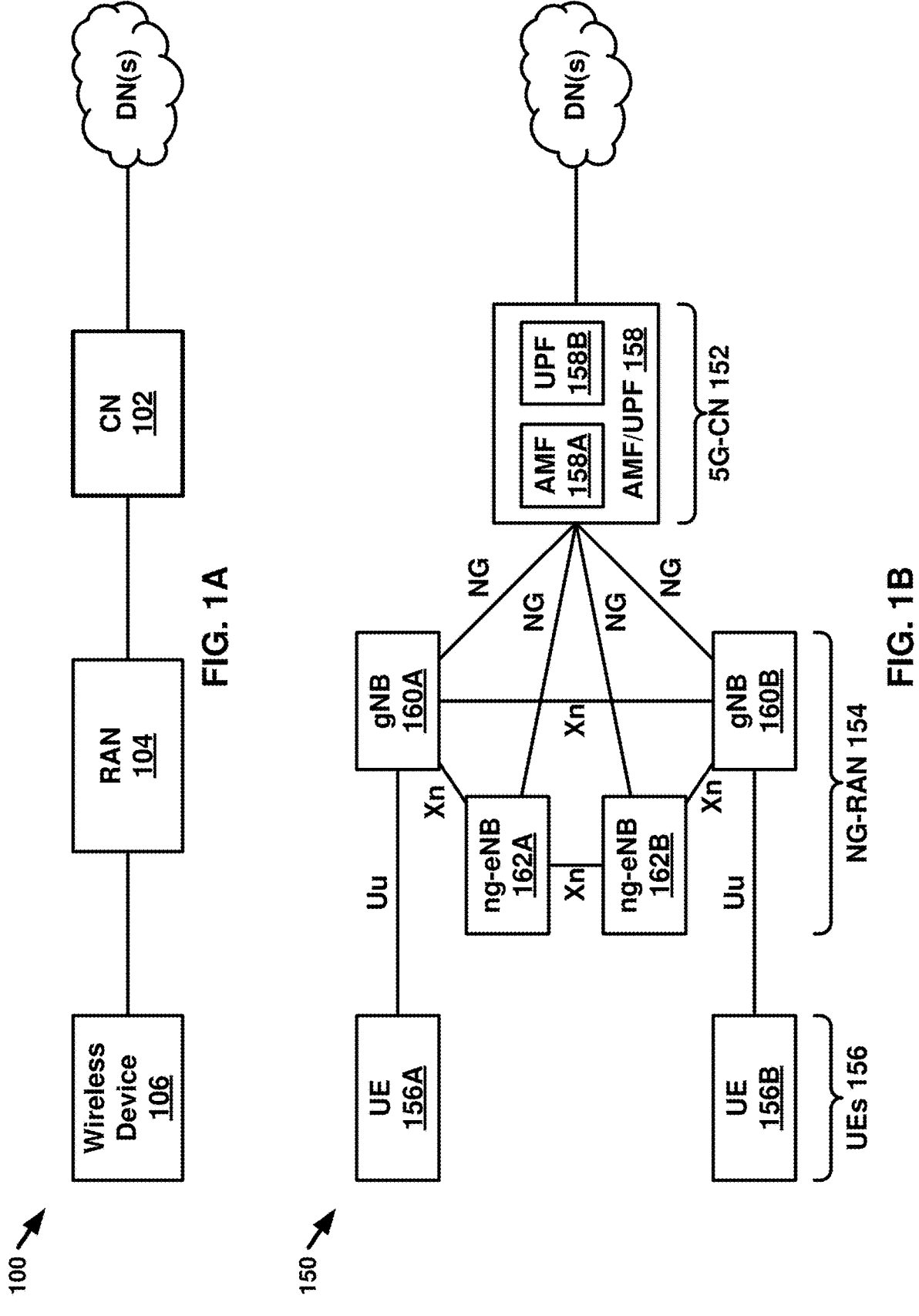
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability (ies) depending on wireless device category and/or capability (ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNS, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
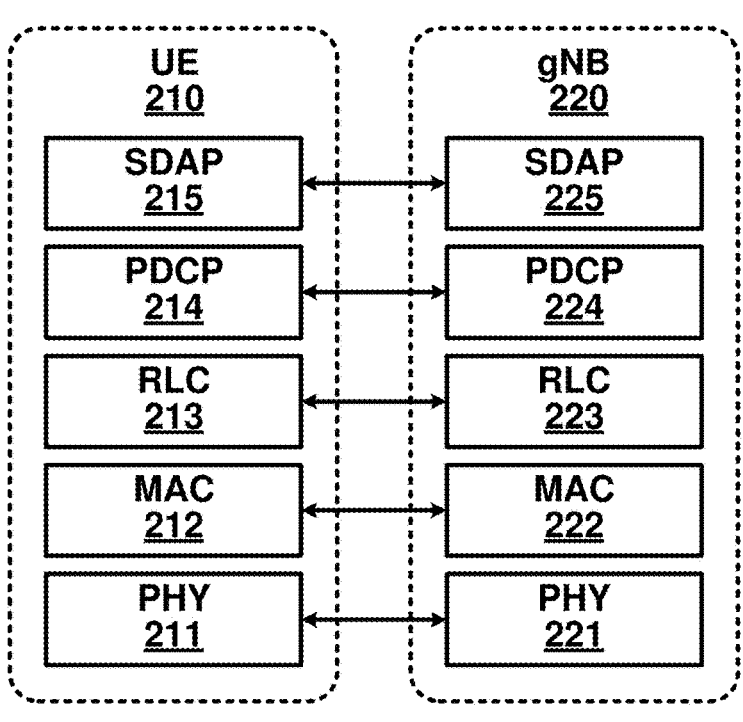
FIG. 2A and FIG. 2B respectively illustrate a New Radio (NR) user plane and control plane protocol stack.
Figure 2B:
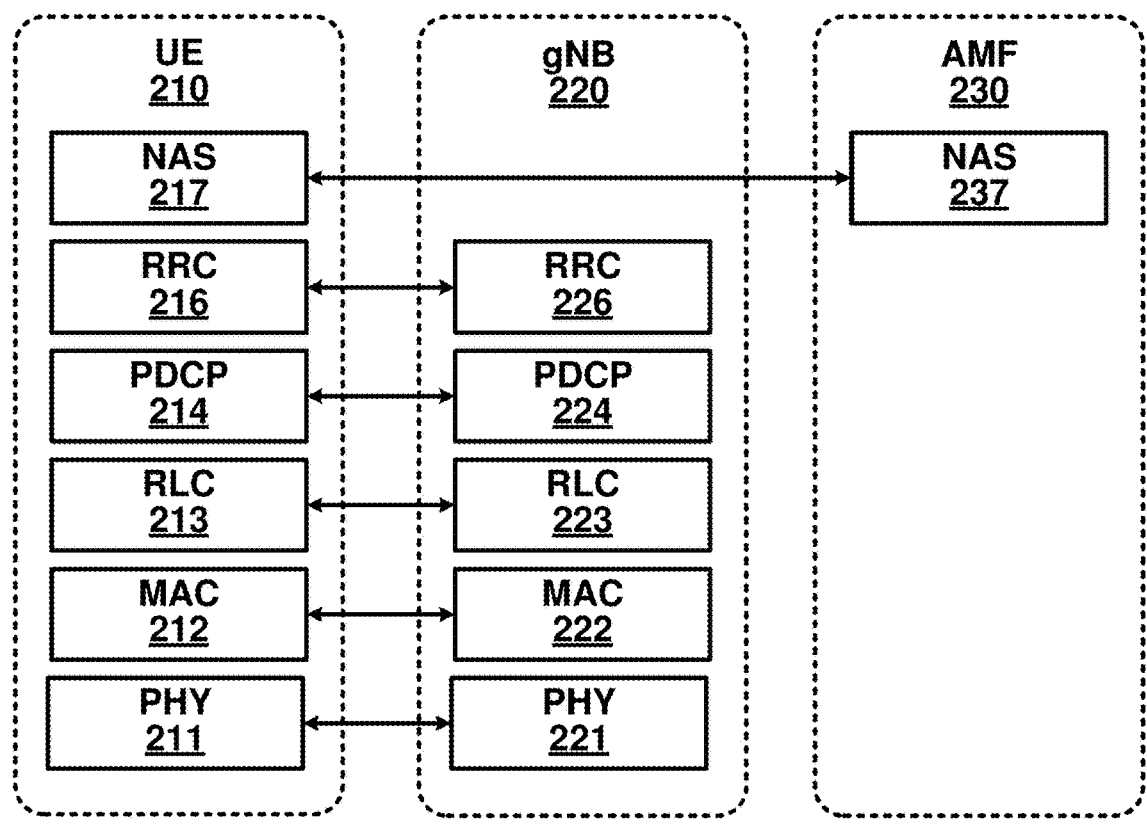

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
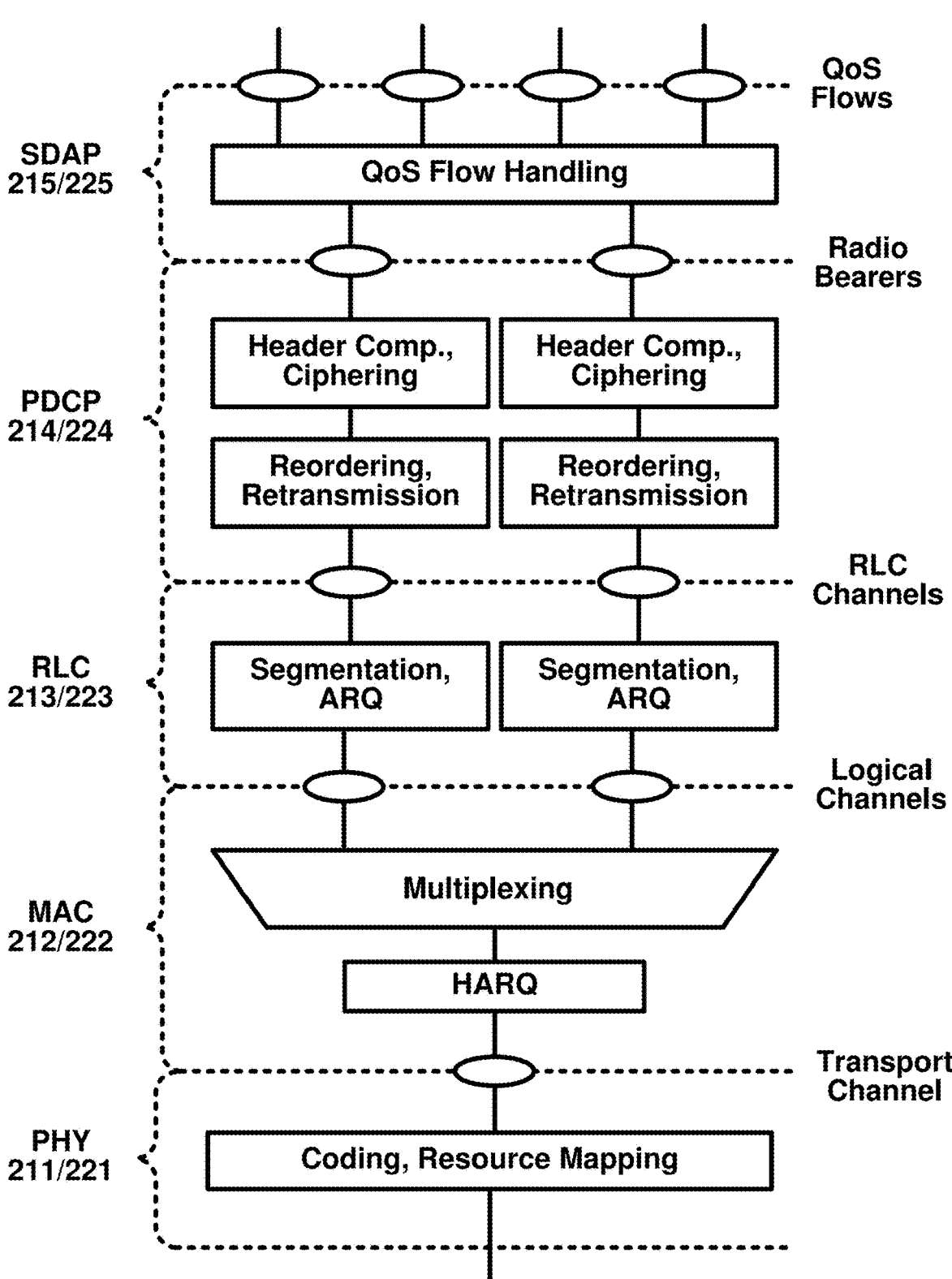
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
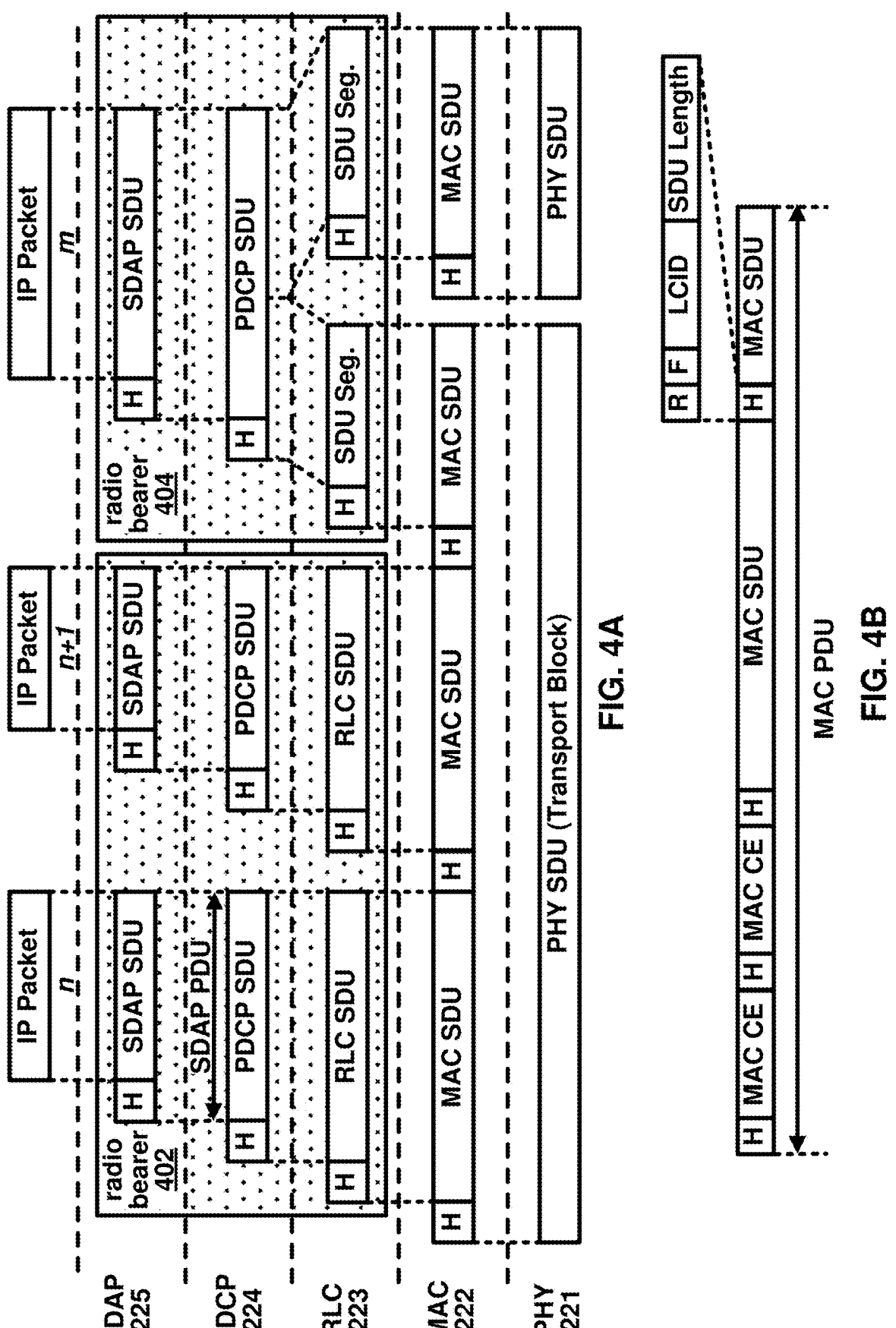
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC sub-header in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior config-ured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
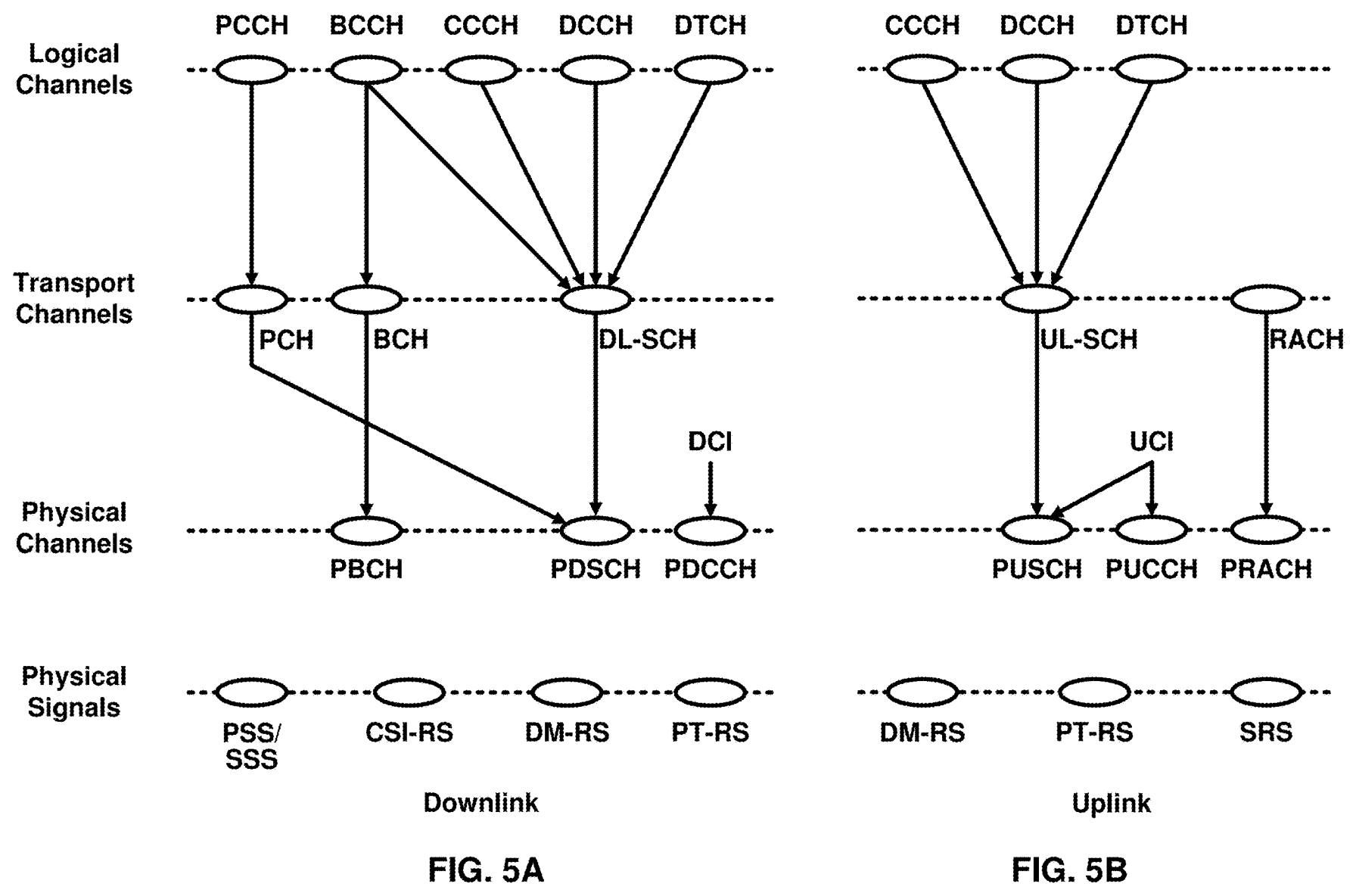

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration infor-mation in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master informa-tion block (MIB) and several system information blocks (SIBs), wherein the system information mes-sages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying down-link data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carry-ing downlink data and signaling messages from the DL-SCH, as well as paging messages from the PCH;

a physical downlink control channel (PDCCH) for carry-ing downlink control information (DCI), which may include downlink scheduling commands, uplink sched-uling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchro-nization signals (SSS), channel state information reference signals (CSI-RS), demodulation reference signals (DMRS), sounding reference signals (SRS), and phase-tracking ref-erence signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
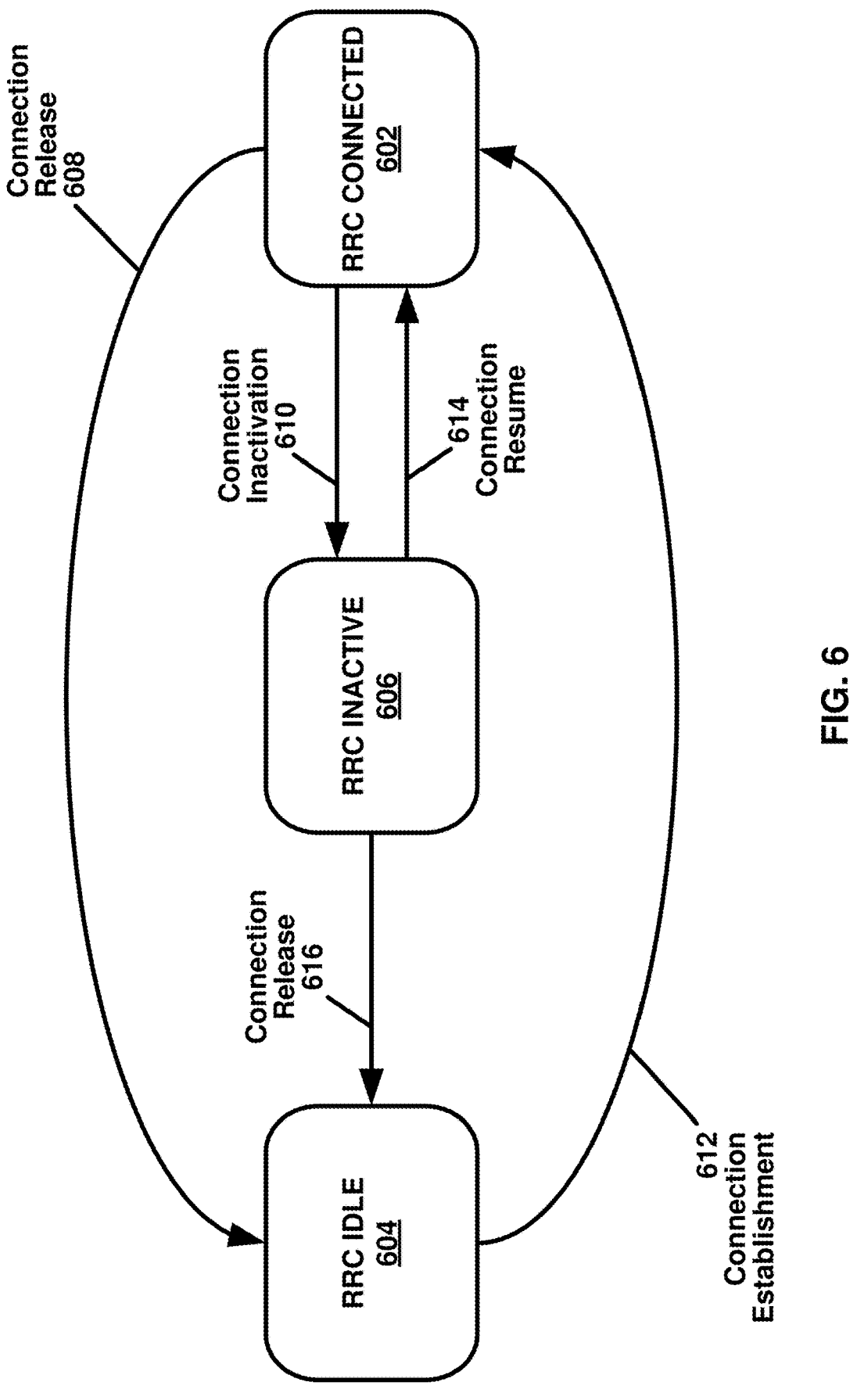
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_I-NACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 KHz/4.7 μs; 30 kHz/2.3 μs; 60 KHz/1.2 μs; 120 KHz/0.59 μs; and 240 KHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
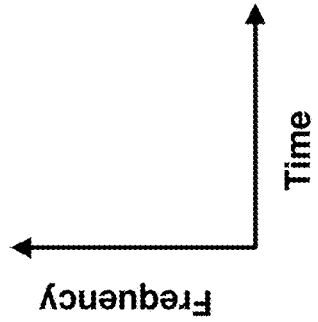
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
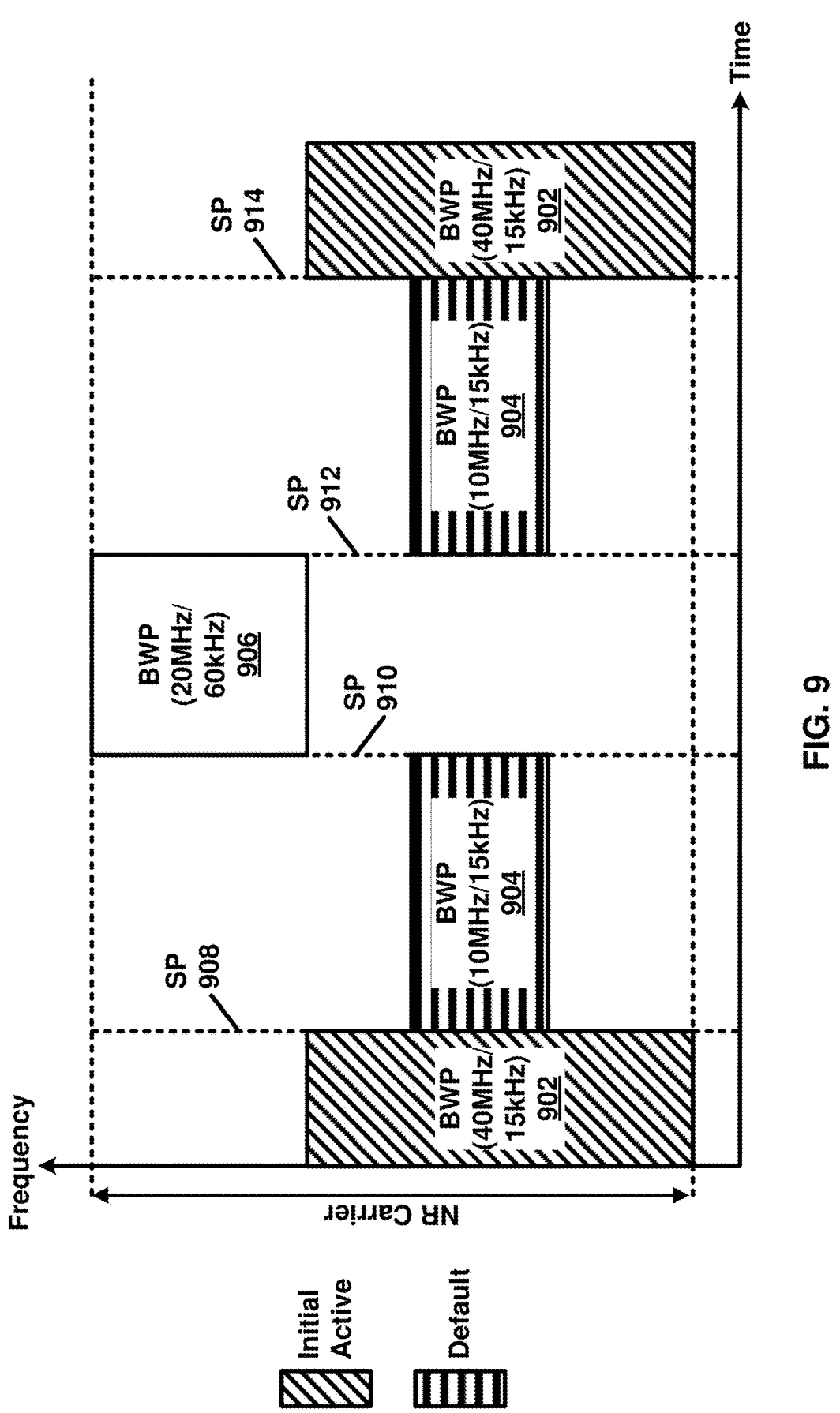
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
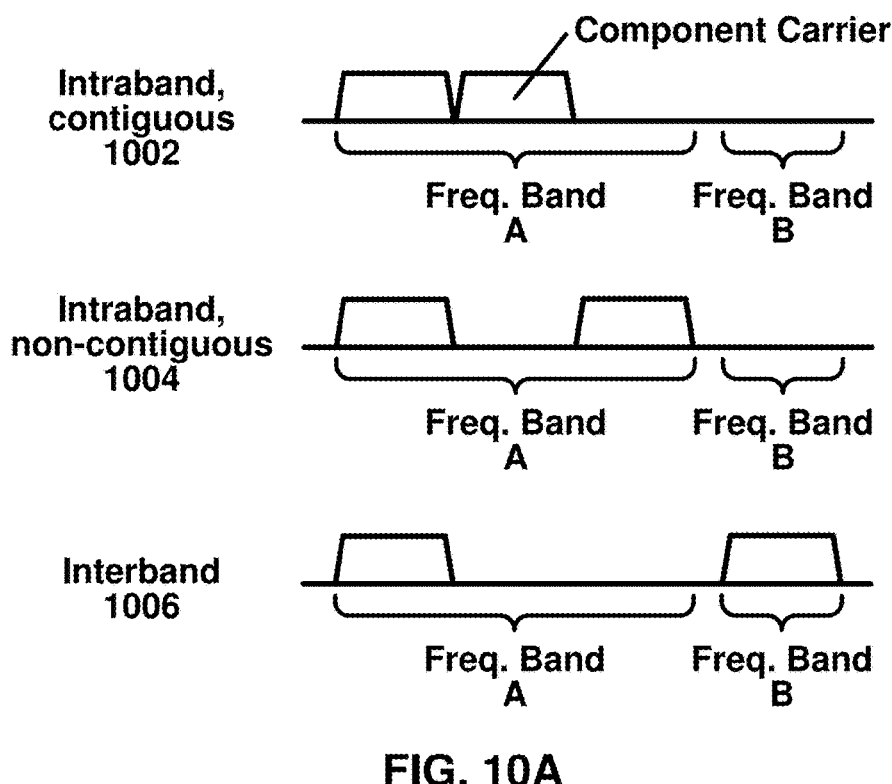
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
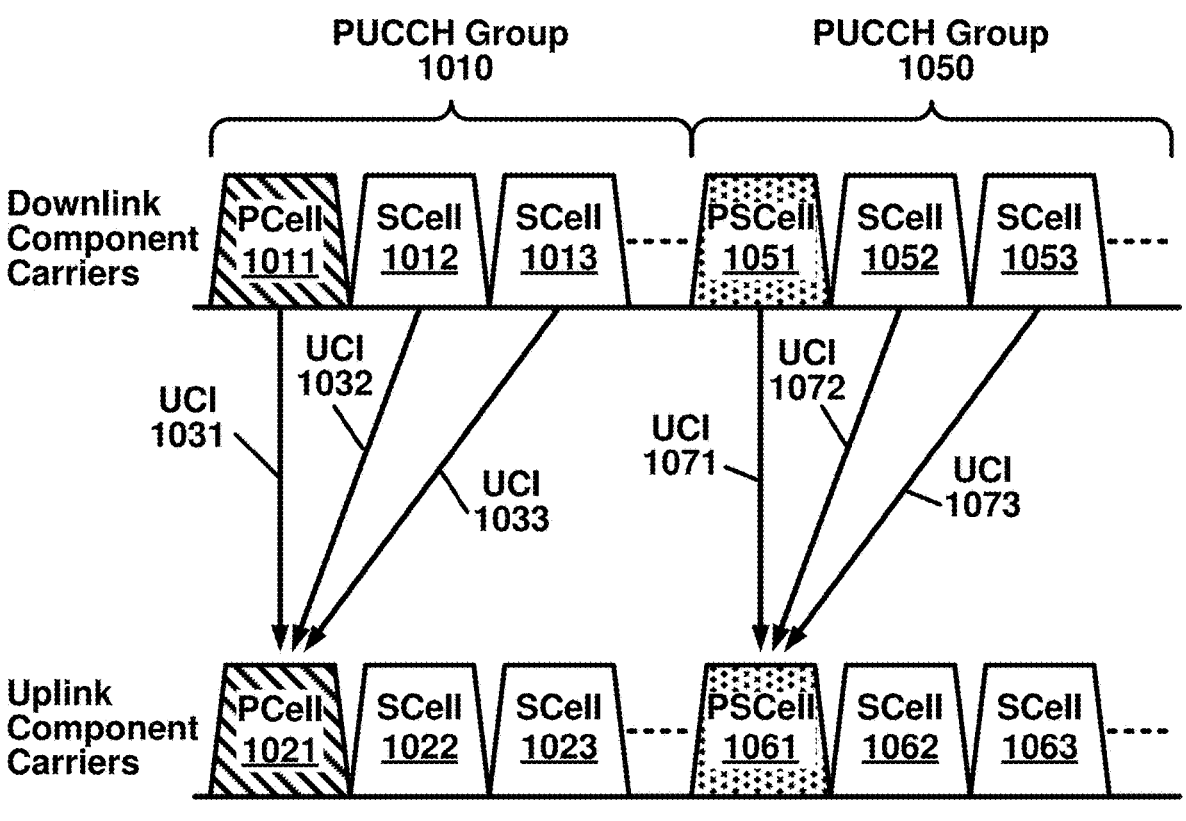
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
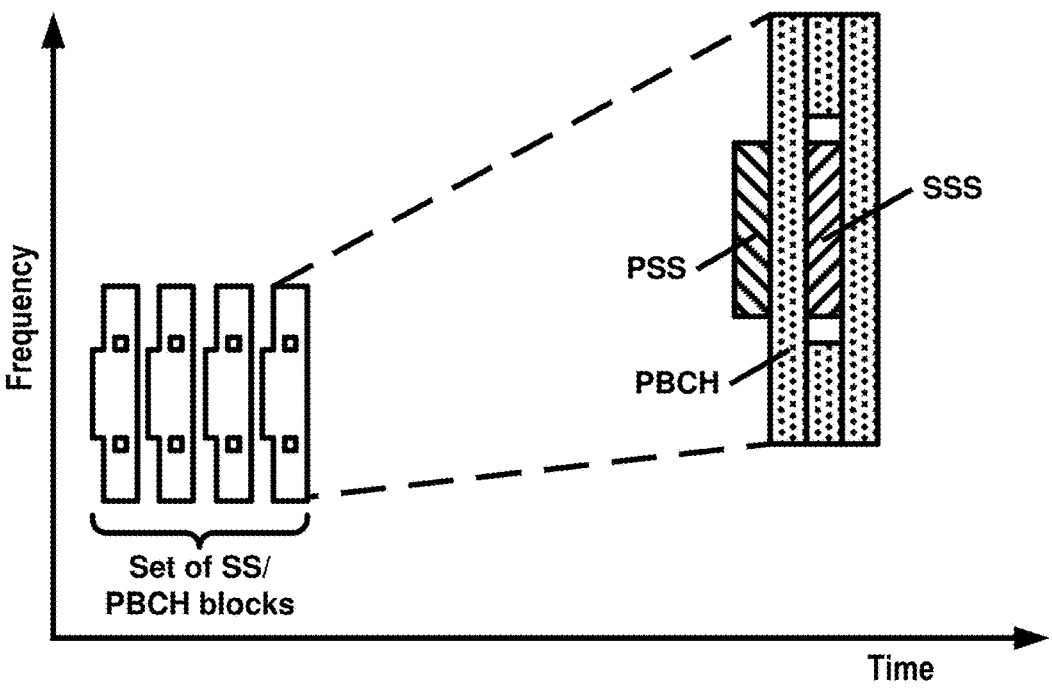
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
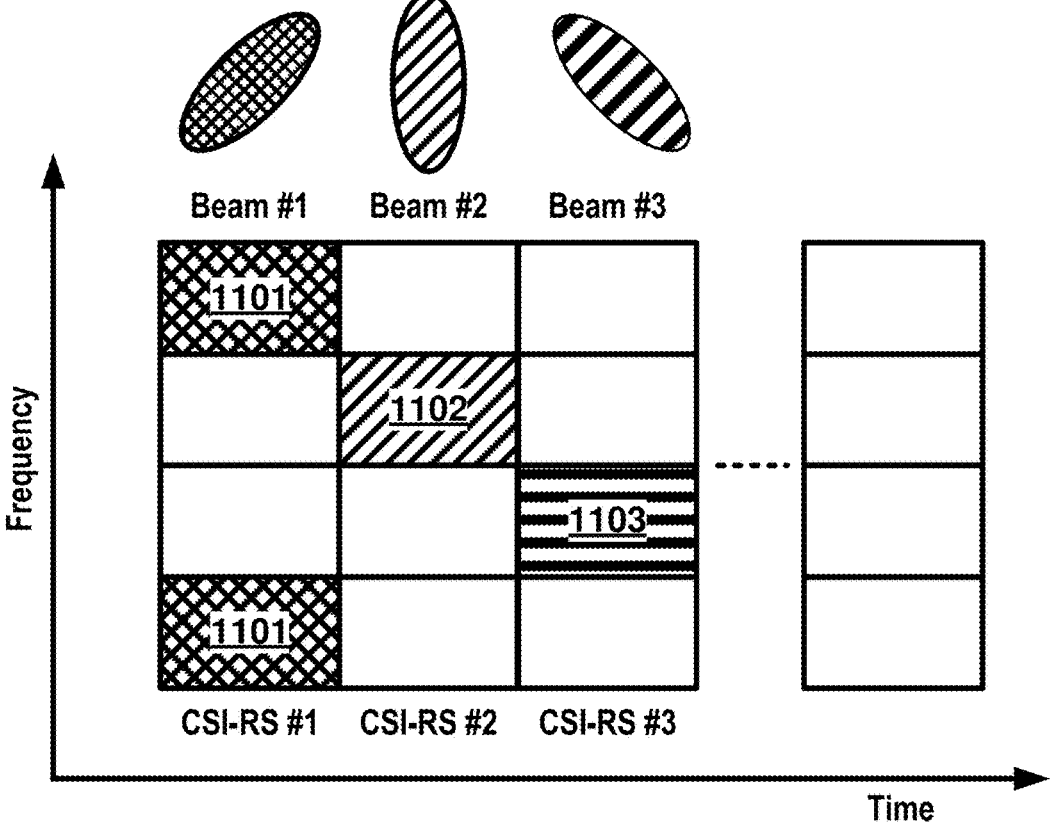
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
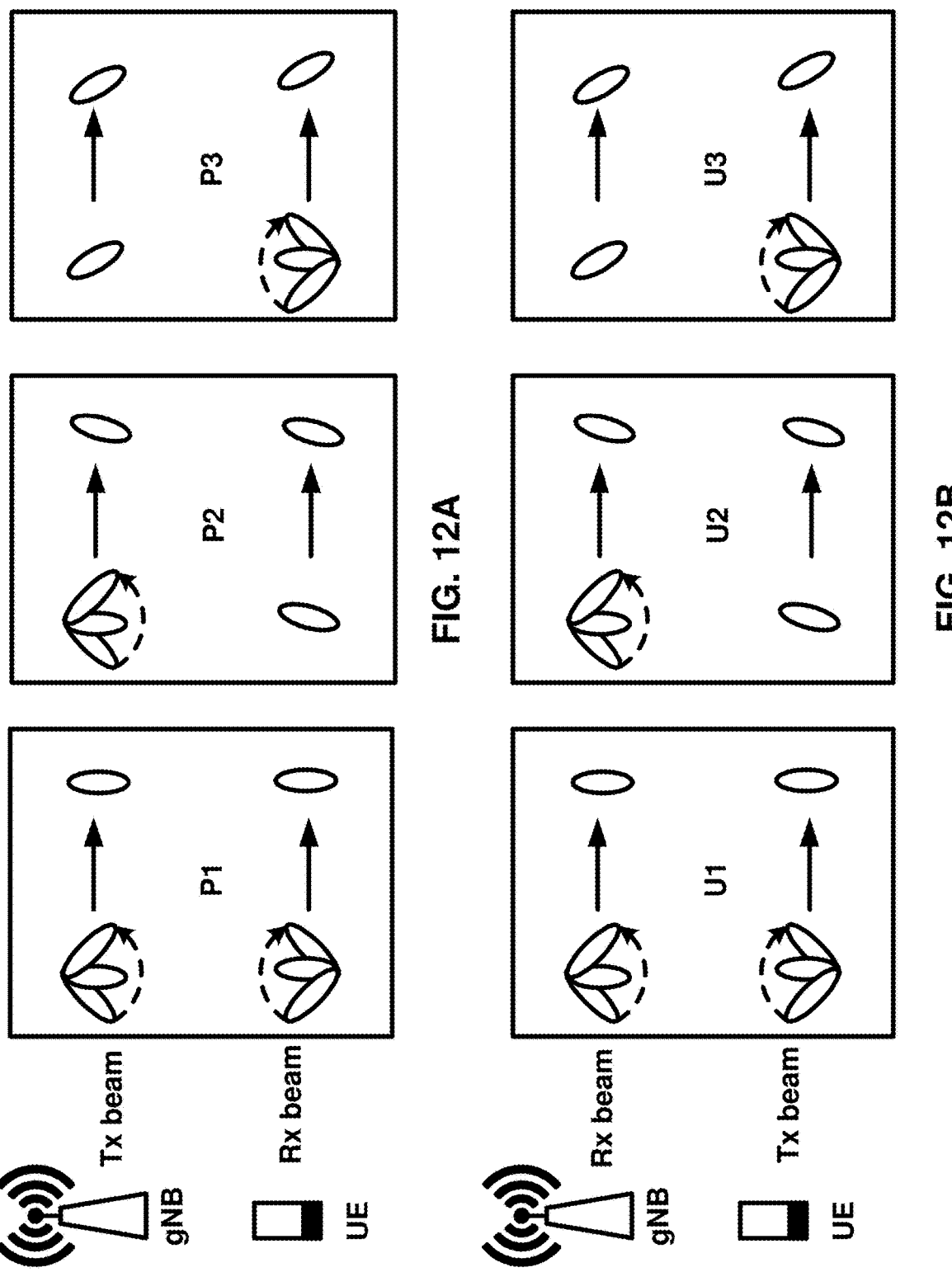
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
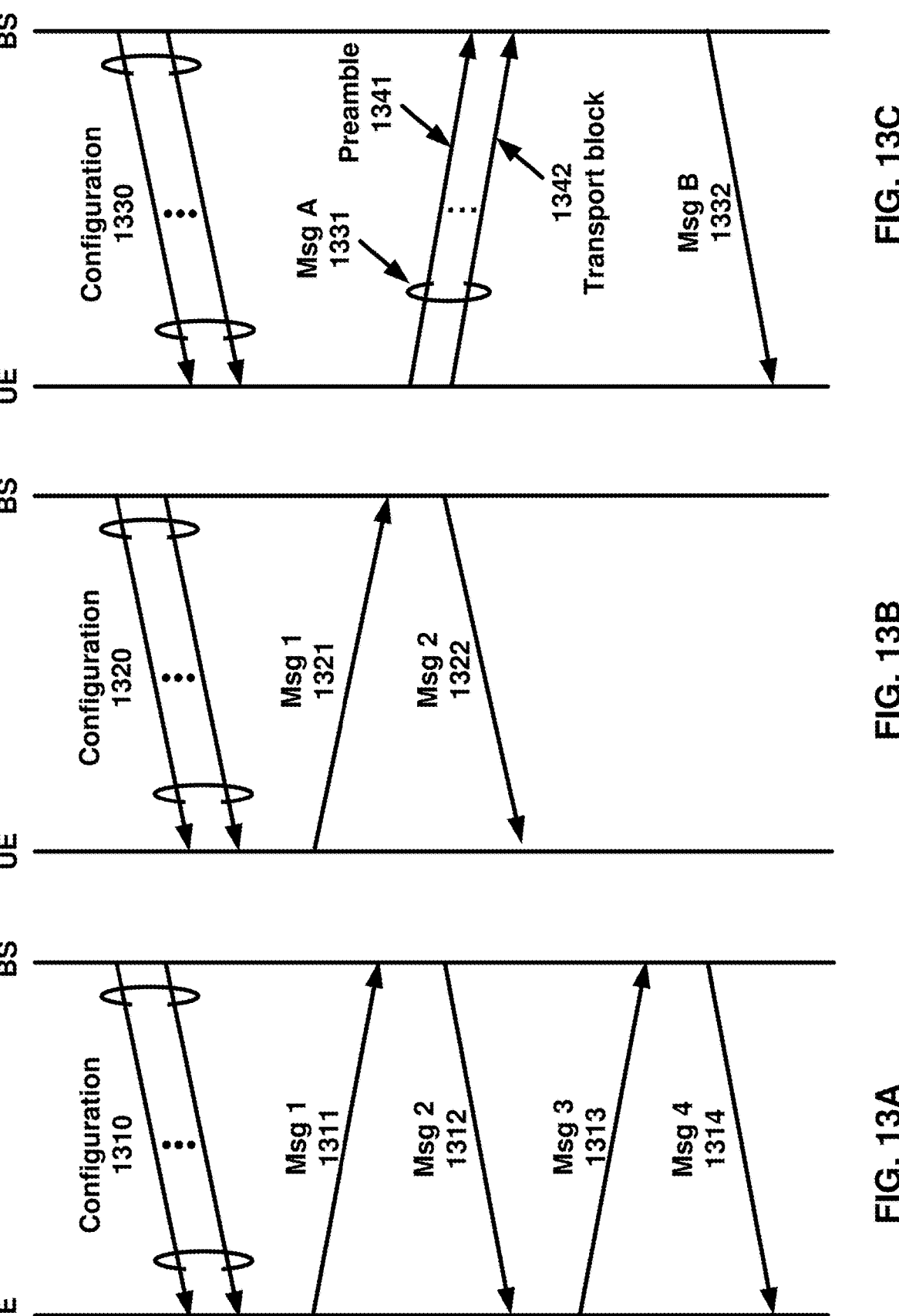
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER-_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE-_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows: $RA\text{-}RNTI = 1 + s\_id + 14 \times t\_id + 14 \times 80 \times f\_id + 14 \times 80 \times 8 \times ul\_carrier\_id$, where $s\_id$ may be an index of a first OFDM symbol of the PRACH occasion (e.g., $0 \le s\_id < 14$), $t\_id$ may be an index of a first slot of the PRACH occasion in a system frame (e.g., $0 \le t\_id < 80$), $f\_id$ may be an index of the PRACH occasion in the frequency domain (e.g., $0 \le f\_id < 8$), and $ul\_carrier\_id$ may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message

1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
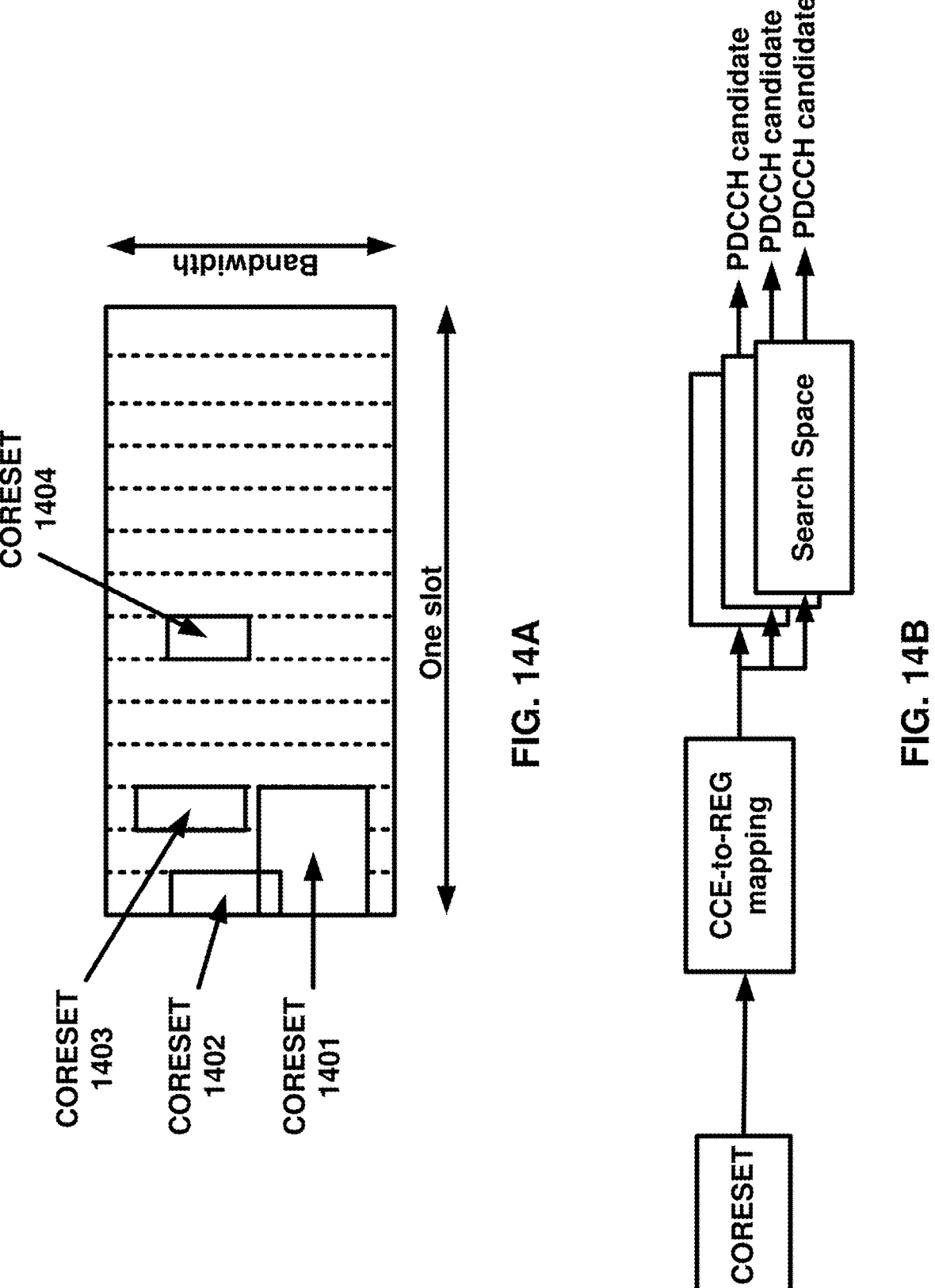
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
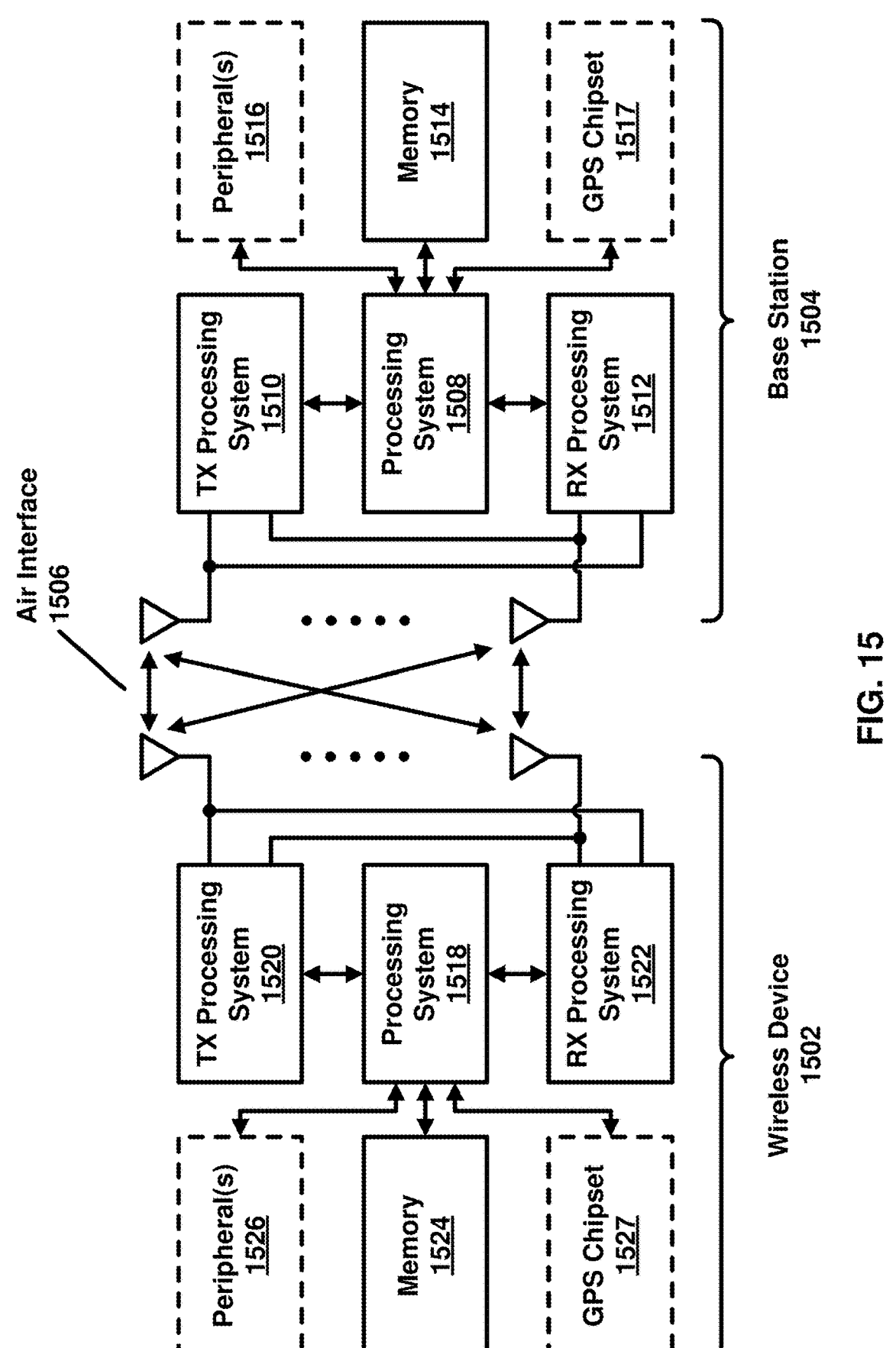
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
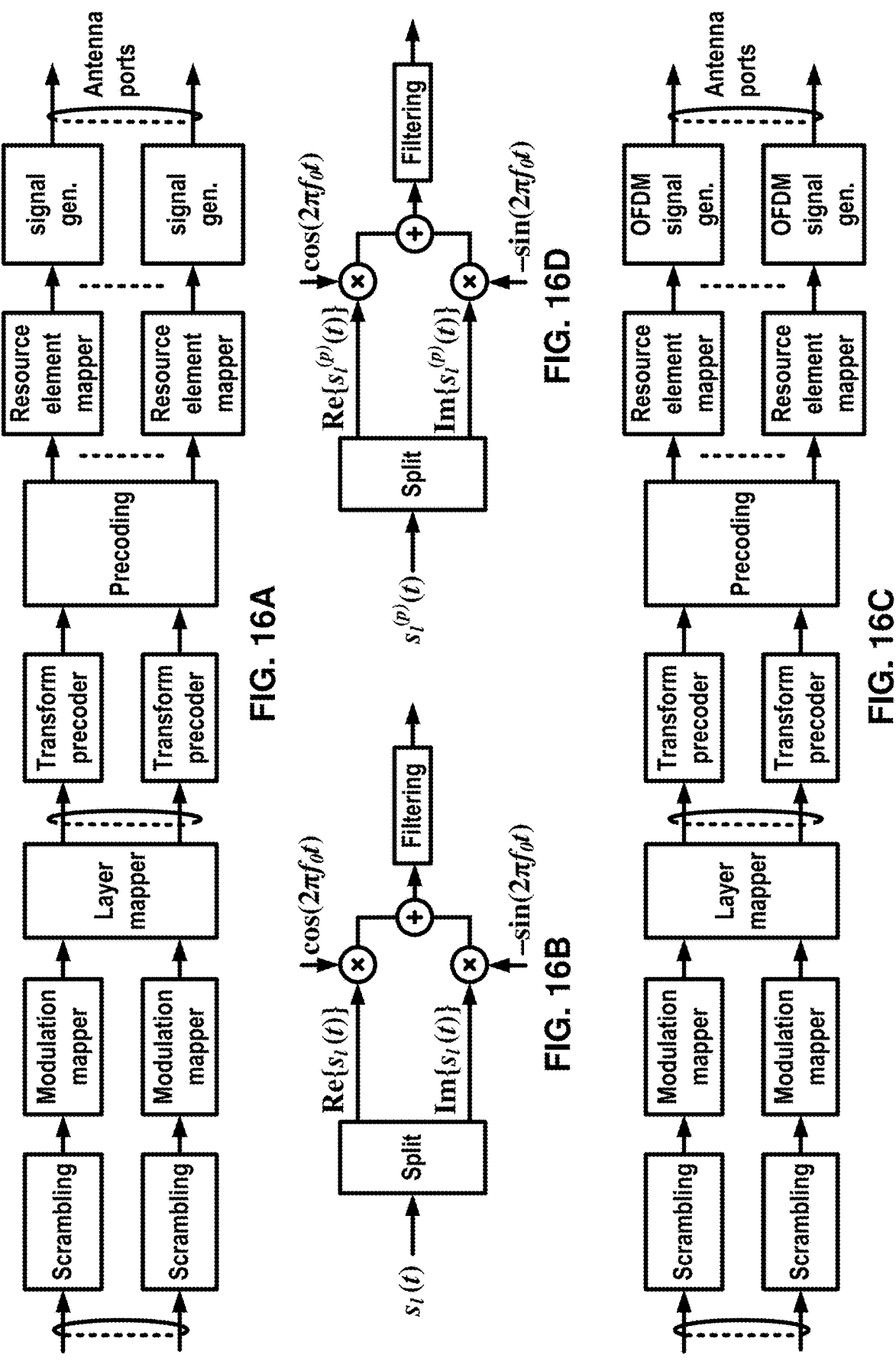
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g., RRC messages) comprising one or more configuration parameters. The one or more configuration parameters may comprise (or be) one or more RRC configuration parameters. In an example, the one or more configuration parameters may comprise configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format filed (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

In an example, a MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of the base station to a MAC entity of the wireless device, may have an LCID in the MAC subheader corresponding to the MAC CE. In an example, a first MAC CE may have a first LCID in the MAC subheader that may be different than the second LCID in the MAC subheader of a second MAC CE. For example, an LCID given by 111011 in a MAC subheader may indicate that the MAC CE associated with the MAC subheader is a Long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a Short truncated BSR, and/or a Long truncated BSR. In an example, a MAC CE may have an LCID in the MAC subheader corresponding to the MAC CE. In an example, a first MAC CE may have a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. In an example, the serving cell may be a PCell.

In an example, the base station may transmit, to the wireless device, one or more messages. The one or more messages may comprise one or more RRC messages. For example, the one or more RRC messages may comprise one or more configuration parameters (e.g., one or more RRC configuration parameters).

For example, the base station may configure (e.g., via the one or more RRC messages/configuration parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (i.e., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch the DL BWP and the UL BWP.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP in response to the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or one DL/UL pair) may improve the wireless device battery consumption. One or more BWPs other than the active UL BWP and the active DL BWP, which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any. In an example, on the inactive BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, a DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. In an example, the PDCCH may not carry the DCI.

In an example, a set of PDCCH candidates for the wireless device to monitor is defined in terms of one or more search space sets. A search space set may comprise a common search space (CSS) set, or a UE-specific search space (USS) set. The wireless device may monitor one or more PDCCH candidates in one or more of the following search space sets: a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by searchSpaceOtherSystemInformation in PDCCH-ConfigCommon for a DCI format with CRC scrambled by the SI-RNTI on the primary cell of the MCG, a Type1-PDCCH CSS set configured by ra-SearchSpace in PDCCH-ConfigCommon for a DCI format with CRC scrambled by a RA-RNTI, a MSGB-RNTI, or a TC-RNTI on the primary cell, a Type2-PDCCH CSS set configured by pagingSearchSpace in PDCCH-ConfigCommon for a DCI format with CRC scrambled by a P-RNTI on the primary cell of the MCG, a Type3-PDCCH CSS set configured by SearchSpace in PDCCH-Config with searchSpace Type=common for DCI formats with CRC scrambled by a INT-RNTI, a SFI-RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with search Space Type=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor the one or more PDCCH candidates according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured) PDCCH location(s), possible (or configured) PDCCH format(s), e.g., number of CCEs, number of PDCCH candidates in CSS set(s), and/or number of PDCCH candidates in the USS(s), and/or possible (or configured) DCI format(s).

In an example, the wireless device may receive the C-RNTI (e.g., via one or more previous transmissions) from the base station. For example, the one or more previous transmissions may comprise a Msg2 1312, Msg4 1314, or a MsgB 1332. If the wireless device is not provided the Type3-PDCCH CSS set or the USS set and if provided the Type1-PDCCH CSS set, the wireless device may monitor the one or more PDCCH candidates for DCI format 0_0 and DCI format 1_0 with CRC scrambled by the C-RNTI in the Type1-PDCCH CSS set.

For example, the one or more search space sets may correspond to one or more of searchSpaceZero, searchSpaceSIB1, searchSpaceOtherSystemInformation, paging SearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS-RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows several DCI formats. For example, the base station may use the DCI formats to transmit downlink control information to the wireless device. In an example, the wireless device may use the DCI formats for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH in one cell. In an example, DCI format 0_1 may be used to schedule one or multiple PUSCH in one cell or indicate CG-DFI (configured grant-Downlink Feedback Information) for configured grant PUSCH, etc.

In the uplink, two schemes for transmission without a dynamic grant may be supported. The two schemes may differ in the way they are activated: 1) type 1 of the configured grant (or configured grant Type 1), where an uplink grant is provided by the one or more configuration parameters (e.g., ConfiguredGrantConfig), including activation of the grant, 2) configured grant Type 2 (or type 2 of the configured grant), where the transmission periodicity is provided by the one or more configuration parameters (e.g., ConfiguredGrantConfig) and L1/L2 control signaling is used to activate/deactivate the transmission in a similar way as in the SPS. The two schemes may reduce control signaling overhead, and the latency before uplink data transmission, as no scheduling request-grant cycle is needed prior to data transmission. In an example of the configured grant Type 2, the one or more configuration parameters may indicate/configure the preconfigured periodicity and PDCCH activation may provide transmission parameters. Upon receiving the activation command, the wireless device may transmit according to the preconfigured periodicity, if, for example, there are data in the buffer. If there are no data to transmit, the wireless device may, similarly to the configured grant Type 1, not transmit anything. The wireless device may acknowledge the activation/deactivation of configured grant Type 2 by sending a MAC control element in the uplink. In both schemes, it is possible to configure multiple wireless devices with overlapping time-frequency resources in the uplink. In this case, the network may differentiate between transmissions from different wireless devices. In an example, PUSCH resource allocation may be semi-statically configured by the one or more configuration parameters (e.g., ConfiguredGrantConfig).

FIG. 18A shows an example of a non-terrestrial network. The non-terrestrial network (NTN) network (e.g., a satellite network) may be a network or network segment (e.g., an NG-RAN consisting of gNBs) for providing non-terrestrial NR access to wireless devices. The NTN may use a space-borne vehicle to embark a transmission equipment relay node (e.g., radio remote unit or a transparent payload) or a base station (or a regenerative payload). While a terrestrial network is a network located on the surface of the earth, an NTN may be a network which uses an NTN node (e.g., a satellite) as an access network, a backhaul interface network, or both. In an example, an NTN may comprise one or more NTN nodes (or payloads and/or space-borne vehicles), each of which may provide connectivity functions, between the service link and the feeder link.

An NTN node may embark a bent pipe payload (e.g., a transparent payload) or a regenerative payload. The NTN node with the transparent payload may comprise transmitter/receiver circuitries without the capability of on-board digital signal processing (e.g., modulation and/or coding) and connect to a base station (e.g., a base station of an NTN or the NTN base station or a non-terrestrial access point) via a feeder link. In some respects, as shown in FIG. 18A, the base station (e.g., a gNB) may further comprise the transparent NTN node, the feeder link, and/or a gateway (e.g., an NTN gateway). The gateway may be an earth station that is located at the surface of the earth, providing connectivity to the NTN payload using a feeder link. In some examples, the NTN node with the regenerative payload (e.g., the base station of the NTN or the NTN base station) may comprise functionalities of a base station, e.g., the on-board processing used to demodulate and decode the received signal and/or regenerate the signal before sending/transmitting it back to the earth. In some respects, as shown in FIG. 18A, the base station (e.g., the gNB) may further comprise the regenerative NTN node, the feeder link, and/or the gateway (e.g., the NTN gateway).

In some examples, the NTN node may be a satellite, a balloon, an air ship, an airplane, an unmanned aircraft system (UAS), an unmanned aerial vehicle (UAV), a drone, or the like. For example, the UAS may be a blimp, a high-altitude platform station (HAPS), e.g., an airborne vehicle embarking the NTN payload placed at an altitude between 8 and 50 km, or a pseudo satellite station. FIG. 18B is an example figure of different types of NTN platforms/nodes. In an example, a satellite may be placed into a low-earth orbit (LEO) at an altitude between 250 km to 1500 km, with orbital periods ranging from 90-130 minutes. From the perspective of a given point on the surface of the earth, the position of the LEO satellite may change. In an example, a satellite may be placed into a medium-earth orbit (MEO) at an altitude between 5000 to 20000 km, with orbital periods ranging from 2 hours to 14 hours. In an example, a satellite may be placed into a geostationary satellite earth orbit (GEO) at 35,786 km altitude, and directly above the equator. From the perspective of a given point on the surface of the earth, the position of the GEO satellite may not change.

Figures 19A, 19B:
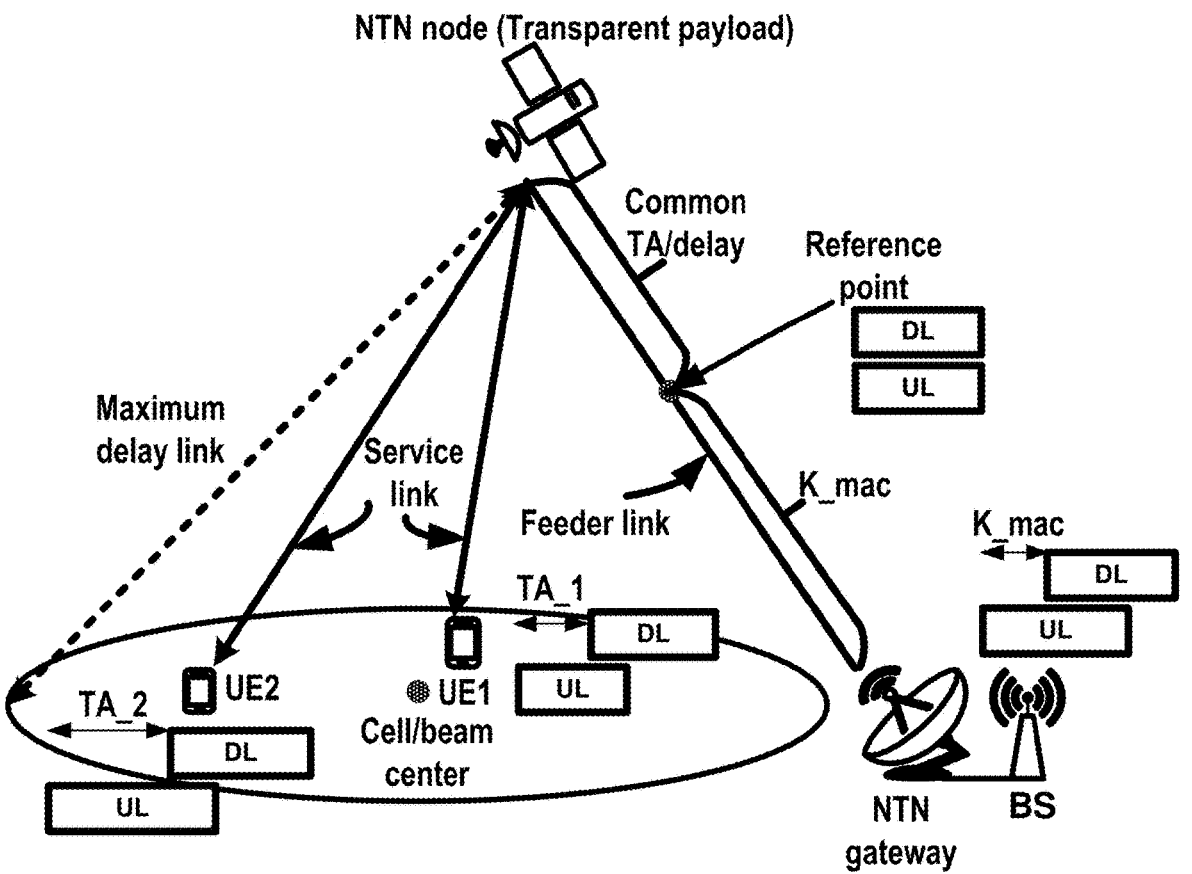
FIG. 19A shows an example of an NTN with a transparent NTN platform/node.
FIG. 19B shows examples of propagation delay corresponding to NTNs of different altitudes.

FIG. 19A shows an example of an NTN with a transparent NTN platform/node. As shown in FIG. 19A, the NTN node (e.g., the satellite) may forward a received signal from the NTN gateway on the ground back to the earth over the feeder link. In an example, the gateway and the base station may not be collocated. The NTN node may forward a received signal to the wireless device or the base station from another NTN node, e.g., over inter-link satellite communication links.

The NTN node may generate one or more beams over a given area (e.g., a coverage area or a cell). The footprint of a beam (or the cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed with some beam pointing mechanism used by the satellite to compensate for its motion (e.g., a LEO with earth fixed cells). As shown in FIG. 18B, the size of a spotbeam may range from tens of kilometers to a few thousand kilometers. For example, the size of the spotbeam may depend on the system design.

A propagation delay may be an amount of time it takes for the head of the signal to travel from a sender (e.g., the base station or the NTN node) to a receiver (e.g., the wireless device) or vice versa. For uplink, the sender may be the wireless device and the receiver may be the base station/access network. For downlink, the sender may be the base station/access network and the receiver may be the wireless device. The propagation delay may vary depending on a change in distance between the sender and the receiver, e.g., due to movement of the NTN node, movement of the wireless device, a change of an inter-satellite link, and/or feeder link switching.

FIG. 19B shows examples of propagation delay corresponding to NTNs of different altitudes. The propagation delay in the figure may be one-way latency/delay. In an example, one-way latency/delay may be an amount of time required to propagate through a telecommunication system from the sender (e.g., the base station) to the receiver (e.g., the wireless device). In an example shown in FIG. 19B, for the transparent NTN, the round-trip propagation delay (RTD or UE-gNB RTT) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). For example, the UE-gNB RTT (or the RTD) may be twice of the one-way delay between the wireless device and the base station. From FIG. 19B, in case of a GEO satellite with the transparent payload, the RTD may be four times of 138.9 milliseconds (approximately 556 milliseconds). In an example, the RTD of a terrestrial network (e.g., NR, E-UTRA, LTE) may be negligible compared to the RTD of an NTN scenario (e.g., the RTD of a terrestrial network may be less than 1 millisecond). A maximum RTD of a LEO satellite with the transparent payload and altitude of 600 km is approximately 25.77 milliseconds and with altitude of 1200 km is approximately 41.77 milliseconds.

A differential delay within a beam/cell of a NTN node may depend on, for example, the maximum diameter of the beam/cell footprint at nadir. For example, the differential delay withing the beam/cell may depend on the maximum delay link in FIG. 19A. In an example, the differential delay may imply the maximum difference between communication latency that two wireless devices, e.g., a first wireless device (UE1) that is located close to the center of the cell/beam and a second wireless device (UE2) that is located close to the edge of the cell/beam in FIG. 19B, may experience while communicating with the base station via the NTN node. The first wireless device may experience a smaller RTD compared to the second wireless device. The link with a maximum propagation delay (e.g., the maximum delay link) may experience the highest propagation delay (or the maximum RTD) in the cell/beam. In an example, the differential delay may imply a difference between the maximum delay of the cell/beam and a minimum delay of the cell/beam. In an example, the service link to a cell/beam center may experience the minimum propagation delay in the cell/beam. Depending on implementation, for a LEO satellite, the differential delay may be at least 3.12 milliseconds and may increase up to 8 milliseconds. In an example of a GEO satellite, depending on implementation, the differential delay may be as large as 32 milliseconds.

The wireless device (e.g., the first wireless device and/or the second wireless device in FIG. 19B) may receive the one or more configuration parameters, e.g., the one or more RRC configuration parameters, from the base station. For example, the one or more configuration parameters may comprise one or more NTN configuration parameters. In some aspects, the wireless device may indicate a capability for NR NTN access (e.g., nonTerrestrialNetwork-r17), e.g., to receive the one or more NTN configuration parameters (e.g., via one or more NTN-specific SIBs). For example, the one or more NTN configuration parameters may be received, by the wireless device, from a broadcast system information (e.g., SIB1 and/or the one or more NTN-specific SIBs). The one or more NTN configuration parameters may facilitate/manage the calculation/determination/measurement of the propagation delay (e.g., the UE-gNB RTT) and/or a timing advance (TA) at one or more wireless devices (e.g., the wireless device) camping in the cell/beam. In an example, the one or more NTN configuration parameters may comprise at least one or more ephemeris parameters (e.g., satellite ephemeris parameters or NTN ephemeris parameters), one or more common delay/TA parameters, a validity duration (or timer or window) for UL synchronization, an epoch time, and/or one or more timing offset parameters. For example, the one or more NTN configuration parameters may enable a TA reporting.

In an example, the wireless device may maintain/calculate a cell-specific timing offset, one or more beam-specific timing offsets, and/or a UE-specific timing offset (e.g., UE-specific K_Offset) based on the one or more timing offset parameters and/or one or more MAC CE commands and/or one or more RRC signaling. For example, the one or more timing offset parameters may comprise a first timing offset (e.g., Koffset in ServingCellConfigCommon). In some aspects, the first timing offset may account for the maximum RTD of the cell/beam. For example, the wireless device may track/update/maintain the cell/beam-specific timing offset based on receiving an update of the first timing offset from the base station. For example, the wireless device may receive a second timing offset (e.g., a Differential UE-Specific K_Offset MAC CE). The wireless device may update/track/maintain the UE-specific timing offset based on the second timing offset and/or the cell-specific timing offset.

In some examples, the one or more timing offset parameters may configure/indicate a third timing offset. The wireless device (or the base station) may set a MAC-specific timing offset (or a MAC layer timing offset), denoted by K-Mac, based on the third timing offset. For example, K-Mac may be 0, e.g., when the third timing offset is not indicated/configured. For example, in an NTN scenario with the transparent NTN node, when the UL frame and the DL frame is aligned at the base station, the third timing offset may be absent from the one or more NTN configuration parameters or may be 0. In an example, as shown in FIG. 19B, the MAC-specific timing offset may indicate a portion of the propagation delay (e.g., the UE-gNB RTT) that the base station may pre-compensate (e.g., when the UL frame and the DL frame are not aligned at the base station), e.g., the third timing offset may indicate the difference between the UL frame/configuration timing and the DL frame/configuration timing at the base station. As shown in FIG. 19B, the UL frame and DL frame may be aligned at a reference point on the feeder link. For example, the reference point may be the NTN node, e.g., the third timing offset is equal to the feeder link delay.

To maintain uplink orthogonality, transmissions from different wireless devices in a cell/beam (e.g., the first wireless device and the second wireless device in FIG. 19B) may need to be time-aligned at the base station and/or the NTN node (e.g., satellite). In an example, time alignment/synchronization may be achieved by using different timing advance (TA) values at different wireless devices to compensate for their different propagation delays (or RTDs). As shown in FIG. 19B, the first wireless device may use the first TA value (e.g., TA_1) and the second wireless device may use the second TA value (TA_2).

For example, the wireless device may calculate/measure/maintain a current TA value (e.g., NTA) based on at least a combination of a closed-loop TA procedure/control and/or an open-loop TA procedure/control. The current TA value of the first wireless device (e.g., a TA of the wireless device) may be TA_1 and the current TA value of the second wireless device may be TA_2.

The closed-loop TA procedure/control may be based on receiving at least one TA command (TAC) MAC CE from the base station. For example, the at least one TAC CE may comprise a TA (or an absolute TA) command field of a Msg2 1312 (or a MsgB 1332).

The open-loop TA procedure/control may require a GNSS-acquired position (or location information) of the wireless device and/or receiving the one or more NTN configuration parameters, e.g., the one or more ephemeris parameters (e.g., the satellite ephemeris data), and/or the one or more common delay/TA parameters (e.g., the common TA value. The wireless device may, based on an implemented orbital predictor/propagator model, may use the one or more ephemeris parameters (and/or the GNSS-acquired position) to measure/calculate/maintain movement pattern of the satellite, estimate/measure the service link delay, and/or to adjust the current TA value (e.g., the TA of the wireless device) via the open-loop TA procedure/control. In an example, a combination of the closed-loop TA control and the open-loop TA control may be based on adding/summing the open-loop TA value (e.g., derived/calculated based on the open-loop TA procedure/control) and the closed-loop TA value (or a portion of the closed-loop TA procedure/control).

In an example, the wireless device may calculate/measure/estimate the UE-gNB RTT (or the RTD) based on the current TA value and the third timing offset (e.g., K-Mac). For example, the UE-gNB RTT may be the summation of the current TA value and K-Mac. In an example, if the third timing offset is not indicated or when the K-Mac is 0, the wireless device may determine/measure the UE-gNB RTT based on the current TA value, e.g., the UE-gNB RTT is equal to the current TA value. In an example, the wireless device may maintain/calculate/update the open-loop TA value (or the UE-gNB RTT) over the validity duration. For example, the validity duration may indicate the validity period of the (satellite) ephemeris data/information and/or the one or more common TA parameters. In an example, the validity duration may specify/indicate a maximum period/window (e.g., corresponding to an orbit predictor/propagator model the wireless device is using to estimate/calculate the propagation delay and/or a maximum tolerable error in estimating/measuring/calculating the open-loop TA value) during which the wireless device may not require to read/update/acquire the satellite ephemeris data and/or to acquire the one or more NTN-specific SIBs. For example, upon or in response to acquiring the new (satellite) ephemeris data (or parameters) and/or the one or more NTN-specific SIBs, the wireless device may start/restart the validity duration based on the epoch time indicated by the one or more NTN configuration parameters. In an example, in response to determining that the validity duration being expired, the wireless device may acquire the one or more NTN-specific SIBs to receive an updated (satellite) ephemeris data/information and/or an update of the one or more common TA parameters. In an example, upon the expiry of the validity duration and when the wireless device is not able to acquire the one or more NTN-specific SIBs, the wireless device may become unsynchronized with the base station, e.g., for UL communication with the base station.

In some aspects, in response to receiving the one or more NTN configuration parameters (e.g., via acquiring the one or more NTN-specific SIBs) and/or acquiring an updated GNSS-acquired position, the wireless device may calculate/measure/update the current TA value via the open-loop TA procedure/control. In another example, the wireless device may update the current TA value based on the closed-loop TA procedure/control, for example, based on receiving the one or more TAC MAC CEs. In an example, based on the current TA value being updated, the wireless device may adjust (recalculate) the UE-gNB RTT. In an example, based on receiving a new third timing offset, the wireless device may set K-Mac and adjust (recalculate) the UE-gNB RTT. In another example, the wireless device may periodically calculate/measure/update the current TA value. For example, the wireless device may, prior to performing an uplink transmission, calculate/measure/update the current TA value.

In an example, the wireless device may set the common TA/delay by zero in response to determining that the one or more common TA/delay parameters are absent from the one or more NTN configuration message. For example, when the reference point is located at the NTN node (e.g., the third timing offset is equal to the feeder link delay), the common TA/delay may be zero. In another example, for an NTN with the transparent payload, when the UL timing synchronization is held at the NTN node (e.g., the UL and DL frames are aligned at the base station), the wireless device may not pre-compensate the common TA.

In an example, the wireless device with GNSS capability may require estimating the propagation delay (or the service link delay) based on one or more measurements. For example, the one or more measurements may indicate the GNSS-acquired location information (position) of the wireless device. In an example, the one or more measurements may allow the wireless device to calculate/estimate the propagation delay (or the open-loop TA value) using the GNSS-acquired position and the (satellite) ephemeris data/information. In another example, the one or more measurements may allow the wireless devices to estimate/calculate the propagation delay via one or more timestamps (e.g., the timestamp of a configured broadcast signal) and/or the epoch time. In an example, the one or more measurements may allow the wireless device to estimate/measure a variation rate by which the common TA and/or the service link delay changes over a period.

A wireless device may receive, from a base station, a first DL message (e.g., a first DCI) scheduling/indicating transmission of a first UL signal (e.g., a first PUSCH) corresponding to a HARQ process. In existing technologies, to improve spectral efficiency and/or to reduce data transmission latency of UL transmission, the base station may reuse the (same) HARQ process for transmission of a second UL signal (e.g., a second PUSCH) based on a transmission time (and/or occasion) of the first UL signal at the wireless device. The second UL signal may (or may not) comprise a retransmission of the first UL signal. For example, the base station may transmit a second DL message (e.g., a second DCI) scheduling/indicating transmission of the second UL signal, corresponding to the HARQ process, after the transmission time of the first UL signal at the wireless device. In existing technologies, the wireless device may not expect to receive the second DL message prior to the transmission of the first UL signal. For example, the wireless device may consider the second DCI as an error when it is received prior to the transmission of the first UL signal.

In existing technologies, when the base station and the wireless device operate in an NTN (e.g., the wireless device communicates with the base station via the NTN or the base station is an NTN base station), it may become difficult for the base station and/or the wireless device to determine whether (or when) to reuse the HARQ process (e.g., for the second UL signal). For example, the base station may not know (or may not be able to determine or may not be aware of or may not have information on) the transmission time of the first UL signal at/by the wireless device in an NTN. Compared to terrestrial networks, the transmission time of the first UL signal in an NTN may depend on an estimation of the service link delay at the wireless device, which may be unknown (or inaccurately/incompletely known) by/at the base station. Due to not knowing the transmission time of the first UL signal at/by the wireless device, the base station in an NTN may encounter difficulty (or inefficiency) for reusing the (same) HARQ process for the second UL signal. In an example, when the base station does not know the transmission time of the first UL signal at/by the wireless device, the base station may, for reusing/indicating the HARQ process for the second UL signal, need to wait, e.g., until reception of the first UL signal. As the UE-gNB RTT in NTN is large (e.g., 20-50 ms in LEO satellite and up to 600 ms in GEO satellite), the base station may need to wait, for transmission of the second DL message, for the cell-specific timing offset (e.g. 40-100 ms in LEO satellite and up to 1200 ms in GEO satellite) from/after transmitting the first DL message. This may increase UL transmission latency of the wireless device and/or reduce the spectral efficiency. To compensate for inefficiency, there may be a need to increase the number of HARQ processes in an NTN scenario compared to a terrestrial network, e.g., from 16 HARQ processes in the terrestrial network to higher number of HARQ processes in the NTN (e.g., 32-256 HARQ processes). This may, for example, result in an increase of DCI size (e.g., by 1-4 bits) and/or complexity of the wireless device. For example, the increased DCI size may be larger (e.g., up to 10 bits) for large subcarrier spacings (e.g., 60-240 KHz subcarrier spacings). The increased DCI size may cause a lower detectability of DCI at the wireless device. This may reduce the performance of the wireless device.

In existing technologies, when the base station and the wireless device operate in an NTN, there may be misalignment between the base station and the wireless device regarding transmission of the second UL signal. For example, the base station may expect to receive the second UL signal even though the wireless device has dropped transmission of the second UL signal. The base station may mistakenly transmit (e.g., due to not knowing the transmission time of the first UL signal at/by the wireless device) the second DL message such that the wireless device receives the second DL message prior to the transmission time of the first UL signal. The base station may expect/assume that the second DL message is received by the wireless device after the transmission time of the first UL signal. The wireless device may, for example, consider the second DL message as an error and/or refrain from transmitting the second UL signal (e.g., by not processing a grant indicated by the second DL message). The misalignment between the base station and the wireless device may increase the complexity of the base station (e.g., due to blindly decoding the second UL signal), reduce UL data transmission rate (or spectral efficiency).

There is a need to improve UL transmissions in an NTN scenario to improve the UL transmission latency of the wireless device and/or improve the spectral efficiency and/or reduce signaling overhead (e.g., reducing DCI size and/or the number of HARQ processes) and/or reduce complexity of the wireless device.

According to example embodiments of the present disclosure, the base station and/or the wireless device may reuse a HARQ process when the wireless device and the base station are operating in an NTN. In some cases, the base station may not know the TA of the wireless device and/or have an inaccurate (or incomplete/partial) knowledge of the TA of the wireless device. In an example, the base station and/or the wireless device may reuse a HARQ process when the base station does not have (or has uncertain/inaccurate) information on a transmission timing of an UL signal at the wireless device. In an example embodiment, the base station may reuse the HARQ process for the second DL message when a scheduled transmission of a second DL message (e.g., a second DCI) is (e.g., is scheduled) after a time duration from transmission of a first DL message (e.g., a first DCI). The first DL message may indicate/schedule transmission of a first UL signal (e.g., a first PUSCH) corresponding to the HARQ process. The second DL message may indicate/schedule transmission of a second UL signal (e.g., a second PUSCH) corresponding to the HARQ process. Some embodiments of the present disclosure may improve data transmission rates in the UL/DL, reduce data transmission latency in the UL/DL, and/or improve the spectral efficiency. Some embodiments may reduce the misalignment between the wireless device and the base station regarding whether the wireless device transmits the second UL signal or not. Some embodiments may allow using smaller number of HARQ processes in NTN, by reusing HARQ processes, without causing a reduction of the data transmission rate and/or data transmission latency and/or causing misalignment between the wireless device and the base station. Using smaller number of HARQ processes in NTN may result in a reduction of DCI size (e.g., which may improve detectability of DCI at the wireless device) and/or may reduce memory size or complexity of the wireless device.

In some cases, the wireless device may send/transmit a HARQ reusing capability to the base station. The base station may, based on the HARQ reusing capability of the wireless device, determine to reuse the HARQ process. In some examples, the HARQ reusing capability may indicate a HARQ reusing capability for UL transmissions (e.g., associated with or corresponding to a logical channel) and/or for DL transmissions.

In an example embodiment, the base station may transmit the second DL message after the time duration from/after transmitting the first DL message. The second DL message may, for example, be different than the first DL message. The second DL message may comprise a field (or a field with a value) indicating the (same) HARQ process as indicated by the first DL message. The time duration may be for the NTN, e.g., when the base station and the wireless device are operating in an NTN.

For example, the time duration may be predefined (e.g., specified in a specification of 3GPP standards or hardcoded). In some implementations, the time duration may be precon- figured (e.g., indicated via the one or more configuration parameters). In some other implementations, the base station and/or the wireless device may calculate/determine the time duration. In some cases, the time duration may correspond to the cell. In some other cases, the time duration may be used by one or more wireless devices with a similar capa- bility (e.g., processing capability, polarization, handheld/ vehicular/VSAT capability) and/or a GNSS Location capa- bility and/or communication characteristics. The one or more wireless devices may comprise the wireless device.

Some aspects of the embodiments of the present disclo- sure may allow the base station and/or the wireless device to reuse the (same) HARQ process when the base station does not know the TA of the wireless device and/or inaccurately/ incompletely/partially knows the TA of the wireless device. Based on the embodiments of the present disclosure the base station may reuse the HARQ process for the second DL message when the base station has uncertainty/ambiguity in determining when (or the time that) the first UL signal is transmitted at/by the wireless device. In an example embodi- ment, the base station (and/or the wireless device) may not know (or not have information on) the TA of the wireless device (and/or knows the TA of the wireless device inaccu- rately/incompletely/partially). For example, the base station may not know (or may not have information on) a (precise or accurate) location information of the wireless device (e.g., when the base station does not have agreement from the wireless device to acquire the precise location information of the wireless device and/or when the wireless device does not have GNSS capability and/or when the accuracy of the GNSS of the wireless device is lower than a threshold). In an example, the base station may not know a UE-specific TA of the wireless device. When the base station does not know the TA of the wireless device and/or inaccurately/incom- pletely/partially knows the TA of the wireless device, the base station may determine to reuse the HARQ process for the second DL message, e.g., by scheduling transmission of the second DL message to be (or by transmitting the second DL message) after the time duration from/after transmitting the first DL message.

In an example embodiment, the base station and/or wire- less device may determine reusing the HARQ process based on a reusing condition of the HARQ process being satisfied. For example, when the number of HARQ processes for UL/DL communications being smaller than a threshold the reusing condition of the HARQ process may be satisfied. For example, when the first UL signal and the second UL signal comprise the same TB (or, alternatively, different TBs), the reusing condition of the HARQ process may be satisfied. Reusing the HARQ process, based on the reusing condition of the HARQ process being satisfied, may reduce misalign- ment between the wireless device and the base station.

In an example embodiment, based on receiving the sec- ond DL message within a first time duration from receiving the first DL message, the wireless device may determine a processing time of the second UL signal. The first time duration may, for example, be the time duration. The first time duration may, for example, be a time difference between transmission of (or a first/starting/earliest/initial symbol) the first UL signal and reception of (or a last/ ending/latest/final symbol of) the first DL message. For example, the wireless device may determine the processing time of the second UL signal based on a first offset and/or a second processing time (e.g., a processing time of the physical layer of the wireless device and/or a processing time of PUSCH/PUCCH/PDSCH). In an example embodi- ment, the wireless device may increase the second process- ing time by the first offset. The first offset may be based on a time difference between transmission of (or a first/starting/ earliest/initial symbol of) the first UL signal and reception of (or a last/ending/latest/final symbol of) the second DL message. For example, the first offset may be predefined by the network and/or be preconfigured. For example, the one or more configuration parameters may indicate the first offset.

In an example embodiment, based on receiving the sec- ond DL message within the first time duration from receiv- ing the first DL message, the wireless device may defer/ postpone processing of a second UL grant indicated by the second DL message (e.g., the second UL grant for a trans- mission of the second UL signal). For example, the wireless device may defer processing of the second UL grant by a second offset. For example, the wireless device may, based on deferring/postponing processing of the second UL grant, halt/suspend processing of the second UL grant for a win- dow (with length of the second offset). The wireless device may resume processing of the second UL grant based on the window expiring. The second offset may be based on a time difference between transmission of (or a first/starting/earli- est/initial symbol of) the first UL signal and reception of (or a last/ending/latest/final symbol of) the second DL message. For example, the second offset may be predefined by the network and/or be preconfigured. For example, the one or more configuration parameters may indicate the second offset.

In an example embodiment, the wireless device may, for transmission of the second UL signal, determine a timing offset K (e.g., K2 or K1). The wireless device may determine the timing offset, for example, based on a first time gap. The wireless device may determine the timing offset, for example, based on a first timing offset indicated by the first DL message (e.g., a 'Time domain resource assignment' field of the first DCI or a 'PUSCH time resource allocation' field of a RAR/fallbackRAR UL grant). The wireless device may determine the timing offset, for example, based on a second timing offset indicated by the second DL message (e.g., a 'Time domain resource assignment' field of the second DCI). The wireless device may, for example, calcu- late/determine the first time gap based on a time difference between reception of (e.g., a first/starting/earliest/initial symbol of) the second DL message and reception of (e.g., a last/ending/latest/final symbol of) the first DL message. In an example, to determine the timing offset, the wireless device may increase the second timing offset by the first timing offset. In another example, to determine the timing offset, the wireless device may increase the second timing offset by the first time gap. In another example, the wireless device may refrain from transmitting the second UL signal based on the second timing offset not being larger than (or equal to) the first timing offset. In some cases, the wireless device may, based on the second timing offset not being larger than (or equal to) the first timing offset, determine the timing offset K.

Example embodiments may allow the wireless device to reduce processing load (or complexity) for UL/DL transmissions/communication. Some embodiments may allow the wireless device to transmit the second UL signal when parallel processing of UL signals corresponding to the (same) HARQ process is not supported. Some embodiments may allow the wireless device to process the second UL grant (for the transmission of the second UL signal) when the UE-specific timing offset is not indicated to the wireless device and/or when the time difference between transmission of (e.g., a first/starting/earliest/initial symbol of) the first UL signal and reception of (e.g., a last/ending/latest/final symbol of) the first DL message is large (e.g., 2-5 ms in LEO satellite or 2-20 ms in GEO satellite).

Figures 20A, 20B:
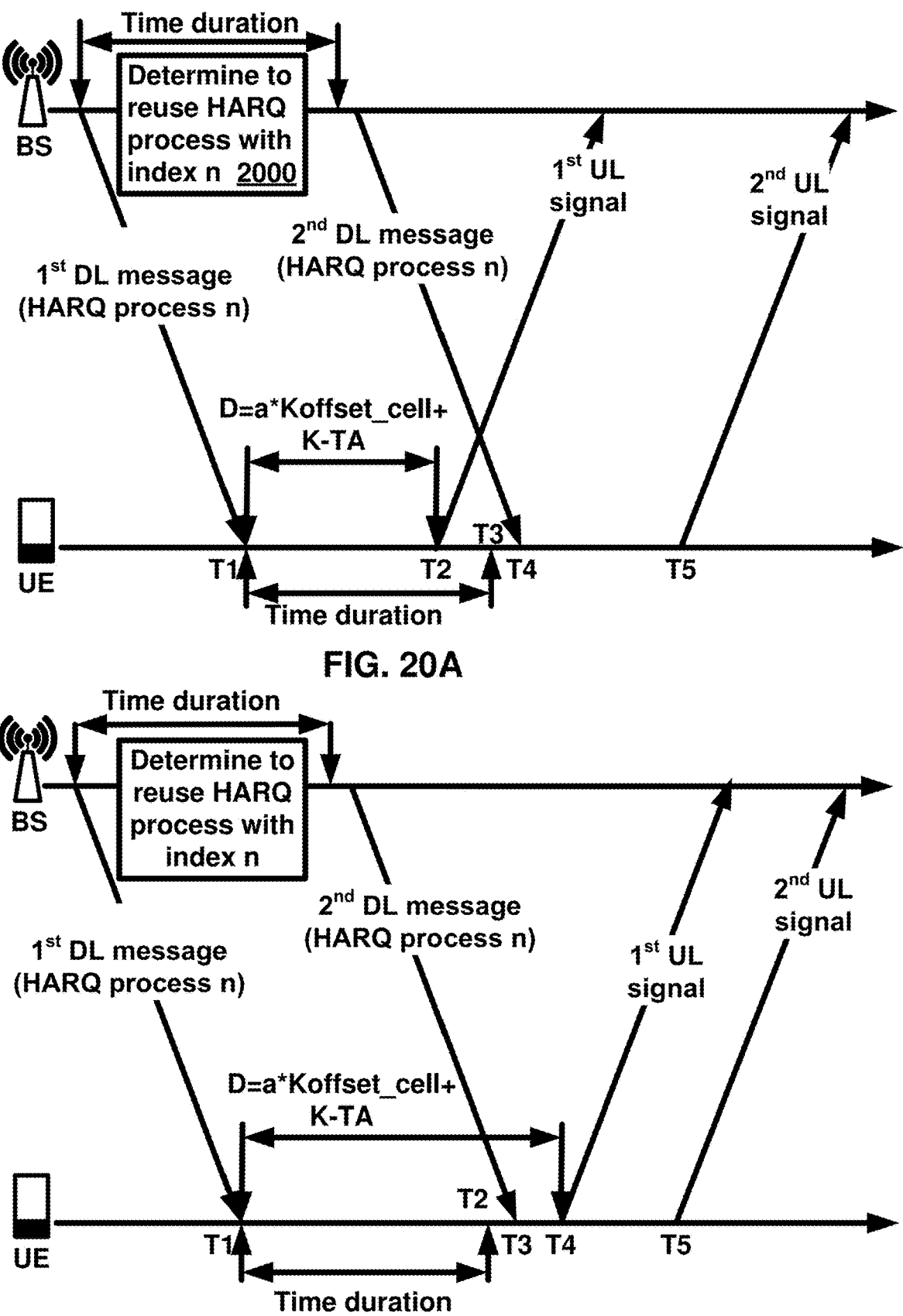
FIG. 20A and FIG. 20B show example embodiments of a method that supports reusing HARQ process in wireless communications systems per an aspect of the present disclosure.

FIG. 20A and FIG. 20B show example embodiments of a method that supports reusing HARQ process in wireless communications systems per an aspect of the present disclosure. FIG. 20A and FIG. 20B may, for example, show an implementation of a method (or a process) for reusing the HARQ process at a base station and/or a wireless device. The base station may communicate with the wireless device. For example, the wireless device may be in an RRC_CONNECTED state/mode. The wireless device may, for example, communicate with the base station after performing an initial access. The wireless device may, for example, communicate with the base station via a non-terrestrial network (NTN), e.g., the wireless device and the base station may operate in the NTN and/or the base station may be an NTN base station.

For example, the base station may transmit, to the wireless device, a first DL message via a first DL signal (e.g., PDCCH or PDSCH). In an example, the first DL message may be a first DCI. The first DL message may, for example, schedule/indicate transmission of a first uplink signal (e.g., a first PUSCH) corresponding to a hybrid automatic repeat request (HARQ) process. The first DCI may comprise a first field with a first HARQ process number (or index or ID) indicating an index of the HARQ process. As shown in FIG. 20A and FIG. 20B, the index of the HARQ process is n. The first DCI may have a first DCI format, e.g., a DCI format 0_0, a DCI format 0_1, or a DCI format 0_2. For example, the first DCI may have CRC scrambled by a first RNTI. In an example, the first RNTI may be one of C-RNTI, a CS-RNTI, an MCS-RNTI, or a TC-RNTI. For example, the first DL message may indicate/comprise a first UL grant (or resource) for the transmission of the first UL signal. In an example, the first UL signal may comprise/be a repetition (e.g., Type A PUSCH repetition). The wireless device may, for example, detect the first DCI with the first DCI format. The wireless device may, for example, monitor PDCCH by the first RNTI to receive the first DCI.

The first DL message may, for example, comprise/include/be a first PDSCH (or a first slot aggregated PDSCH). For example, the first PDSCH (or the first slot aggregated PDSCH) may comprise a first transport block (TB). The first TB may be associated with (or correspond to) the HARQ process. The first DL message may, for example, be for a first DL data transmission. The association of the first PDSCH or the first slot-aggregated PDSCH (or the first TB) with the HARQ process may be, for example, based on at least one of: the one or more configuration parameters (e.g., SPS configuration parameters), SFN, number of slots per frame. The association of the first PDSCH (or the first TB) with the HARQ process may be, for example, indicated based on a DCI (e.g., a third DCI) scheduling/indicating transmission of the first PDSCH or the first slot aggregated PDSCH. The wireless device may, based on detecting the DCI (e.g., the third DCI), monitor for receiving the first DL message.

For example, the one or more configuration parameters (e.g., via downlinkHARQ-FeedbackDisabled-r17 in PDSCH-ServingCellConfig) may (semi-statistically) indicate/configure the HARQ process as feedback enabled (or not indicate/configure the HARQ process as feedback disable). In an example, the wireless device may, e.g., based on the one or more configuration parameters (e.g., via downlinkHARQ-FeedbackDisabled-r17 in PDSCH-ServingCellConfig), determine the HARQ process (with index n) being feedback enabled or not being feedback disabled. In another example, when the one or more configuration parameters indicate/configure/provide HARQ-feedbackEnablingforSP-Sactive, the HARQ process may be associated with (or correspond to) a first/initial/starting SPS PDSCH. In an example, the first UL signal may comprise a first PUCCH for transmission of a first uplink control information (UCI). The first uplink control information may comprise an acknowledgement (ACK or a negative ACK, e.g., NACK) of the first TB, e.g., the first HARQ feedback corresponding to the HARQ process. The wireless device may, based on whether a decoding of the first TB being successful or unsuccessful, generate the first UCI (e.g., ACK/NACK) accordingly.

In another example, the first DL message may be a random-access response (RAR) message 1312/1322/1332 indicating/scheduling an UL grant for a transmission of a message 3 1313 of a random access (RA) procedure. For example, the message 3 may comprise/include transmission of the first PUSCH (e.g., with repetition). The second DL message may be the second DCI indicating/scheduling retransmission of the message 3 (e.g., with repetition). The second UL signal may be transmission of the message 3. For example, the second DCI may have CRC scrambled by a TC-RNTI. The TC-RNTI may be indicated by the RAR message. The wireless device may, for example, trigger/initiate (e.g., based on receiving an order from the base station or a higher layer, e.g., RRC sublayer or MAC layer, of the wireless device) the RA procedure prior to time T1 in FIG. 20A and FIG. 20B.

As shown in FIG. 20A and FIG. 20B, the wireless device may receive the first DL message at time T1. In some cases, the time T1 may correspond to a slot n that the wireless device may receive the first DL message. For example, the time T1 may depend on one or more numerologies (e.g., a numerology that is used for transmission of the first UL signal and a numerology that is used for reception of the first DL message). The wireless device may receive the first DL message in/via/using/through a first carrier component (CC).

In carrier aggregation (CA), two or more component carriers (CCs) may be aggregated. The wireless device may, using the technique of CA, simultaneously receive or transmit on one or more CCs, depending on capabilities of the wireless device (e.g., crossCarrierScheduling-SameSCS and/or the like). In an example, the wireless device may support CA for contiguous CCs and/or for non-contiguous CCs. CCs may be organized into cells. For example, CCs may be organized into one primary cell (PCell) and one or more secondary cells (SCells). In an example, the one or mor configuration parameters may comprise configuration parameters of a plurality of one or more SCells, depending on capabilities of the wireless device. When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate the SCell in response to receiving an SCell Activation/Deactivation MAC CE.

As shown in FIG. 20A and FIG. 20B, the wireless device may, based on the first DL message, determine a transmission time of the first UL signal (e.g., time T2), e.g., in the UL configuration/frame. The transmission time of the first UL signal may be D ms ahead of the receiving the first DL message (e.g., in the DL configuration/frame) at time T1, e.g., a time difference between the transmission time of the first UL signal and receiving the first DL message is D ms. For example, a first/initial/starting/earliest symbol of the first UL signal may be D ms away from (or ahead of) a last/final/ending/latest symbol of the first DL message. As shown in FIG. 20A and FIG. 20B, the wireless device may determine the transmission time of the first UL signal (at time T2 in FIG. 20A and at time T4 in FIG. 20B) using (or based on) the cell-specific timing offset (e.g., Koffset_cell), a timing offset K (e.g., K2 or K1), one or more numerologies (e.g., a numerology that is used for transmission of the first UL signal and a numerology that is used for reception of the first DL message), and/or a TA of the wireless device (e.g., the current TA value). The timing offset parameter K may indicate a timing offset for transmission of the first UL signal in response to receiving the first DL message. In FIG. 20A and FIG. 20B, parameter a may depend on a numerology for transmission of the first UL signal (mu_1) and/or a numerology for receiving the cell-specific timing offset (mu_2), e.g., $a=2^{(mu\_1-mu\_2)}$. For example, the wireless device may transmit the first UL signal in/via/using/through a second CC. The second CC may be the first CC. The second CC may, for example, be different than the first CC.

For example, the first DCI may comprise a field (e.g., a 'Time domain resource assignment'). The field (or the value of the field) may indicate a first scheduling offset, e.g., by providing/indicating a row of a resource allocation table. The wireless device may, for example, determine the timing offset based on the first scheduling offset and/or the one or more configuration parameters (e.g., one or more resource allocation tables).

In some cases, the first DL message may be a RAR/fallbackRAR comprising a field (e.g., a 'PUSCH time resource allocation'). The field (or the value of the field) may indicate a first scheduling offset, e.g., by providing/indicating a row of a resource allocation table. The wireless device may, for example, determine the timing offset based on the first scheduling offset and/or the one or more configuration parameters (e.g., one or more resource allocation tables).

For example, the wireless device may determine the timing offset based on an indication of timing for transmission of the first PUCCH comprising the first UCI (e.g., ACK/NACK) indicated by a DCI. In an example, the DCI may schedule/indicate transmission of the first PDSCH or the first slot aggregated PDSCH. For example, the DCI may comprise a field (e.g., a 'PDSCH-to-HARQ_feedback timing indicator'). The field (or the value of the field) may indicate the first scheduling offset. The wireless device may, for example, determine the timing offset based on the first scheduling offset and/or the one or more configuration parameters.

In another example, when the first DL message comprises a DL semi-persistent scheduling (SPS) transmission, the first scheduling offset may be an indication of timing for transmission of the first PUCCH (comprising the first UCI) with accordance to (or using or indicated by) the one or more configuration parameters (e.g., SPS-Config and/or PUCCH-Config). The wireless device may determine the timing offset based on the first scheduling offset and/or the one or more configuration parameters. The one or more configuration parameters (e.g., SPS-Config) may configure the wireless device with a periodicity of the DL data transmission.

In some aspects, activation of DL SPS may be based on PDCCH with CS-RNTI (e.g., receiving the PDCCH transmission addressed to/by the CS-RNTI). The PDCCH may carry necessary information in terms of time-frequency resources and other parameters. Upon or after activation of DL SPS, the wireless device may receive downlink transmission periodically according to the periodicity of the data transmission using one or more transmission parameters indicated in the PDCCH activating the semi-persistent scheduling. In an example, the index/number/ID of the HARQ process for the DL SPS transmission of the first DL message may be derived/determined, e.g., by the wireless device and/or the base station, based on at least the one or more configuration parameters (e.g., the SPS configuration parameters), SFN, number of slots per frame, or a time when the DL data transmission starts.

As shown in FIG. 20A, the base station and/or the wireless device may determine to reuse the (same) HARQ process for a second DL message 2000. The base station may, after transmitting the first DL message, determine reusing the HARQ process for the second DL message (e.g., transmitting the second DL message). The second DL message may be (or comprise) a second DCI. For example, the second DL message may schedule/indicate transmission of a second UL signal (e.g., a second PUSCH). The second DL message may, for example, comprise a second PDSCH (e.g., a second slot aggregated PDSCH). For example, the second DL message may be for transmission of a second transport block (TB) that is associated with the HARQ process. The association of the PDSCH (or the TB) with the HARQ process may be based on at least the one or more configuration parameters (e.g., the SPS configuration parameters), SFN, and/or number of slots per frame. The association of the PDSCH (or the TB) with the HARQ process may be indicated based on a DCI (e.g., a fourth DCI) scheduling/indicating transmission of the second PDSCH or the second slot aggregated PDSCH. In an example, the second UL signal may be a second PUCCH carrying/with a second UCI (e.g., ACK/NACK of the second TB). The wireless device may, based on whether a decoding of the second TB being successful or unsuccessful, generate the second UCI (e.g., ACK/NACK of the second TB) accordingly.

In the example shown in FIG. 20A, the wireless device may receive the second DL message after the transmission time of the first UL signal at the wireless device (e.g., at time T4). In some cases, the time T4 in FIG. 20A, may correspond to a slot n that the wireless device may receive the second DL message. For example, the time T4 in FIG. 20A may depend on one or more numerologies (e.g., a numerology that is used for transmission of the second UL signal and a numerology that is used for reception of the second DL message). On the other hand, in the example shown in FIG. 20B, the wireless device may receive the second DL message prior the transmission time of the first UL signal at the wireless device (e.g., at time T3). In some cases, the time T3 in FIG. 20B, may correspond to a slot n that the wireless device may receive the second DL message. For example, the time T3 in FIG. 20B may depend on one or more numerologies (e.g., a numerology that is used for transmission of the second UL signal and a numerology that is used for reception of the second DL message). For example, the wireless device may receive the second DL message in/via/using/through the second CC. The wireless device may, for example, transmit the second UL signal in/via/using/through the second CC.

In one implementation, the base station may, before receiving the first UL signal, reuse the HARQ process for the second DL message without knowing (or with inaccurately/partially knowing or without having information on) the transmission time of the first UL signal at the wireless device. In another implementation, the base station may, before receiving the first UL signal, reuse the HARQ process for the second DL message without considering the transmission time of the first UL signal. In another implementation, the base station may reuse the HARQ process for the second DL message when the cell-specific timing offset (e.g., Koffset_cell) being larger than a predefined/preconfigured threshold.

In an example embodiment, as shown in FIG. 20A and FIG. 20B, the base station may determine to reuse the HARQ process for the second DL message prior to receiving the first UL signal from the wireless device. In an example, based on scheduling transmission (or transmission time) of the second DL message (e.g., the second DCI) being after a time duration (or a threshold time or a time distance or a minimum distance in symbols or a minimum distance in slots) from/after transmission time of the first DL message (e.g., the first DCI), the base station may determine to reuse the HARQ process for the second DL message. For example, the base station may transmit the second DL message after the time duration after/from transmitting the first DL message.

In some implementations, reusing the HARQ process for the second DL message may comprise using the HARQ process that is used for transmitting the first DL message. For example, the second DL message may comprise a field indicating the HARQ process. The second DL message may, for example, comprise a field indicating the index/number/ID of the HARQ process that is used for transmission of the first DL message. In another example, the second DL message may be for transmitting (or may be with or may carry) a second TB associated with (or correspond to) the HARQ process.

In an example embodiment, based on receiving the first DL message, the wireless device may determine to reuse the HARQ process for the second DL message. For example, the wireless device may receive the second DL message after the time duration after/from receiving the first DL message.

The time duration may, for example, be for the NTN. In some implementations, based on the wireless device and the base station operating in an NTN, the base station may determine to reuse the HARQ process for the second DL message, e.g., before receiving the first UL signal and/or after the time duration from/after the first DL message. In some other implementations, based on the wireless device and the base station operating in the NTN, the wireless device may determine to reuse the HARQ process for transmitting the second UL message. For example, the second DL message scheduling the second UL signal may be received, by the wireless device, before transmitting the first UL signal. For example, based on the wireless device and the base station operating in the NTN, the wireless device may determine to reuse the HARQ process for the second DL message, e.g., before transmitting the first UL message and/or after the time duration from receiving the first DL message.

The time duration may be predefined (e.g., specified in a specification of 3GPP standard or hardcoded for the base station and/or the wireless device). In some implementations, the time duration may be preconfigured for the wireless device and/or the base station. In some other implementations, the base station and/or the wireless device may calculate/determine the time duration. In an example, the one or more configuration parameters may indicate the time duration.

In some aspects, the time duration may correspond to the cell/beam. In some other aspects, the time duration may be used for communicating between the base station and a group a wireless devices (comprising the wireless device).

For example, a group of wireless devices (comprising the wireless device) may have one or more similar communication characteristics, e.g., locating around the cell center (or the cell edge), and/or not having (or having) a GNSS Location capability (e.g., gnss-Location-r16) and/or having a similar capability and/or characteristics (e.g., processing capability, polarization modes (e.g., vertical horizontal, right-hand circular, or left-hand circular), handheld/vehicular characteristics, very small apparatus terminal (VSAT) characteristics), and/or having a similar mobility profile (e.g., a train and/or an airplane). In an implementation, the group of wireless devices may have an antenna polarization (e.g., a right-hand circular polarization or a left-hand circular polarization) that matches (or alternatively does not match) with the polarization of the antenna onboard the NTN node (e.g., LEO satellite). For example, the antenna of the group of wireless devices may be omnidirectional and/or linearly polarized and the antenna onboard the NTN node may be circularly polarized (e.g., left-hand or right-hand) that may result a loss (e.g., approximately 3 dB) in link budget (e.g., signal-to-noise ratio). In another example, the group of wireless devices may have MIMO capabilities that may reduce the loss of the link budget due to mismatch between the polarization of antennas at the group of wireless devices and the NTN node. In another example, the group of wireless devices may support the same circular polarization as of the antenna onboard the NTN node. In another implementation, the group of wireless devices (comprising the wireless device) may have (or not have) high processing capability and/or may have (or not have) out-of-order capability for UL/DL communication.

In some aspects, the time duration may not be based on the transmission time of the first UL signal at the wireless device. For example, as shown in FIG. 20A, the wireless device may receive the second DL message at time T4 after the transmission time of the first UL signal at time T2. In another example, as shown in FIG. 20B, the wireless device may receive the second DL message at time T3 prior to the transmission time of the first UL signal at time T4.

In some aspects, the transmission time of the first UL signal may not be based on the time duration (e.g., regardless or irrespective of the time duration). For example, as shown in FIG. 20A, the wireless device may transmit the first UL signal at time T2 within the time duration from receiving the first DL message. In another example, as shown in FIG. 20B, the wireless device may transmit the first UL signal outside the time duration from receiving the first DL message.

For example, when the base station and the wireless device operating in the NTN, determining to reuse the HARQ process for the second DL message (by the base station and/or the wireless device) may be based on the time duration from transmitting the first DL message at the base station (or receiving the first DL message at the wireless device). As shown in FIG. 20A, FIG. 20B, the base station may receive, from the wireless device, the first UL signal. The base station may further receive, from the wireless device, the second UL signal. As shown in FIG. 20A and FIG. 20B, the wireless device may transmit, to the base station, the first UL signal. The wireless device may further transmit, to the base station, the second UL signal.

In an example, transmitting an UL signal (e.g., the first UL signal and/or the second UL signal) may be based on at least one (physical layer) preparation/processing time of the wireless device (e.g., PUSCH/PDSCH/PUCCH processing/preparation time). In some cases, based on a first/initial/earliest/stating symbol of the UL signal (e.g., the first PUSCH or the second PUSCH), in the UL configuration/frame, including DM-RS, being no earlier (or later than) than at a symbol (e.g., a symbol L2 or a symbol L1), the wireless device may transmit the UL signal (e.g., the first UL signal and/or the second UL signal). In an example, the wireless device may determine the symbol based on the at least one preparation/processing time of the wireless device.

In some implementations, based on the transmission time of the first UL signal (in the UL frame/configuration) being within a first processing window (or duration or time gap or time distance) from the reception time of the first DL message (in the DL frame/configuration), the wireless device may not transmit the first UL signal. For example, based on the transmission time of the first UL signal (in the UL frame frame/configuration) being after (or outside of) the first processing window from the reception time of the first DL message (in the DL frame frame/configuration), the wireless device may transmit the first UL signal.

In an example, the symbol (e.g., the symbol L2 or the symbol L1) corresponding to the first UL signal (e.g., the first PUSCH) may be based on at least the cell-specific timing offset, one or more numerologies (e.g., a numerology that is used for transmission of the first UL signal and a numerology that is used for reception of the first DL message), the timing offset K (e.g., K2) and/or a start and length indication for time domain allocation (SLIV) of the first PUSCH. The wireless device may determine the timing offset based on the first DL message (e.g., the first DCI), the first scheduling offset, and/or the one or more configuration parameters. In an example, the symbol, corresponding to the first UL signal, may further be based on an uplink symbol with its cyclic prefix (CP). In some cases, for transmitting the first UL signal, the symbol, corresponding to the first UL signal, may not be within the first processing window (or duration) after the receiving (e.g., a last/final/ending/latest symbol of) the first DL message (e.g., the reception of the last/final/ending/latest symbol of PDCCH carrying/comprising the first DCI scheduling the first UL signal, e.g., the first PUSCH). For example, the length of the first processing window may be based on at least one preparation/processing time of the wireless device (e.g., $T_{proc,2}$ and/or $T_{proc,1}$). For example, based on the symbol, corresponding to the first UL signal, being within the first processing window from/after the receiving of the first DL message, the wireless device may not transmit the first UL signal.

In an example, when the transmission of the first UL signal comprises transmitting a first HARQ feedback (transmitting the first UCI via the first PUCCH) of the first PDSCH (or the first slot aggregated PDSCH), a first/earliest/starting/initial symbol of the first PUCCH, in the UL configuration/frame, may not be within the first processing window (e.g., with the length $T_{proc,1}$) after a last/final/ending/latest symbol of the first PDSCH (or a last/final/ending/latest symbol of a first/starting/earliest/initial PDSCH of the first slot aggregated PDSCH) reception, in the DL frame/configuration, associated with the HARQ-ACK information. In an example, the first/earlies/starting/initial (uplink) symbol of the first PUCCH may start no earlier than at the symbol (e.g., the symbol L2 or the symbol L1), e.g., in the UL configuration/frame, corresponding to the first UL signal. In some cases, the symbol, corresponding to the first UL signal, may be based on an uplink symbol with its Cyclic Prefix (CP).

In an example, based on the symbol, corresponding to the first UL signal, being within the first processing window from/after the receiving of the first DL message, the wireless device may not transmit the first UL signal. For example, based on the symbol, corresponding to the first UL signal, being outside of the first processing window from/after the receiving of the first DL message, the wireless device may not transmit the first UL signal.

In some implementations, based on the transmission time of the second UL signal (in the UL frame/configuration) being within a second processing window (or duration or time gap or time distance) from the reception time of the second DL message (in the DL frame/configuration), the wireless device may not transmit the second UL signal. For example, based on the transmission time of the second UL signal (in the UL frame/configuration) being after (or outside of) the first processing window from the reception time of the second DL message (in the DL frame/configuration), the wireless device may transmit the second UL signal.

In an example, the symbol (e.g., the symbol L2 or the symbol L1) corresponding to the second UL signal (e.g., the second PUSCH or the second PUCCH for transmitting the second UCI) may be based on at least the cell-specific timing offset, one or more numerologies (e.g., a numerology that is used for transmission of the second UL signal and a numerology that is used for reception of the second DL message), a timing offset K (e.g., K2 or K1) and/or a start and length indication for time domain allocation SLIV) of the first PUSCH. The wireless device may determine the timing offset based on the second DL message (e.g., the second DCI) and/or the one or more configuration parameters. In an example, the symbol, corresponding to the second UL signal, may not be within a second processing window after the receiving (e.g., a last/final/ending/latest symbol of) the second DL message (e.g., the reception of the last/final/ending/latest symbol of PDCCH carrying/comprising the second DCI scheduling the second UL signal, e.g., the second PUSCH). For example, the length of the second processing window may be based on at least one preparation/processing time of the wireless device (e.g., $T_{proc,2}$ and/or $T_{proc,1}$).

In an example, when the transmission of the second UL signal comprises transmitting a second HARQ feedback (e.g., transmitting the second UCI via the second PUCCH) of the second PDSCH (or the second slot aggregated PDSCH), a first/earliest/starting/initial symbol of the second PUCCH, in the UL configuration/frame, may not be within the second processing window (e.g., with length $T_{proc,1}$) after a last/final/ending/latest symbol of the second PDSCH (or a last/final/ending/latest symbol of a first/starting/earliest/initial PDSCH of the second slot aggregated PDSCH) reception associated with the HARQ-ACK information. In an example, the first/earliest/starting/initial uplink symbol of the second PUCCH may start no earlier (or later) than at the symbol (e.g., the symbol L2 or the symbol L1), e.g., in the UL configuration/frame, corresponding to the second UL signal. In some cases, the symbol, corresponding to the second UL signal, may be based on an uplink symbol with its Cyclic Prefix (CP).

For example, based on the symbol, corresponding to the second UL signal, being within the second processing window from/after the receiving of the second DL message, the wireless device may not transmit the second UL signal. For example, based on the symbol, corresponding to the second UL signal, being outside of the second processing window from/after the receiving of the second DL message, the wireless device may not transmit the second UL signal.

Some example embodiments may allow the base station and/or the wireless device to reuse the HARQ process, e.g., when the base station and the wireless device are operating in an NTN. For example, by reusing the HARQ process, it may be possible to reduce the number of used/supported/configured HARQ processes and/or the size of the first DCI (or the second DCI). Based on the embodiments of the present disclosure the base station (and/or the wireless device) may properly reuse the HARQ process for the second DL message when the base station has uncertainty in determining that when the first UL signal is transmitted at the wireless device.

FIG. 21 shows a flowchart illustrating a method that supports reusing HARQ process per an aspect of the present disclosure. The method of FIG. 21 may be implemented by/at a base station. The base station may communicate with a wireless device. For example, the wireless device may be in an RRC_CONNECTED state/mode. The wireless device may, for example, communicate with the base station after performing an initial access. The wireless device may, for example, communicate with the base station via a non-terrestrial network (NTN) (e.g., the wireless device and the base station may operate in the NTN and/or the base station may be an NTN base station).

As shown in FIG. 21, the base station may transmit to the wireless device the first DL message 2110. In an example embodiment, the base station may, e.g., after transmitting the first DL message, determine to reuse the HARQ process for the second DL message (e.g., transmitting the second DL message).

As shown in FIG. 21, determining to reuse the HARQ process for the second DL message may be based on a TA of the wireless device being unknown or inaccurately/incompletely/partially being known at the base station 2130. For example, the base station may determine to reuse the HARQ process for the second DL message in response to the TA of the wireless device being unknown or inaccurately/incompletely/partially being known at the base station. In some implementations, in order to reuse the HARQ process for the second DL message, the base station and/or the wireless device may optionally determine that the base station not knowing (or inaccurately/incompletely/partially knowing) the TA of the wireless device. For example, the base station may not know (or have information on) the range/amount of misalignment between the UL/DL frames/configurations of the wireless device and/or the NTN platform/payload (e.g., the transparent satellite). In an example, the base station may partially/inaccurately/incompletely know the range/amount of misalignment between the UL/DL frames/configurations of the wireless device and/or the NTN platform/payload (e.g., the transparent satellite). For example, the base station may not know the parameter D (see FIG. 20A and/or FIG. 20B) used/determined/calculated at/by the wireless device for transmission of the first UL signal at the wireless device.

When (or based on) the base station does not know a TA information of the wireless device (e.g., when the base station has not received the TA information of the wireless device), the TA of the wireless device may be unknown or inaccurately/incompletely/partially known at/by the base station. For example, the TA information may comprise a location information of the wireless device and/or the UE-specific TA of the wireless device and/or an estimation of the service link delay (e.g., the link between the wireless device and the NTN node) by the wireless device. For example, the TA information of the wireless device may comprise the TA of the wireless device. In an example, the TA information of the wireless device may comprise the open-loop TA value of the wireless device.

When (or based on) the one or more configuration parameters not indicating/configuring a TA reporting configuration (e.g., TA-Info-r17 in the one or more NTN configuration parameters), the TA of the wireless device may be unknown or inaccurately/incompletely/partially known at/by the base station. In an example, the TA reporting configuration may be at least one of the following: an event-triggered TA reporting configuration, a periodic TA reporting configuration, a TA reporting configuration based on the base station (or network) request, a configuration/indication for reporting the TA information in response to (or once) the TA reporting configuration being reconfigured, a configuration/indication for enabling reporting the TA information during a random access procedure when the wireless device's status is not RRC_IDLE, and/or a configuration/indication for enabling reporting the TA information during initial access (e.g., ta-Report in an NTN-specific SIB). In an NTN scenario, the one or more configuration parameters may not configure the wireless device with the TA reporting configuration, for example, to reduce signaling overhead in the cell provided by the base station and/or to reduce the complexity or power consumption of the wireless device.

The TA of the wireless device may be unknown or inaccurately/incompletely/partially known at/by the base station based on an inaccurate (or incomplete or partial) knowledge of the TA of the wireless device at the base station (and/or at the wireless device). For example, in response to (or based on) not knowing the accurate location information of the wireless device at/by the base station, the TA of the wireless device may be unknown or inaccurately/incompletely/partially known at/by the base station. In some aspects, when inaccuracy of the GNSS-acquired location information of the wireless device is larger than a threshold (e.g., 10-50 meters), the accurate location information of the wireless device may not be known (or be available) at/by the base station and/or the wireless device. In another example, in response to (or based on not knowing the UE-specific TA of the wireless device, the TA of the wireless device being unknown or inaccurately/incompletely/partially known at/by the base station and/or the wireless device. In another example, based on not knowing the estimation of the service like delay at/by the wireless device, the TA of the wireless device being unknown or inaccurately/incompletely/partially known at/by the base station and/or the wireless device. In another example, in response to (or based on) not being aware of (e.g., at/by the base station) a predictor model of the wireless device by which the wireless device calculates/updates/measures/determines the open-loop TA value, the TA of the wireless device being unknown or inaccurately/incompletely/partially known at/by the base station and/or the wireless device. The wireless device may use the predictor model to calculate/measure/update the TA of the wireless device using the one or more NTN configuration parameters (e.g., the one or more satellite ephemeris parameters and/or the one or more common TA parameters and/or the GNSS-acquired location information of the wireless device). In another example, when the unknown portion of the TA of the wireless device at/by the base station being larger than a threshold (e.g., half of a subframe, one slot, or a CP of a symbol), the TA of the wireless device may be unknown or inaccurately/incompletely/partially known at/by the base station (and/or the wireless device).

In some aspects, the TA of the wireless device may be unknown or inaccurately/incompletely/partially known at/by the base station and/or the wireless device based on a TA report MAC CE command not being received, by the base station, from the wireless device, e.g., when the wireless device has not transmitted the TA report MAC CE command to the base station prior to the transmission of the first DCI.

In some implementations, the TA of the wireless device may be unknown or inaccurately/incompletely/partially known at/by the base station and/or the wireless device based on the UE-specific timing offset (e.g., via the Differential UE-Specific K_Offset MAC CE command) not being indicated/transmitted, by the base station, (e.g., prior to the transmission of the first DL message) to the wireless device. For example, the wireless device may use the cell-specific timing offset for all UL transmissions (comprising the first UL transmission) with the base station.

In some implementations, the TA of the wireless device may be unknown or inaccurately/incompletely/partially known at/by the base station and/or the wireless device based on the wireless device not having the GNSS Location capability. For example, the wireless device may transmit/send/indicate an indication for not supporting the GNSS Location capability to the base station. For example, the wireless device may support a capability of operating in the NTN (e.g., nonTerrestrialNetwork-r17).

In an example embodiment, determining to reuse the HARQ process for the second DL message may be based on not knowing (at/by the base station) or not having information on (or inaccurately/partially knowing) the transmission time of the first UL signal (e.g., the first PUSCH) at the wireless device. For example, the base station and/or the wireless device may optionally determine to reuse the HARQ process for the second DL message in response to the base station not knowing (or not having information on or inaccurately/partially knowing) the transmission time of the first UL signal at the wireless device (at time T2 in FIG. 20A and at time T4 in FIG. 20B). For example, the base station and/or the wireless device may determine the base station not knowing the transmission time of the first UL signal at the wireless device based on the TA of the wireless device being unknown or inaccurately/incompletely/partially known at/by the base station. For example, the base station and/or the wireless device may determine the base station not knowing the transmission time of the first UL signal at the wireless device based on the UE-specific timing offset (e.g., via the Differential UE-Specific K_Offset MAC CE command) not being indicated/transmitted to the wireless device.

In an example embodiment, as shown in FIG. 21, determining to reuse the HARQ process for the second DL message (e.g., by the base station and/or the wireless device) may further be based on a reusing condition of the HARQ process being satisfied 2140 at/by the base station (and/or the wireless device). For example, the base station (and/or the wireless device) may optionally determine to reuse the HARQ process for the second DCI in response to the reusing condition of the HARQ process being satisfied.

In one implementation, the reusing condition of the HARQ process may be satisfied based on the first uplink signal and the second uplink signal comprises transmitting a same TB (e.g., the second DCI indicates a retransmission of the first UL signal or an NDI field of the second DCI not being toggled) and/or the first DL message and the second DL message comprise a same TB (e.g., the same TB is transmitted via the first PDSCH and the second PDSCH). Alternatively, the reusing condition of the HARQ process may be satisfied based on the first uplink signal and the second uplink signal comprises transmitting different TBs (e.g., the NDI field of the second DCI being toggled) and/or the first DL message and the second DL message comprise different TBs (e.g., a first TB is transmitted via the first PDSCH and a second TB is transmitted via the second PDSCH where the first TB is different than the second TB).

In another implementation, the reusing condition of the HARQ process may be satisfied based on a retransmission mode of the first UL signal and/or the first DL message. For example, the one or more configuration parameters may configure the HARQ for a blind retransmission mode (e.g., when the base station requests/orders/indicates/schedules a retransmission of a TB before receiving the initial transmission of the TB).

In some aspects, the reusing condition of the HARQ process may be satisfied based on the one or more configuration parameters not configuring the HARQ process for a blind retransmission mode (e.g., the base station may request/order/indicate/schedule the retransmission of the TB after unsuccessfully receiving/decoding the initial transmission of the TB). For example, the mode of the HARQ process may be a no-retransmission mode (e.g., when the base station requests/orders/indicates/schedules a transmission of a second TB corresponding to the HARQ process before receiving the transmission of a first TB corresponding to the HARQ process).

In some aspects, the reusing condition of the HARQ process may be satisfied based on the one or more configuration parameters indicating the HARQ process being deactivated (or disabled) for UL communication/transmission. In an example, the reusing condition of the HARQ process may be satisfied based on the HARQ process having (or not having) a second mode (e.g., HARQ Mode B) for UL transmission. The one or more configuration parameters may indicate by uplinkHARQ-mode in IE PUSCH-ServingCellConfig the HARQ process having the second mode (e.g., the HARQ mode B). In an example, the reusing condition of the HARQ process may be satisfied based on the HARQ process having (or not having) a first mode (e.g., HARQ Mode A) for UL transmission. The one or more configuration parameters may indicate by uplinkHARQ-mode in IE PUSCH-ServingCellConfig the HARQ process having the first mode (e.g., the HARQ mode A).

In some aspects, the reusing condition of the HARQ process may be satisfied based on the one or more configuration parameters not configuring the HARQ process as feedback disabled. For example, the one or more configuration parameters may not disabled HARQ feedback of the HARQ process. The one or more configuration parameters may, for example, configure/indicate the HARQ process as feedback enabled.

In some implementations, the reusing condition of the HARQ process may be satisfied based on the one or more configuration parameters configure a DRX operation for the wireless device. For example, the base station and/or the wireless device may determine that one or more DRX timers (e.g., drx-Retransmission TimerDL and/or drx-Retransmission TimerUL corresponding to the HARQ process or drx-InactivityTimer) not being started/restarted in response to receiving the first DL message and/or the second DL message.

In some aspects, the reusing condition of the HARQ process may be satisfied based on the one or more configuration parameters not configuring the DRX operation for the wireless device.

In an example embodiment, the reusing condition of the HARQ process may be satisfied based on a number of used/configured/supported HARQ processes for UL transmission/communication of the serving cell (e.g., the cell that is provided by the base station and/or the wireless device is comping in). For example, the number of HARQ processes for UL transmission/communication may be used for uplink data transmission (and/or used on PUSCH). The one or more configuration parameters (e.g., IE PUSCH-ServingCellConfig) may, for example, indicate the number of HARQ processes for UL transmission/communication (e.g., nrofHARQ-ProcessesForPUSCH). In an example, the number of HARQ processes for UL transmission/communication may comprise a number of HARQ processes for configured grant (e.g., nrofHARQ-Processes in the one or more configuration parameters, e.g., ConfiguredGrantConfig). For example, the configured trant may be a Type 1 configured grant and/or a Type 2 configured grant. In an example embodiment, the number of HARQ processes for UL transmission/communication of the serving cell may be smaller than a predefined/preconfigured threshold (e.g., 2 or 4 or 8 HARQ processes). In another example, the number of HARQ processes for UL transmission/communication may not comprise the number of HARQ processes for configured grant. In an example embodiment, the number of HARQ processes for UL transmission/communication of the serving cell minus the number of HARQ processes for configured grant may be smaller than the predefined/preconfigured threshold.

In some aspects, the reusing condition of the HARQ process may be satisfied based on an indication of a supported HARQ processes of the wireless device for UL communication/transmission. For example, the indication may indicate a maximum number of HARQ processes for UL communication/transmission based on (or related to) a first capability of the wireless device. In an example, the wireless device may transmit/indicate the first capability regarding/related/corresponding to the maximum number of HARQ processes for UL communication/transmission to the base station. In an example, the maximum number of HARQ processes for UL communication/transmission may be smaller than the predefined/preconfigured threshold. In another example, the maximum number of HARQ processes for the UL communication/transmission minus the number of HARQ processes for configured grant may be smaller than the predefined/preconfigured threshold.

In some implementations, the reusing condition of the HARQ process may be satisfied based on a number of used/configured/supported HARQ processes for DL transmission/communication of the serving cell. For example, the number of HARQ processes for DL transmission/communication may indicate the number of the HARQ processes to be used on PDSCH (or to be used for DL data transmission). The one or more configuration parameters, e.g., IE PDSCH-ServingCellConfig may, for example, indicate the number of HARQ processes for DL transmission/communication (e.g., nrofHARQ-ProcessesForPDSCH). In an example, the number of HARQ processes for DL transmission/communication may comprise a number of HARQ processes for SPS DL (e.g., nrofHARQ-Processes in the one or more configuration parameters, e.g., SPS-Config). In an example, the number of HARQ processes for DL transmission/communication of the serving cell may be smaller than a predefined/preconfigured threshold (e.g., 2 or 4 or 8 HARQ processes). In another example, the number of HARQ processes for DL transmission/communication may not comprise the number of HARQ processes for SPS DL. In an example embodiment, the number of HARQ processes for DL transmission/communication of the serving cell minus the number of HARQ processes for the SPS DL may be smaller than the predefined/preconfigured threshold.

In some aspects, the reusing condition of the HARQ process may be satisfied based on an indication of a number of supported HARQ processes (e.g., a maximum number of HARQ processes) by the wireless device for the DL communication/transmission. For example, the indication may be based on a second capability of the wireless device. In an example, the wireless device may transmit/indicate the indication to the base station (e.g., an indication of the second capability regarding/related/corresponding to the maximum number of HARQ processes for the DL communication/transmission). In an example, the maximum number of HARQ processes for the DL communication/transmission may be smaller than the predefined/preconfigured threshold. In another example, the maximum number of HARQ processes for the DL communication/transmission minus the number of HARQ processes for the SPS DL may be smaller than the predefined/preconfigured threshold.

In some implementations, the reusing condition of the HARQ process may be satisfied based on an out-of-order operation for UL transmission/communication being indicated/enabled/configured (e.g., via the one or more configuration parameters) for the wireless device. For example, the wireless device may transmit to the base station an indication indicating a capability of the out-of-order operation for UL transmission/communication. In an example, the reusing condition of the HARQ process may be satisfied based on the capability of the out-of-order operation for UL transmission/communication being supported by the wireless device.

In some implementations, the reusing condition of the HARQ process may be satisfied based on the out-of-order operation for UL transmission/communication not being indicated/enabled/configured (e.g., via the one or more configuration parameters) for the wireless device. For example, the wireless device may transmit to the base station an indication indicating the capability of the out-of-order operation for UL transmission/communication. In an example, the reusing condition of the HARQ process may be satisfied based on the capability of the out-of-order operation for UL transmission/communication not being supported by the wireless device.

In some implementations, the reusing condition of the HARQ process may be satisfied based on an out-of-order operation for DL transmission/communication being indicated/enabled/configured (e.g., via the one or more configuration parameters) for the wireless device. In an example, the wireless device may indicate/transmit to the base station an indication for a capability of the out-of-order operation for DL transmission/communication. In an example, the reusing condition of the HARQ process may be satisfied based on the capability of the out-of-order operation for DL transmission/communication being supported by the wireless device.

In some implementations, the reusing condition of the HARQ process may be satisfied based on the out-of-order operation for DL transmission/communication not being indicated/enabled/configured (e.g., via the one or more configuration parameters) for the wireless device. In an example, the wireless device may indicate/transmit to the base station an indication for the capability of the out-of-order operation for DL transmission/communication. In an example, the reusing condition of the HARQ process may be satisfied based on the capability of the out-of-order operation for DL transmission/communication not being supported by the wireless device.

In some aspects, the reusing condition of the HARQ process may be satisfied based on the one or more configuration parameters configuring the wireless device with minimumSchedulingOffsetK2 in an active UL BWP and/or minimum SchedulingOffsetK0 in an active DL BWP. In some implementations, the time duration may be based on the minimum applicable K0 and/or the minimum applicable K2. For example, the wireless device may perform a micro-sleep (e.g., not monitoring the PDCCH and/or PDSCH) during the time duration. For example, the first DL message (e.g., the first DCI) may comprise a field (with a value) indicating a 'Minimum applicable scheduling offset indicator'. In some other implementations, the reusing condition of the HARQ process may be satisfied based on the one or more configuration parameters not configuring the wireless device with the minimum SchedulingOffsetK2 in an active UL BWP and/or the minimum SchedulingOffsetK0 in an active DL BWP.

In some examples, the reusing condition of the HARQ process may be satisfied based on the wireless device supporting (or sending/indicating to the base station) at least one capability/characteristic. For example, the at least one capability/characteristic may comprise at least one of the following: a HARQ reusing capability, one or more carrier aggregation (CA) capabilities, a MIMO capability, an antenna polarization mode (e.g., vertical, horizontal, right-hand circular, or left-hand circular), handheld or vehicular characteristics, very small apparatus terminal (VSAT) characteristic, a mobility profile (e.g., a train and/or an airplane). In some cases, the wireless device may send/transmit the at least one capability/characteristic to the base station. For example, the base station may, based on the at least one capability/characteristic of the wireless device, determine to reuse the HARQ process, e.g., the reusing condition of the HARQ process being satisfied. In some cases, the HARQ reusing capability may indicate a HARQ reusing capability for UL transmissions and/or for DL transmissions. For example, the one or more configuration parameters may configure the wireless device with CA operation (e.g., indicate/configure the two or more CCs).

In one implementation, the wireless device may have an antenna polarization (e.g., a right-hand circular polarization or a left-hand circular polarization) that matches (or alternatively does not match) with the polarization of the antenna onboard the NTN node (and/or the base station). In another implementation, the antenna polarization of the wireless device may not match with the polarization of the antenna onboard the NTN node. In one example, the wireless devices may have MIMO capabilities that may partially compensate a loss in the service link budget due to mismatch between the polarization of antennas at the wireless device and NTN node (and/or the base station). In another example, the wireless device may not (partially) compensate the loss in the service link budget due to mismatch between the polarization of antennas at the wireless device and NTN node (and/or the base station).

In some examples, the reusing condition of the HARQ process may be satisfied based on a physical layer priority of the second UL signal (e.g., a priority index of the second PUSCH/PUCCH) being larger than (or smaller than or equal to) a physical layer priority of the first UL signal (e.g., a priority index of the first PUSCH/PUCCH). In some other cases, the wireless device may further determine a priority of a second logical channel (LCH) corresponding to data of the second UL signal being larger than (or smaller than or equal to) a priority of a first logical channel (LCH) corresponding to data of the first UL signal. In some aspects, the first LCH and the second LCH may be the same or may be different. In some aspects, the first LCH and the second LCH may belong to same logical channel group.

In an example embodiment, as shown in FIG. 21, determining to reuse the HARQ process for the second DL message (e.g., by the base station and/or the wireless device) may further be based on determining the time duration 2150, e.g., for reusing the HARQ process for the second DL message. The base station (and/or the wireless device) may optionally determine the time duration based on a first value. In some implementations, the one or more configuration parameters may indicate/configure the first value. For example, the first value may be based on (or depend on or a function of) at least one of the following: a propagation delay of a cell (e.g., the serving cell that is provided by the base station and/or the cell that the wireless device is camped in), and/or the cell-specific timing offset (e.g., the cell-specific Koffset). The propagation delay of the serving cell may, for example, be a minimum round trip propagation delay (RTD) of the cell and/or a maximum RTD of the cell and/or a common RTD of the cell and/or an RTD between the base station (or the NTN payload) and a reference point of the cell. In another example, the propagation delay of the cell may be based on a minimum RTD of the service link delay (and/or a maximum RTD of the service link delay) and/or the feeder link delay (or the common TA and/or the third timing offset, K-Mac).

In an example, the one or more configuration parameters may indicate/configure the propagation delay of the cell. In some aspects, the propagation delay of the cell may be the same across all wireless devices (comprising the wireless device) that are communicating with the base station in the cell. In some other aspects, the propagation delay of the cell may be restricted to the group of wireless devices (e.g., including the wireless device) that are camped in the cell.

In an example embodiment, the time duration may be equal to the subtraction of the propagation delay of the cell from the cell-specific timing offset. In an example, the time duration may be equal to the cell-specific timing offset. The time duration may be equal to the propagation delay of the cell.

In some aspects, the time duration may further be based on (or depend on) a processing time (e.g., the processing time of the PUSCH and/or the processing time of the PDSCH) of the wireless device. In some cases, the time duration may further be based on processing capability (e.g., MIMO capability and/or capability for eliminating a cross-polarization mismatch), antenna polarization modes (e.g., vertical, horizontal, right-hand circular, or left-hand circular), handheld/vehicular characteristics, very small apparatus terminal (VSAT) characteristics, and/or having a similar mobility profile (e.g., a train and/or an airplane). For example, the time duration may further be based on $T_{proc,2}$ and/or $T_{proc,1}$. In one implementation, the time duration may be a maximum of the first value and the processing time of the wireless device. In another implementation, the time duration may be a summation of the first value and the processing time of the wireless device. In another implementation, the time duration may be equal to the processing time of the wireless device.

For example, the time duration may further be based on a maximum timing offset or minimum timing offset. In one implementation, the maximum timing offset may be based on a maximum value of K2 and/or a maximum value of K1 and/or a maximum value of K0. In another implementation, the minimum timing offset may be based on a minimum value of K2 and/or a minimum value of K1 and/or a minimum value of K0.

In some aspects, the time duration may further depend on (or be based on) a numerology, e.g., the numerology used for the first UL signal and/or the numerology used for the first DL message and/or the numerology used for the second UL signal and/or the numerology used for the second DL message. In some other aspects, the time duration may further depend on (or be based on) a length of the first UL signal (e.g., a number of symbols and/or a number of slots and/or a repetition parameter) and/or a length of the second UL signal (e.g., a number of symbols and/or a number of slots and/or a repetition parameter). In some other aspects, the time duration may further be based on DM-RS pattern associated with the first UL signal and/or the second UL signal and/or the first DL message and/or the second DL message.

In an example, the time duration may further be based on the DRX operation, e.g., based on the length of a DRX timer (e.g., drx-InactivityTimer and/or drx-Retransmission TimerUL and/or drx-RetransmissionTimerDL). In some implementations, the time duration may further be based on (or depend on) the minimum Scheduling OffsetK2 in the active UL BWP and/or the minimum SchedulingOffsetK0 in the active DL BWP. For example, the time duration may be based on (or depend on) the 'Minimum applicable scheduling offset indicator' field of first DCI.

In an example embodiment, as shown in FIG. 21, based on scheduling transmission (or transmission time) of the second DL message (e.g., the second DCI) being after the time duration from/after transmission time of the first DL message (e.g., the first DCI), the base station may transmit the second DL message. For example, the base station may transmit the second DL message after the time duration after/from transmitting the first DL message 2160.

As shown in FIG. 21, the base station may receive the first UL signal 2170. For example, the base station may, in response to the second DL message being transmitted after the time duration, receive the first UL signal. For example, the base station, based on reusing the HARQ process for the second DL message, receive the first UL signal.

As shown in FIG. 21, the base station may receive the second UL signal 2180. For example, the base station may, in response to the second DL message being transmitted after the time duration, receive the second UL signal. For example, the base station, based on reusing the HARQ process for the second DL message, receive the second UL signal.

In an example embodiment, the base station may determine to transmit, to the wireless device, a third DL message scheduling/indicating transmission of a third UL signal corresponding to a second HARQ process. In an example embodiment, based on the HARQ process and the second HARQ process being the same (e.g., the index of the second HARQ process being equal to the index of the HARQ process), the base station may transmit the third DL message after the time duration from the first DL message. For example, the base station may determine to reuse the HARQ process for the third DL message based on scheduling transmission of the third DL message being after the time duration from transmitting the first DL message. For example, the base station may determine that the TA of the wireless device is unknown at the base station. In an example, the base station may determine that the TA of the wireless device is partially/inaccurately/incompletely known at/by the base station and/or the wireless device. In some cases, the base station may determine the reusing condition of the HARQ process being satisfied. In some other cases, the base station may determine the time duration for reusing the HARQ process.

Example embodiments of the present disclosure may allow the base station to reuse the HARQ process when the base station does not know the TA of the wireless device and/or inaccurately/incompletely/partially knows the TA of the wireless device. Based on the embodiments of the present disclosure the base station may properly reuse the HARQ process for the second DL message when the base station has uncertainty in determining when the first UL signal is transmitted at the wireless device.

For example, when there is a mismatch between the polarization of antennas at the wireless device and the NTN node and/or when the wireless device is located around the cell edge and/or when channel quality is poor (e.g., low signal-to-noise ratio), by reusing the HARQ process for one or more blind retransmissions of a (same) TB, it may be possible to improve the data transmission latency/rate. In another example, when the DRX is configured, when transmission/reception of the first DL message does not start/restart the drx-Inactivity Timer (or drx-Retransmission TimerUL/DL corresponding to the HARQ process), by reusing the HARQ process, the power consumption of the wireless device may be reduced.

Figure 22:
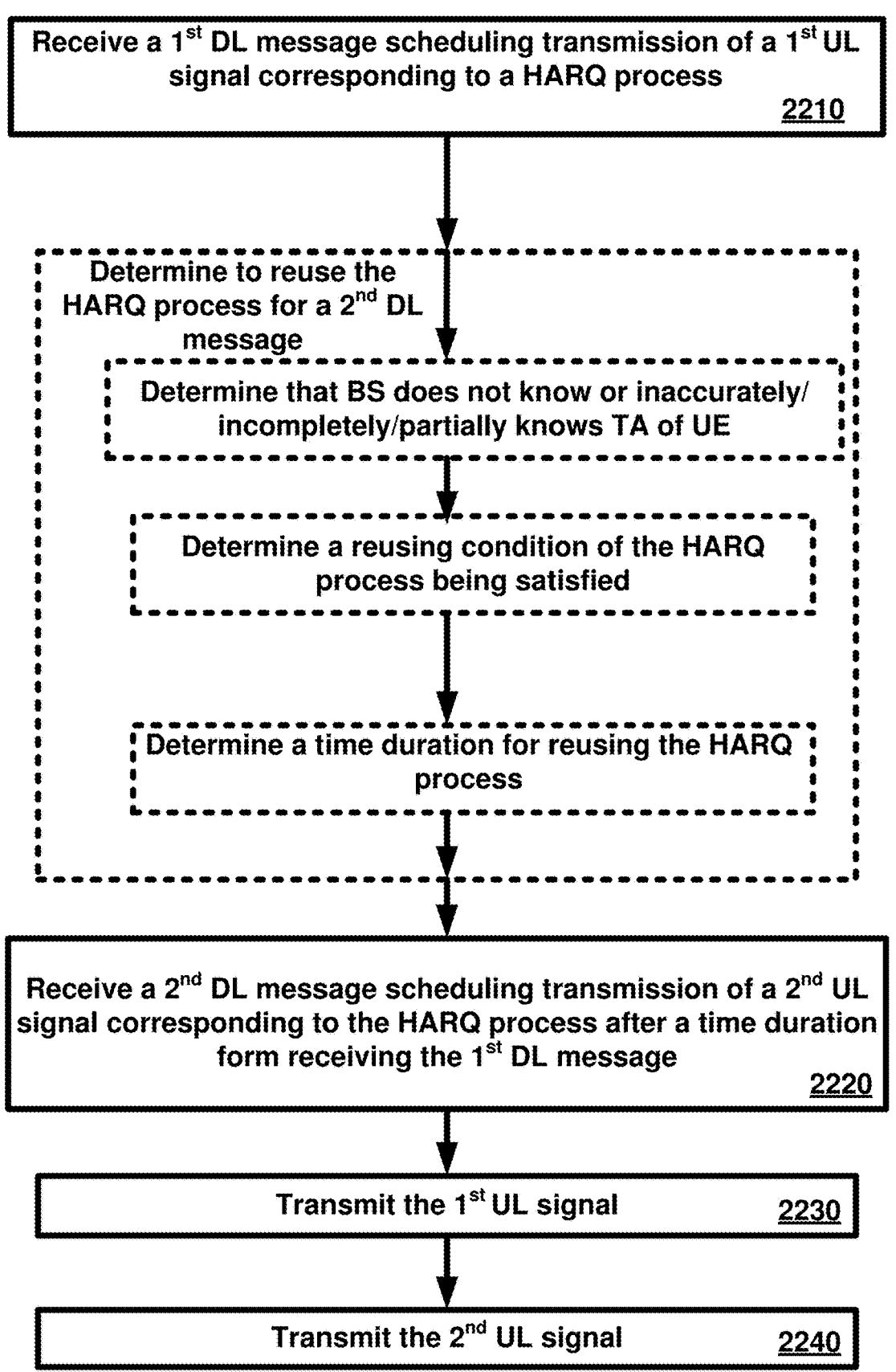
FIG. 22 shows a flowchart illustrating a method that supports reusing HARQ process per an aspect of the present disclosure.

FIG. 22 shows a flowchart illustrating a method that supports reusing HARQ process per an aspect of the present disclosure. The method of FIG. 22 may be implemented by/at a wireless device. A base station may communicate with the wireless device. For example, the wireless device may be in an RRC_CONNECTED state/mode. The wireless device may, for example, communicate with the base station after performing an initial access. The wireless device may, for example, communicate with the base station via a non-terrestrial network (NTN), e.g., the wireless device and the base station may operate in the NTN and/or the base station may be an NTN base station.

As shown in FIG. 22, the wireless device may receive the first DL message 2210. As shown in FIG. 22, the wireless device may, after receiving the first DL message, determine reusing the HARQ process for the second DL message, e.g., for receiving the second DL message and/or for transmitting the second UL signal that is scheduled by the second DL message. In an example embodiment, based on receiving the first DL message, the wireless device may (optionally) determine to reuse the HARQ process for the second DL message. For example, the wireless device may receive the second DL message after the time duration after/from receiving the first DL message 2220. For example, the wireless device may not expect receiving the second DL message within the time duration from receiving the first DL message.

In an example embodiment, as shown in FIG. 22, determining, by the wireless device, to reuse the HARQ process for the second DL message may be based on determining the base station not having the TA of the wireless device or the base station having inaccurate/partial/incomplete knowledge of the TA of the wireless device. For example, determining, by the wireless device, to reuse the HARQ process for the second DL message may be based on the reusing condition of the HARQ process being satisfied at/by the wireless device (and/or at/by the base station). For example, the wireless device may optionally determine to reuse the HARQ process for the second DCI in response to the reusing condition of the HARQ process being satisfied.

In an example embodiment, as shown in FIG. 22, the wireless device may, for reusing the HARQ process for the second DL message, determine the time duration. In some cases, the wireless device may optionally determine the time duration. In another example, the base station may transmit, to the wireless device, at least one indication (e.g., via an RRC signaling, a DCI, or a MAC CE command) indicating the time duration. For example, the DCI may be the first DCI. In another example, the time duration may be indicated/configured by the one or more configuration parameters (e.g., the one or more RRC configuration parameters) and/or the one or more NTN specific configuration parameters. In some cases, the wireless device may, for example, use the one or more configuration parameters and/or the at least one indication to determine/calculate the time duration.

As shown in FIG. 22, the wireless device may transmit the first UL signal 2230. For example, the wireless device may, in response to the second DL message being received after the time duration, transmit the first UL signal. The wireless device may, for transmitting the first UL signal, determine the transmission time of the first UL signal (e.g., in the UL configuration/frame) being outside the first processing window from receiving the first DL message (e.g., in the DL configuration/frame). For example, the wireless device, based on reusing the HARQ process for the second DL message (e.g., transmitting the second UL signal), transmit the first UL signal. For example, the wireless device may transmit the first uplink signal at a first time. For example, the first time may be within or after the time duration from receiving the first DL message. In some cases, the wireless device may transmit the first UL signal irrespective of (or not considering) the second DL message being received before the transmission time of the first UL signal. In an example, the wireless device may transmit the first UL signal irrespective of (or not considering or regardless of) whether the transmission time of the first UL signal being within the time duration from receiving first DL message or outside the time duration from receiving first DL message. In some other cases, the wireless device may transmit the first UL signal irrespective (or not considering or regardless of) the transmission time of the second UL signal being before the transmission time of the first UL signal.

As shown in FIG. 22, the wireless device may transmit the second UL signal 2240. For example, the wireless device may, in response to the second DL message being received after the time duration, transmit the second UL signal. In some cases, the wireless device may, for transmitting the second UL signal, determine the transmission time of the second UL signal (e.g., in the UL configuration/frame) being outside the second processing window from receiving the second DL message (e.g., in the DL configuration/frame). For example, the wireless device, based on reusing the HARQ process for the second DL message, transmit the second UL signal.

In an example embodiment, the wireless device may identify/determine the HARQ process for the second DL message being reused regardless of whether the first UL signal is transmitted or not. For example, the wireless device may transmit the second uplink signal at a second time. For example, the second time may be within or after the time duration from receiving the first DL message. In some cases, the wireless device may transmit the second UL signal irrespective of (or not considering or regardless of) the second DL message being received before the transmission time of the first UL signal. In some other cases, the wireless device may transmit the second UL signal irrespective of (or not considering or regardless of) whether the transmission time of the second UL signal being within the time duration from receiving first DL message or outside the time duration from receiving first DL message. In some other cases, the wireless device may transmit the second UL signal irrespective (or not considering or regardless of) the transmission time of the second UL signal being before the transmission time of the first UL signal.

Example embodiments of the present disclosure may allow the wireless device to reuse the HARQ process when the base station does not know (or have information on) the TA of the wireless device and/or inaccurately/incompletely/partially knows the TA of the wireless device. Based on the embodiments of the present disclosure, the wireless device may properly reuse the HARQ process for the second DL message when the base station has uncertainty in determining when the first UL signal is transmitted at the wireless device.

Figure 23:
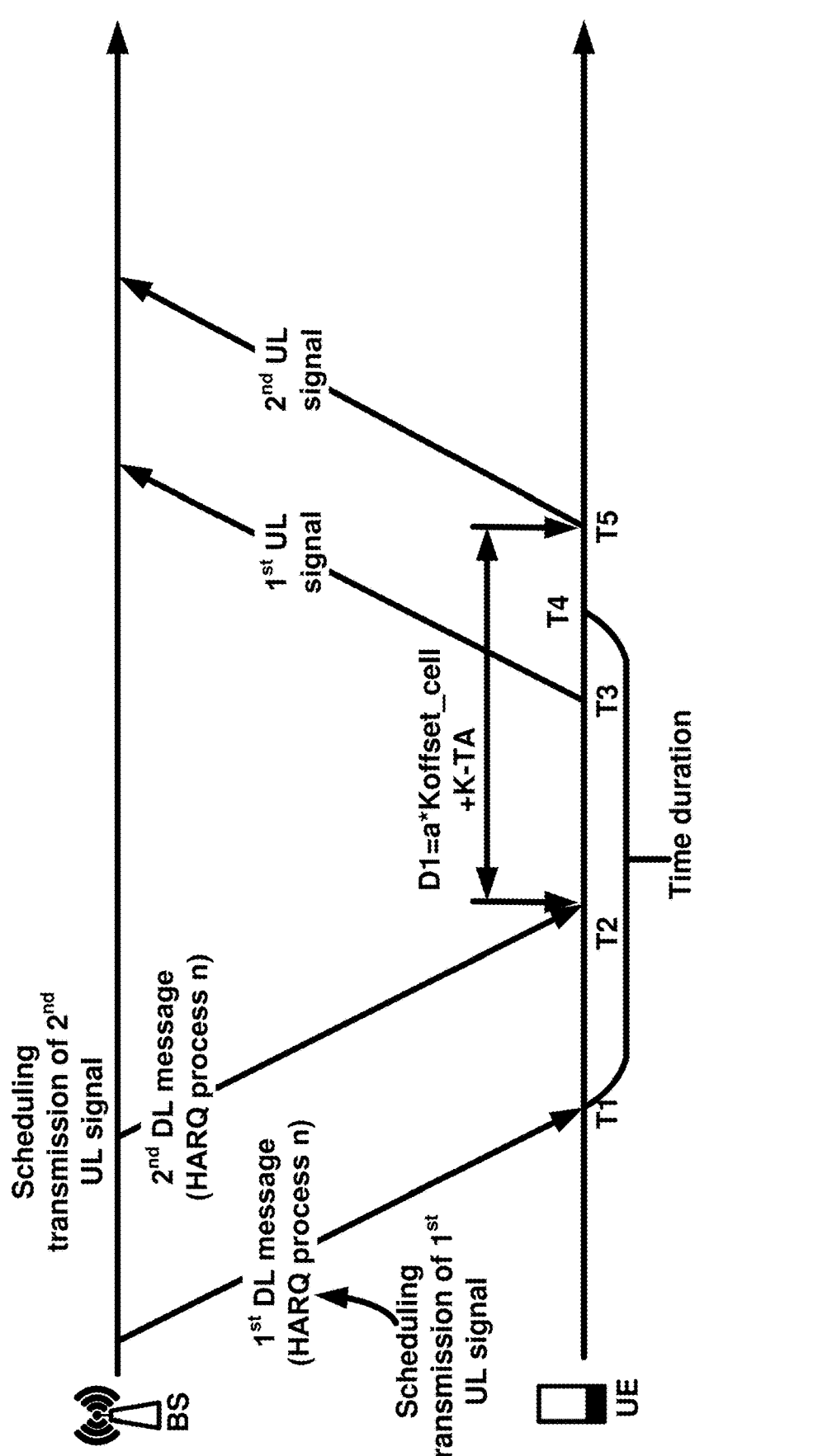
FIG. 23 shows an example embodiment of a method that supports reusing HARQ process in wireless communications systems per an aspect of the present disclosure.

FIG. 23 shows an example embodiment of a method that supports reusing HARQ process in wireless communications systems per an aspect of the present disclosure. FIG. 23 may, for example, show an implementation of the method (or a process) for reusing the HARQ process at a base station and/or a wireless device. The base station may communicate with the wireless device. For example, the wireless device may be in an RRC_CONNECTED state/mode. The wireless device may, for example, communicate with the base station after performing an initial access. The wireless device may, for example, communicate with the base station via a non-terrestrial network (NTN), e.g., the wireless device and the base station may operate in the NTN and/or the base station may be an NTN base station.

For example, the wireless device may receive the first DL message (e.g., the first DCI) at time T1. As shown in FIG. 23, the first DL message may, for example, schedule/indicate transmission of the first UL signal (e.g., the first PUSCH) corresponding to the HARQ process with index/number/ID n. The transmission time of the first UL signal may be D ms ahead of the receiving the first DL message at time T1, e.g., a time difference between the transmission time of the first UL signal and receiving the first DL message is D ms. In an example, $D=a*Koffset\_cell-TA+K$, wherein the timing offset K is determined by the wireless device based on the first DL message, the first scheduling offset, and/or the one or more configuration parameters. For example, the parameter D may further be based on one or more numerologies (e.g., a numerology that is used for transmission of the second UL signal and a numerology that is used for reception of the second DL message). As shown in FIG. 23, the transmission time of the first UL signal may be within the time duration from/after the receiving the first DL message. In some cases, the transmission time of the first UL signal may be after (or outside of) the time duration from/after the receiving the first DL message. In FIG. 23, parameter a may depend on a numerology for transmission of the first UL signal (mu_1) and/or a numerology for receiving the cell-specific timing offset (mu_2), e.g., $a=2^{(mu\_1-mu\_2)}$.

As shown in FIG. 23, the wireless device may receive the second DL message (e.g., the second DCI) within the time duration from/after receiving the first DL message at time T2. The second DL message may schedule transmission of the second UL signal corresponding to the HARQ process. In some cases, the reception time of the second DL message may be before the transmission time of the first UL signal (see FIG. 23). In some other cases, the reception time of the second DL message may be after (or collide/overlap with) the transmission time of the first UL signal.

In one implementation, the base station may, before receiving the first UL signal, reuse the HARQ process for the second DL message without knowing (or with inaccurately/partially knowing or without having information on) the transmission time of the first UL signal at the wireless device. For example, the base station may, before receiving the first UL signal, reuse the HARQ process for the second DL message without considering the transmission time of the first UL signal.

In an example embodiment, the wireless device may determine to reuse the (same) HARQ process for the second DL message. In an example embodiment, based on receiving the first DL message, the wireless device may determine to reuse the HARQ process for the transmission of the second UL signal that is indicated/scheduled by the first DL message. For example, the wireless device may receive (or decode or process information of) the second DL message within the time duration after/from receiving the first DL message. For example, the wireless device may determine that the base station does not know (or does not have information on) the TA of the wireless device and/or the base station inaccurately/partially/incompletely knows the TA of the wireless device. For example, the wireless device may determine the reusing condition of the HARQ process being satisfied. In some cases, the wireless device may determine the time duration. For example, the wireless device may determine the second DL message being received within the time duration from receiving the first DL message.

For example, the wireless device may determine a transmission time/occasion of the second UL signal (e.g., time T5 in FIG. 23). In an example, in response to reusing the HARQ process for the second DL message, the wireless device may process an UL grant indicated by the second DL message for transmission of the second UL signal. In an example embodiment, in response to reusing the HARQ process for the second DL message, the wireless device may determine the transmission time/occasion of the second UL signal, e.g., based on at least a second scheduling offset, a timing offset, and/or the one or more configuration parameters. For example, the wireless device may determine the transmission time of the second UL signal being outside of the time duration, e.g., after the time duration from receiving the first DL message. As shown in FIG. 23, the wireless device may transmit the second UL signal. For example, based on the transmission time of the second UL signal (in the UL frame) being after (or outside of) the first processing window from the reception time of the second DL message (in the DL frame), the wireless device may transmit the second UL signal.

As shown in FIG. 23, the transmission time of the second UL signal may be D1 ms ahead of the receiving the second DL message at time T2, e.g., a time difference between the transmission time of the second UL signal (in the UL frame) and receiving the second DL message (in the DL message) is D1 ms. For example, a first/initial/starting/earliest symbol of the second UL signal may be D1 ms away from (or ahead of) a last/final/ending/latest symbol of the second DL message. In some cases, the wireless device may determine the transmission time of the second UL signal using (or based on) the cell-specific timing offset (e.g., Koffset_cell), a timing offset K (e.g., K2 or K1), and/or the TA of the wireless device (e.g., the current TA value). The timing offset parameter K may indicate a timing offset for transmission of the second UL signal in response to receiving the second DL message.

In some cases, the wireless device may determine the timing offset based on a second scheduling offset. For example, the second DCI may comprise a field (e.g., a 'Time domain resource assignment'). The field (or the value of the field) may indicate the second scheduling offset. In some other cases, the wireless device may determine the second scheduling offset based on an indication of timing for transmission of ACK/NACK indicated by a DCI. In an example, the DCI may schedule/indicate transmission of the second PDSCH or the second slot aggregated PDSCH. For example, the DCI may comprise a field (e.g., a 'PDSCH-to-HARQ_feedback timing indicator'). The field (or the value of the field) may indicate the second scheduling offset. In some implementations, when the second DL message comprises the DL SPS transmission, the wireless device may determine the second scheduling offset based on an indication of timing for transmission of ACK/NACK with accordance to (or using or indicated by) the one or more configuration parameters (e.g., SPS-Config and/or PUCCH-Config).

In an example embodiment, the wireless device may determine the transmission time of the second UL signal being within the time duration from/after receiving the first DL message. For example, the wireless device may refrain from transmitting (or not transmit) the second UL signal. In an example, the wireless device my drop/stop/finish the processing of the UL grant indicated by the second DL message for transmission of the second UL signal.

Example embodiments may allow the wireless device to reuse the HARQ process when the base station does not know the TA of the wireless device and/or inaccurately/incompletely/partially knows the TA of the wireless device. Based on some example embodiments of the present disclosure, the wireless device may properly reuse the HARQ process for the second DL message when the base station has uncertainty in determining when the first UL signal is transmitted at the wireless device. For example, by reusing the HARQ process, it may be possible to reduce the number of HARQ processes and/or the size of DCI, e.g., the first DCI and/or the second DCI.

Figure 24:
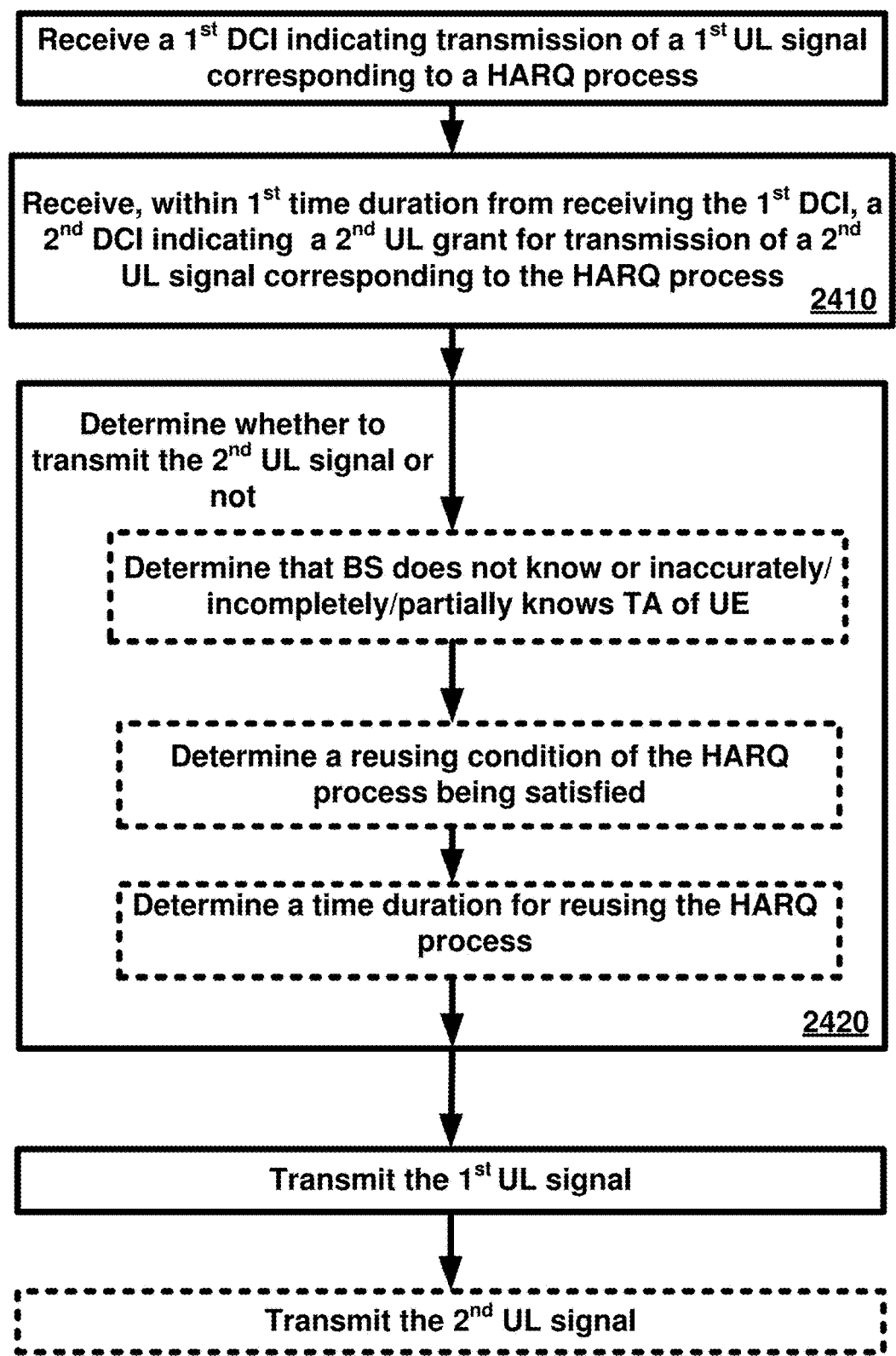
FIG. 24 shows a flowchart illustrating a method that supports reusing HARQ process per an aspect of the present disclosure.

FIG. 24 shows a flowchart illustrating a method that supports reusing HARQ process per an aspect of the present disclosure. The method of FIG. 24 may be implemented by/at a wireless device. A base station may communicate with the wireless device. For example, the wireless device may be in an RRC_CONNECTED state/mode. The wireless device may, for example, communicate with the base station after performing the initial access. The wireless device may, for example, communicate with the base station via a non-terrestrial network (NTN), e.g., the wireless device and the base station may operate in the NTN and/or the base station may be an NTN base station.

As shown in FIG. 24, the wireless device may receive the first DL message scheduling transmission of the first UL signal corresponding to the HARQ process. For example, the wireless device may receive the second DL message within a first time duration after/from receiving the first DL message 2410. The second DL message may schedule transmission of the second UL signal corresponding to the HARQ process via a second UL grant. For example, the second DL message may indicate the second UL grant. In some cases, the reception time of the second DL message (e.g., in the DL frame) may be before the transmission time of the first UL signal (e.g., in the UL frame). In some other cases, the reception time of the second DL message may be after the transmission time of the first UL signal. In some examples, the reception time of the second DL message may be collide/overlap (partially) with the transmission time of the first UL signal.

In an example, the first time duration may be the time duration. In another example, the first time duration may be different than the time duration. In some implementations, the first time may be based on the transmission time of the first UL signal (e.g., in the UL frame). Referring also to FIG. 20A (or FIG. 20B), the transmission time of the first UL signal may be D ms ahead of the receiving the first DL message, e.g., the time difference between the transmission time of the first UL signal and receiving the first DL message may be D ms.

As shown in FIG. 24, the wireless device may, after or in response to receiving the second DL message, determine whether to transmit the second UL signal or not 2420. In an example, the wireless device may determine/identify the transmission time of the second UL signal being outside/after the second processing window after/from receiving the second DL message. For example, the wireless device may (or may not) transmit the second UL signal based on receiving the second DL message within the first time duration from/after receiving the first DL message. For example, the wireless device may (or may not) process the second UL grant (indicated by the second DL message) for transmission of the second UL signal based on receiving the second DL message within the first time duration from/after receiving the first DL message.

In some implementations, the wireless device may determine reusing the HARQ process for the second DL message, e.g., for receiving the second DL message and/or for transmitting the second UL signal and/or processing the second UL grant. In response to reusing the HARQ process for the second DL message (e.g., for receiving the second DL message and/or for transmitting the second UL signal and/or processing the second UL grant), the wireless device may process the second UL grant and/or transmit the second UL signal.

In some examples, in response to not reusing the HARQ process for the second DL message (e.g., for receiving the second DL message and/or for transmitting the second UL signal and/or processing the second UL grant), the wireless device may not process (or stop/drop processing of) the second UL grant and/or refrain from transmit the second UL signal.

In some cases, determining, by the wireless device, to reuse the HARQ process for the second DL message may be based on determining that the base station does not know (or have information on) the TA of the wireless device or has inaccurate/partial/incomplete knowledge of the TA of the wireless device. For example, determining, by the wireless device, to reuse the HARQ process for the second DL message may be based on the reusing condition of the HARQ process being satisfied at/by the wireless device (and/or at/by the base station). In an example embodiment, as shown in FIG. 24, the wireless device may, for reusing the HARQ process for the second DL message, determine the time duration. For example, the wireless device may optionally determine the time duration. In another cases, the time duration may be indicated/configured by the one or more configuration parameters (e.g., the one or more RRC configuration parameters) and/or the one or more NTN specific configuration parameters. In some cases, the wireless device may use the one or more configuration parameters and/or the at least one indication to determine/calculate the time duration.

As shown in FIG. 24, the wireless device may transmit the first UL signal. In an example, the wireless device may determine the transmission time of the first UL signal (e.g., in the UL frame) being outside/after the first processing window after/from receiving the first DL message (e.g., in the DL frame). For example, the wireless device may, in response to the second DL message being received within the first time duration from/after receiving the first DL message, transmit the first UL signal. For example, the wireless device, based on reusing the HARQ process for the second DL message, transmit the first UL signal.

As shown in FIG. 24, the wireless device may transmit the second UL signal. In an example, the wireless device may determine the transmission time of the second UL signal (e.g., in the UL frame) being outside/after the second processing window after/from receiving the second DL message (e.g., in the DL frame). For example, the wireless device may, in response to the second DL message being received within the first time duration from/after receiving the first DL message, transmit the second UL signal. For example, the wireless device, based on reusing the HARQ process for the second DL message, transmit the second UL signal.

In an example embodiment, the wireless device may identify/determine the HARQ process for the second DL message being reused regardless of whether the first UL signal is transmitted (or is scheduled to be transmitted) or not. For example, the wireless device may transmit the second uplink signal at a second time. For example, the second time may be within or after the first time duration from receiving the first DL message. In some cases, the wireless device may transmit the second UL signal irrespective of (or not considering or regardless of) the second DL message being received before the transmission time of the first UL signal. In some other cases, the wireless device may transmit the second UL signal irrespective of (or not considering or regardless of) whether the transmission time of the second UL signal being within the first time duration from receiving first DL message or outside the first time duration from receiving first DL message. In some other cases, the wireless device may transmit the second UL signal irrespective (or not considering or regardless of) the transmission time of the second UL signal being before the transmission time of the first UL signal.

In some cases, for determining whether or not to transmit the second UL signal, the wireless device may determine/identify one or more time distances. A first time distance of/among the one or more time distances may be based on a time difference between the reception time of the second DL message and the reception time of the first DL message. A second time distance of/among the one or more time distances may be based on a time difference between the transmission time of the second UL signal and the transmission time of the first UL signal. A third time distance of/among the one or more time distances may be based on a time difference between the transmission time of the second UL signal and the reception time of the first DL message. In some other cases, the one or more time distances may be based on the first scheduling offset and/or the second scheduling offset.

For example, the wireless device may determine the first scheduling offset based on a field (a field with a value) of the first DL message (e.g., the 'Time domain resource assignment' and/or the 'PUSCH time resource allocation' and/or the 'PDSCH-to-HARQ_feedback timing indicator') and/or the one or more configuration parameters.

For example, the wireless device may determine the second scheduling offset based on a field (a field with a value) of the second DL message (e.g., the 'Time domain resource assignment' and/or the 'PUSCH time resource allocation' and/or the 'PDSCH-to-HARQ_feedback timing indicator') and/or the one or more configuration parameters.

In some cases, the one or more time distances may be based on at least one of the following: a number of symbols (or the length, in time domain) of the first UL signal, a number of symbols (or the length, in time domain) of the second UL signal, processing capability/time of the wireless device (e.g., the at least one processing/preparation time of the wireless device), a DM-RS pattern associated with the first UL signal and/or the second UL signal, a numerology of the first (or the second) DL message, and/or a numerology of the first (or the second) UL signal.

In an example embodiment, for determining to transmit the second UL signal, the wireless device may determine a timing condition being satisfied. For example, the wireless device may determine the timing condition being satisfied based on at least one of the following: the first time distance being larger than a first threshold, the second time distance being larger than a second threshold, and/or the third time distance being larger than a third threshold. For example, the first threshold, the second threshold, and the third threshold may be predefined and/or preconfigured (e.g., via the one or more configuration parameters). In some cases, the first threshold, the second threshold, and the third threshold may (or may not) be the same. In some cases, the first threshold, the second threshold, and the third threshold may depend on (or based on) a processing capability of the wireless device, e.g., the at least one processing/preparation time of the wireless device (e.g., $T_{proc,2}$). In some cases, the wireless device may determine the transmission time of the second UL signal being outside/after the second processing window after/from receiving the second DL message.

Example embodiments of the present disclosure may allow the wireless device to reuse the HARQ process when the base station does not know the TA of the wireless device and/or inaccurately/incompletely/partially knows the TA of the wireless device. Based on the embodiments of the present disclosure, the wireless device may properly reuse the HARQ process for the second DL message when the base station has uncertainty in determining when the first UL signal is transmitted at the wireless device.

Figure 25:
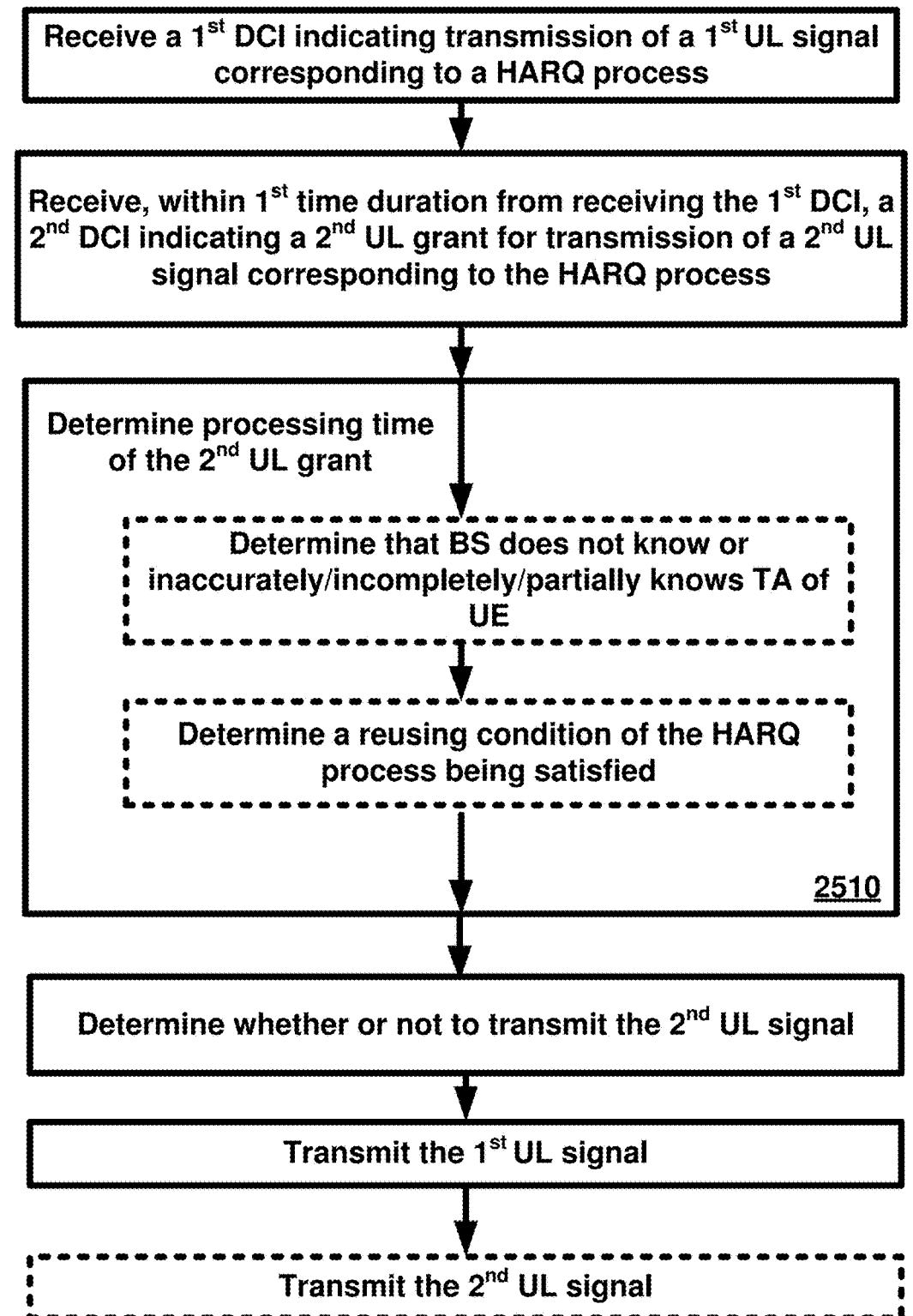
FIG. 25 shows a flowchart illustrating a method that supports reusing HARQ process per an aspect of the present disclosure.

FIG. 25 shows a flowchart illustrating a method that supports reusing HARQ process per an aspect of the present disclosure. The method of FIG. 25 may be implemented by/at a wireless device. A base station may communicate with the wireless device. For example, the wireless device may be in an RRC_CONNECTED state/mode. The wireless device may, for example, communicate with the base station after performing the initial access. The wireless device may, for example, communicate with the base station via a non-terrestrial network (NTN), e.g., the wireless device and the base station may operate in the NTN and/or the base station may be an NTN base station.

As shown in FIG. 25, the wireless device may receive the first DL message scheduling transmission of the first UL signal corresponding to the HARQ process. For example, the wireless device may receive the second DL message within the first time duration after/from receiving the first DL message. The second DL message may schedule transmission of the second UL signal corresponding to the HARQ process via the second UL grant.

As shown in FIG. 25, the wireless device may, after (or based on) receiving the second DL message, determine a processing time of the second UL grant 2510. For example, in response to receiving the second DL message within the first time duration, the wireless device may determine the processing time of the second UL grant for transmission of the second UL signal. In some implementations, the wireless device may determine reusing the HARQ process for determining the processing time of the second UL grant. In response to reusing the HARQ process for determining the processing time the second UL grant, the wireless device may process the second UL grant based on the (determined) processing time of the second UL grant. In some cases, determining, by the wireless device, to reuse the HARQ process for the second DL message may be based on determining that the base station does not know (or have information on) the TA of the wireless device or has inaccurate/partial/incomplete knowledge of the TA of the wireless device. For example, determining, by the wireless device, to reuse the HARQ process for the second DL message may be based on the reusing condition of the HARQ process being satisfied at/by the wireless device (and/or at/by the base station). For example, determining, by the wireless device, to reuse the HARQ process for the second DL message may be based on determining the time duration.

In an example embodiment, the wireless device may determine the processing time of the second UL grant based on (or using) a first processing offset and/or a second processing offset. In some implementations, the second processing offset may be based on the second processing window. For example, the second processing offset may be based on at least one processing/preparation time of the physical layer of the wireless device, e.g., a processing/preparation time of PUSCH (e.g., $T_{proc,2}$) and/or a processing/preparation time of PDSCH/PUCCH (e.g., $T_{proc,1}$). In some implementations, the second processing offset may be predefined (e.g., hardcoded) and/or preconfigured (e.g., via the one or more configuration parameters).

In an example embodiment, for determine the processing time of the second UL grant, the wireless device may increase (or prolong/extend) the at least one processing/preparation time of the physical layer of the wireless device by the first processing offset (e.g., an extended second processing window). For example, for determine the processing time of the second UL grant (e.g., the extended second processing window), the wireless device may add/sum the second processing window (or duration) by the first processing time. In an example, to determine the extended second processing window), the wireless device may increase the second processing window by the first processing time.

In some cases, the first processing offset may be based on the first time duration. For example, the first offset may be based on a time difference between a transmission time of the first uplink signal (in the UL frame) and a reception time of the second DL message (in the DL frame), e.g., when the wireless device receives the second DL message before or not after transmitting the first UL signal. In some cases, the first offset may be based on a remained time of the first time duration after/from the reception time of the second DL message, e.g., when the first time duration is equal to (or based on) the time duration. In some cases, the first processing offset may be predefined (e.g., hardcoded for the wireless device and/or specified by the specifications of the 3GPP standard). In some other cases, the one or more configuration parameters may indicate/configure the first processing offset. For example, the first processing offset may be preconfigured.

As shown in FIG. 25, the wireless device may transmit the first UL signal. In some cases, the wireless device may determine the transmission time of the first UL signal being outside/after the first processing window after/from receiving the first DL message. In an example, for transmitting the first UL signal the wireless device may determine the transmission time of the first UL signal being at least the first processing time after/from the reception of the first DL message. For example, the wireless device may, in response to the second DL message being received within the first time duration from/after receiving the first DL message, transmit the first UL signal. For example, the wireless device, based on the determined processing time of the second UL grant being larger than the second processing window (or duration), transmit the first UL signal.

As shown in FIG. 25, the wireless device may, based on the determined processing time of the second UL grant, determine whether to transmit the second UL signal or not. In an example, the wireless device may determine the transmission time of the second uplink signal being after the determined processing time of the second UL grant from/after the receiving the second DL message. For example, in response to the transmission time of the second uplink signal being after the determined processing time of the second UL grant from/after the receiving the second DL message, the wireless device may transmit the second UL signal. For example, in response to the transmission time of the second uplink signal being before the determined processing time of the second UL grant from/after the receiving the second DL message, the wireless device may refrain from transmitting (or not transmitting) the second UL signal. In some implementations, the wireless device may transmit the second UL signal based on the transmission time of the second UL signal being outside/after the extended second processing window after/from receiving the second DL message.

Example embodiments may allow the wireless device to reduce processing load (or complexity) for UL/DL transmissions/communication. Some embodiments may allow the wireless device to transmit the second UL signal when parallel processing of UL signals corresponding to the (same) HARQ process is not supported or is difficult (e.g., increases the processing complexity of the wireless device) to implement. For example, by increasing the processing time of the second UL grant by the first processing offset, the wireless device may balance the processing complexity/power of the wireless device between the first UL signal and the second UL signal.

Some embodiments may allow the wireless device to process the second UL grant (for the transmission of the second UL signal) when the UE-specific timing offset is not indicated to the wireless device and/or when the time difference between transmission of (e.g., a first/starting/earliest/initial symbol of) the first UL signal and reception of (e.g., a last/ending/latest/final symbol of) the first DL message is large (e.g., 2-5 ms in LEO satellite or 2-20 ms in GEO satellite).

Figure 26:
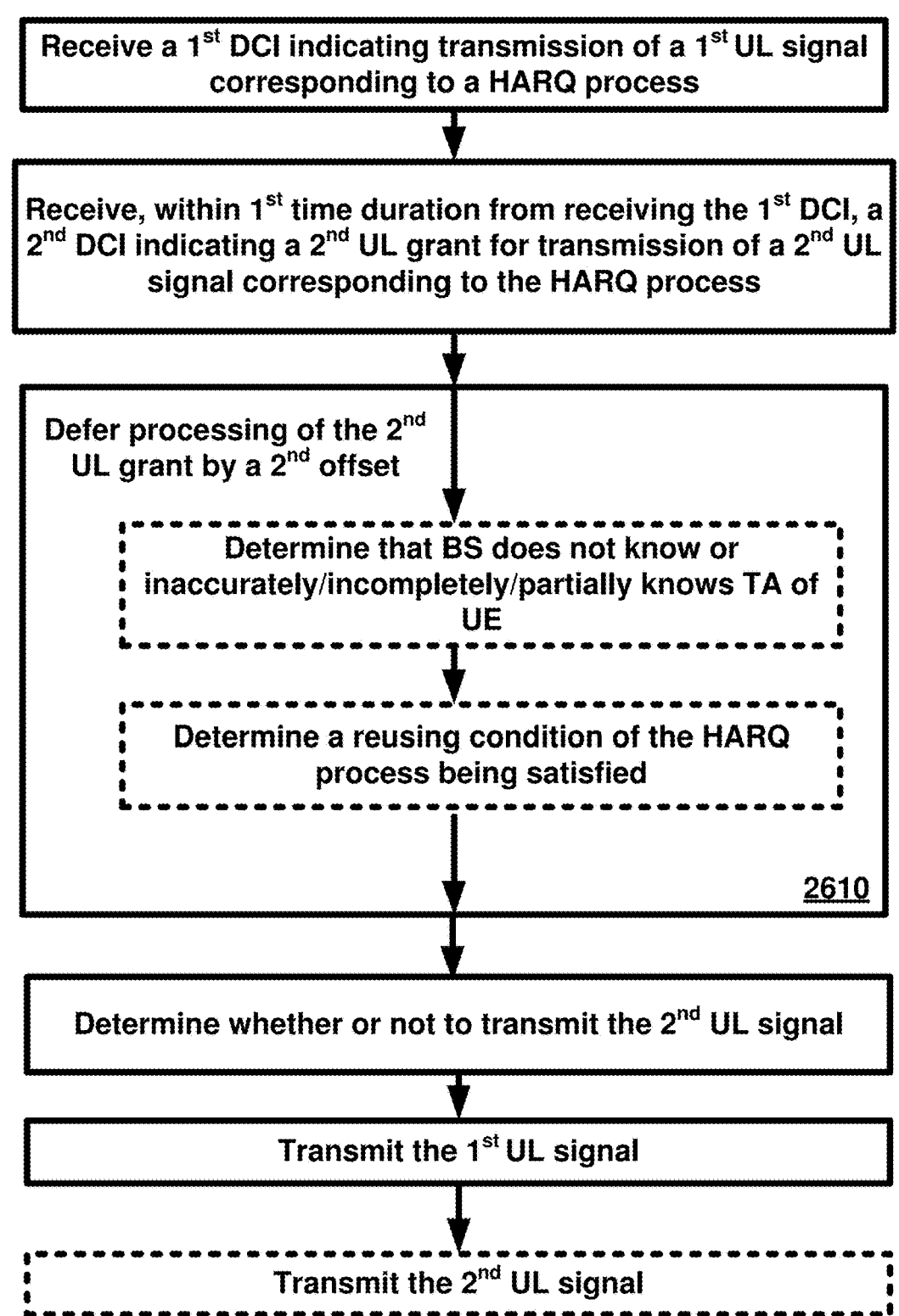
FIG. 26 shows a flowchart illustrating a method that supports reusing HARQ process per an aspect of the present disclosure.

FIG. 26 shows a flowchart illustrating a method that supports reusing HARQ process per an aspect of the present disclosure. The method of FIG. 26 may be implemented by/at a wireless device. A base station may communicate with the wireless device. For example, the wireless device may be in an RRC_CONNECTED state/mode. The wireless device may, for example, communicate with the base station after performing the initial access. The wireless device may, for example, communicate with the base station via a non-terrestrial network (NTN), e.g., the wireless device and the base station may operate in the NTN and/or the base station may be an NTN base station.

As shown in FIG. 26, the wireless device may receive the first DL message scheduling transmission of the first UL signal corresponding to the HARQ process. For example, the wireless device may receive the second DL message within the first time duration after/from receiving the first DL message. The second DL message may schedule transmission of the second UL signal corresponding to the HARQ process via the second UL grant.

As shown in FIG. 26, the wireless device may, after (or based on) receiving the second DL message, defer (or postpone or delay) processing of the second UL grant 2610. For example, in response to receiving the second DL message within the first time duration, the wireless device may determine deferring the processing of the second UL grant for transmission of the second UL signal. In some implementations, the wireless device may determine reusing the HARQ process for deferring processing of the second UL grant. In some cases, determining, by the wireless device, to reuse the HARQ process for the second DL message may be based on determining that the base station does not know (or have information on) the TA of the wireless device or has inaccurate/partial/incomplete knowledge of the TA of the wireless device. For example, determining, by the wireless device, to reuse the HARQ process for the second DL message may be based on the reusing condition of the HARQ process being satisfied at/by the wireless device (and/or at/by the base station). For example, determining, by the wireless device, to reuse the HARQ process for the second DL message may be based on determining the time duration.

In an example embodiment, in response to deferring processing of the second UL grant, the wireless device may start the processing the second UL grant after a third processing offset after/from receiving the second DL message. For example, the wireless device may process the second UL grant based on the second processing offset (e.g., the processing/preparation time of PUSCH (e.g., $T_{proc,2}$) and/or the processing/preparation time of PUCCH (e.g., $T_{proc,1}$).

In some implementations, in response to deferring processing of the second UL grant, the wireless device may halt/suspend the processing the second UL grant for (or during) a window (e.g., a delayed/deferred second processing window) with length of the third processing offset after/from receiving the second DL message. The wireless device may resume the processing of the second UL grant after the third processing offset after/from receiving the second DL message, e.g., when (or after or once) the delayed second processing window expires.

In some other implementations, in response to deferring processing of the second UL grant, the wireless device may resume the processing the second UL grant after the third processing offset after/from receiving the second DL message, e.g., when (or after or once) the delayed second processing window expires.

In some other implementations, in response to deferring processing of the second UL grant, the wireless device may delay the processing the second UL grant for (or during) the third processing offset after/from receiving the second DL message, e.g., while the delayed second processing window is running. In some cases, the wireless device may delay a start of the second processing window by the third processing offset.

In an example, the third processing offset may be based on the first time duration. For example, the third offset may be based on the time difference between the transmission time of the first uplink signal (in the UL frame) and the reception time of the second DL message (in the DL message), e.g., when the wireless device receives the second DL message before transmitting the first UL signal. In some cases, the third offset may be based on the remained time of the first time duration after/from the reception time of the second DL message, e.g., when the first time duration is based on the time duration. In some cases, the third processing offset may be predefined (e.g., hardcoded for the wireless device and/or specified by the specifications of the 3GPP standard). In some other cases, the one or more configuration parameters may indicate/configure the third processing offset. For example, the third processing offset may be preconfigured. In an example, the third processing time is the first processing time.

As shown in FIG. 26, the wireless device may transmit the first UL signal. In an example, for transmitting the first UL signal the wireless device may determine the transmission time of the first UL signal (in the UL frame) being at least the second processing window (or duration) after/from the reception of the first DL message (in the DL frame). For example, the wireless device may, in response to the second DL message being received within the first time duration from/after receiving the first DL message, transmit the first UL signal. For example, the wireless device, based on the delayed second processing window being running (e.g., processing of the second UL grant being deferred), transmit the first UL signal. For example, the wireless device, based on the delayed second processing window being expired, transmit the first UL signal.

In an example embodiment, as shown in FIG. 26, the wireless device may, based on the deferring the processing time of the second UL grant by the third processing offset, determine whether to transmit the second UL signal or not. The wireless device may, for example, determine the transmission time of the second UL signal (in the UL frame) being after the summation of the third processing offset and the second processing offset from/after the receiving the second DL message (in the DL frame). For example, the wireless device may determine the transmission time of the second UL signal being after the delayed second processing window from/after receiving the second DL message. In some implementations, the wireless device may transmit the second UL signal, e.g., in response to the transmission time of the second UL signal being after the summation of the third processing offset and the second processing offset from/after the receiving the second DL message. In some other implementations, the wireless device may transmit the second UL signal based on the transmission time of the second UL signal being outside the delayed second processing window from/after the receiving the second DL message.

In an example, the wireless device may determine the transmission time of the second UL signal being before the summation of the third processing offset and the second processing offset from/after the receiving the second DL message (e.g., before the expiry of the delayed second processing window). For example, the wireless device may determine the transmission time of the second UL signal being before/within the second processing window (or duration) after the third processing offset from/after receiving the second DL message. For example, in response to the transmission time of the second uplink signal being before the determined processing time of the second UL grant from/after the receiving the second DL message, the wireless device may refrain from transmitting (or not transmitting) the second UL signal. In some implementations, the wireless device may not transmit the second UL signal based on the transmission time of the second UL signal being within the delayed second processing window from/after the receiving the second DL message.

Example embodiments may allow the wireless device to reduce processing load (or complexity) for UL/DL transmissions/communication. Some embodiments may allow the wireless device to transmit the second UL signal when parallel processing of UL signals corresponding to the (same) HARQ process is not supported. Some embodiments may allow the wireless device to delay/defer processing of the second UL grant.

Figure 27:
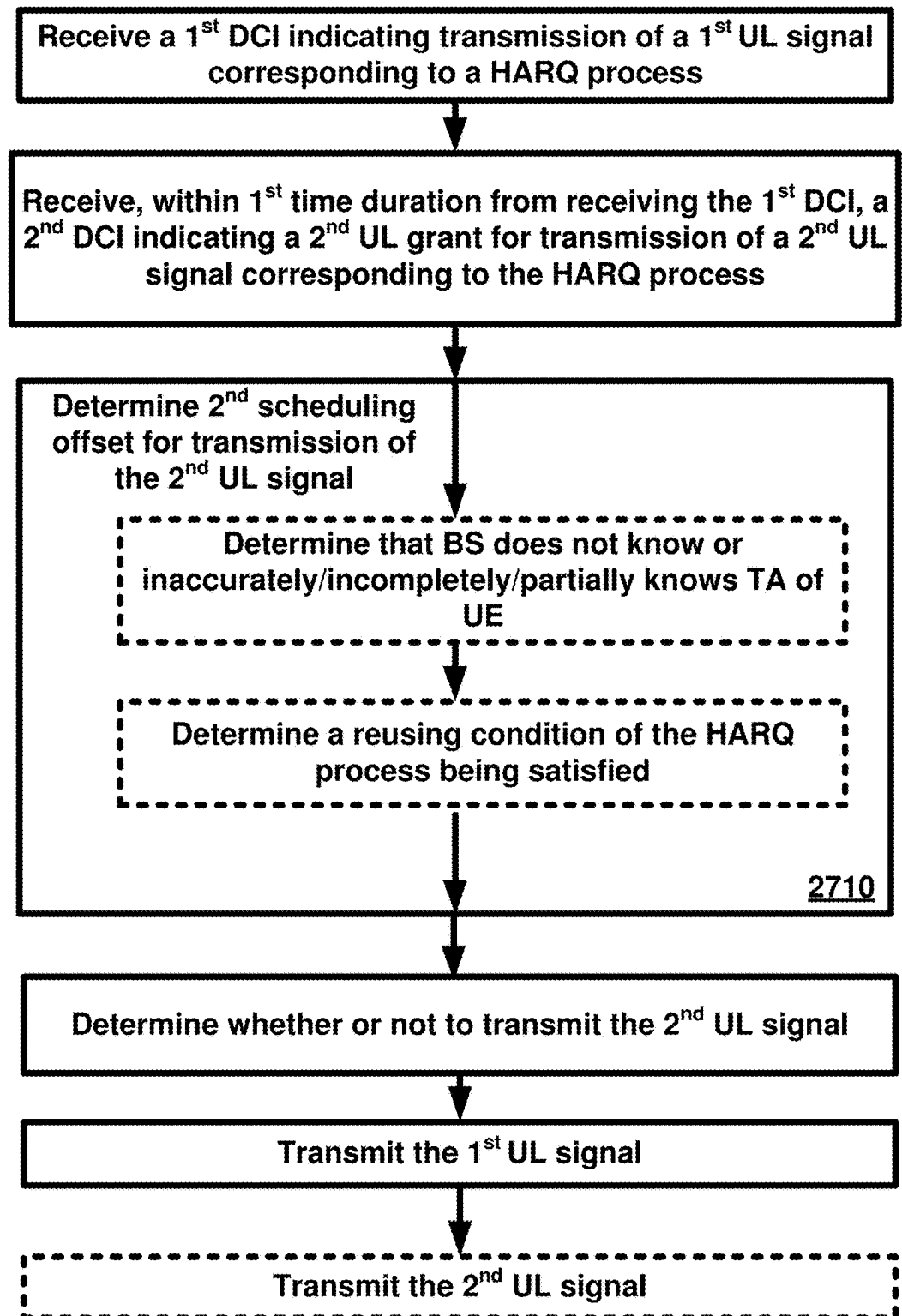
FIG. 27 shows a flowchart illustrating a method that supports reusing HARQ process per an aspect of the present disclosure.

FIG. 27 shows a flowchart illustrating a method that supports reusing HARQ process per an aspect of the present disclosure. The method of FIG. 27 may be implemented by/at a wireless device. A base station may communicate with the wireless device. For example, the wireless device may be in an RRC_CONNECTED state/mode. The wireless device may, for example, communicate with the base station after performing the initial access. The wireless device may, for example, communicate with the base station via a non-terrestrial network (NTN), e.g., the wireless device and the base station may operate in the NTN and/or the base station may be an NTN base station.

As shown in FIG. 27, the wireless device may receive the first DL message scheduling transmission of the first UL signal corresponding to the HARQ process. In an example, the wireless device may determine the first scheduling offset (e.g., a timing offset K) in response to (or after) receiving the first DL message (e.g., the first DCI).

As shown in FIG. 27, the wireless device may receive the second DL message within the first time duration after/from receiving the first DL message. The second DL message may schedule transmission of the second UL signal corresponding to the HARQ process via the second UL grant.

As shown in FIG. 27, the wireless device may, after (or based on) receiving the second DL message, determine a second scheduling offset (e.g., a timing offset K). The second scheduling offset may indicate the timing offset for transmission of the second UL signal in response to receiving the second DL message. In an example embodiment, the wireless device may determine the second scheduling offset based on a first value and/or a second value. In some implementations, the wireless device may determine the second scheduling offset by summing/adding the first value and the second value. In some implementations, the wireless device may determine reusing the HARQ process for determining the second scheduling offset. In some cases, determining, by the wireless device, to reuse the HARQ process for the second DL message may be based on determining that the base station does not know (or have information on) the TA of the wireless device or has inaccurate/partial/incomplete knowledge of the TA of the wireless device. For example, determining, by the wireless device, to reuse the HARQ process for the second DL message may be based on the reusing condition of the HARQ process being satisfied at/by the wireless device (and/or at/by the base station). For example, determining, by the wireless device, to reuse the HARQ process for the second DL message may be based on determining the time duration.

For example, the first DCI may comprise a field (e.g., a 'Time domain resource assignment'). The field (or the value of the field) may indicate the second value. For example, the wireless device may determine the second value based on an indication of timing for transmission of ACK/NACK indicated by a DCI. In an example, the DCI may schedule/indicate transmission of the second PDSCH or the second slot aggregated PDSCH. For example, the DCI may comprise a field (e.g., a 'PDSCH-to-HARQ_feedback timing indicator'). The field (or the value of the field) may indicate the second value. In another example, when the second DL message comprises a DL SPS transmission, the wireless device may determine the second value based on an indication of timing for transmission of ACK/NACK with accordance to (or using or indicated by) the one or more configuration parameters (e.g., SPS-Config and/or PUCCH-Config).

In an example embodiment, the wireless device may determine the first value based on the first scheduling offset, e.g., the first value is equal to (or larger than or smaller than) the first scheduling offset.

In some implementations, the wireless device may determine the first value based on the first time duration (e.g., the time duration). In some cases, the first value may be based on the remained time of the first time duration after/from the reception time of the second DL message, e.g., when the first time duration is based on the time duration.

For example, the first value may be based on the time difference between the transmission time of the first uplink signal and the reception time of the second DL message, e.g., when the wireless device receives the second DL message before transmitting the first UL signal.

In some cases, the first value may be based on the one or more time distances. For example, the first value may be equal to (or larger than or smaller than) the first time distance. The first value may, for example, be equal to (or larger than or smaller than) the second time distance. In some examples, the first value may be equal to (or larger than or smaller than) the third time distance. In some other examples, the first value may be based on a maximum of (or minimum of) the first time distance, the second time distance, and/or the third time distance.

In some cases, the first value may be predefined (e.g., hardcoded for the wireless device and/or specified by the specifications of the 3GPP standard). In some other cases, the one or more configuration parameters may indicate/configure the first value. For example, the third processing offset may be preconfigured.

In an example embodiment, based on the second value being smaller than the first value, the wireless device may determine the second scheduling offset based on the first value and the second value.

For example, based on the second value being larger than the first value, the wireless device may determine the second scheduling offset based on second value. The wireless device may set/determine the second scheduling offset equal to the second value.

In another example, based on the timing condition being satisfied, the wireless device may determine the second scheduling offset based on second value. In some cases, based on the timing condition not being satisfied, the wireless device may determine the second scheduling offset based on second value and the first value.

As shown in FIG. 27, the wireless device may transmit the first UL signal. In an example, for transmitting the first UL signal the wireless device may determine the transmission time of the first UL signal (in the UL frame) being after the second processing window (or duration) after/from the reception of the first DL message (in the DL frame). For example, the wireless device may, in response to the second DL message being received within the first time duration from/after receiving the first DL message, transmit the first UL signal. For example, the wireless device, based on the second scheduling offset being larger than the first scheduling offset, transmit the first UL signal. For example, the wireless device, based on the second scheduling offset not being larger than the first scheduling offset, transmit the first UL signal.

In an example embodiment, as shown in FIG. 27, the wireless device may, in response to determining the second scheduling offset corresponding to the second UL grant, determine whether to transmit the second UL signal or not. For example, in accordance with the method of FIG. 24, the wireless device may determine whether to transmit the second UL signal or not. In an example, the wireless device may, for transmitting the second UL signal, determine the transmission time of the second UL signal being outside/after the second processing window after/from receiving the second DL message.

In some implementations, the wireless device for transmitting the second UL signal may determine the processing time of the second UL signal (e.g., in accordance with method of FIG. 25). For example, based on the determined processing time of the second UL grant (e.g., based on the first processing offset and/or the second processing offset), the wireless device may determine whether to transmit the second UL signal or not. In an example, the wireless device may transmit the second UL signal based on the transmission time of the second UL signal being outside/after the extended second processing window after/from receiving the second DL message. In another example, the wireless device may refrain from transmitting the second UL signal based on the transmission time of the second UL signal being within (or before) the extended second processing window after/from receiving the second DL message.

In another example, in accordance with the method of FIG. 26, the wireless device for transmitting the second UL signal may defer the processing of the second UL grant. For example, the wireless device may determine the transmission time of the second UL signal being after the second processing window (or duration) after the third processing offset from/after receiving the second DL message. In some implementations, the wireless device may transmit the second UL signal, e.g., in response to the transmission time of the second UL signal being after the summation of the third processing offset and the second processing offset from/after the receiving the second DL message. In some cases, the wireless device may transmit the second UL signal based on the transmission time of the second UL signal being after (or outside of) the delayed second processing window from/after the receiving the second DL message.

In an example, the wireless device may determine the transmission time of the second UL signal being before the summation of the third processing offset and the second processing offset from/after the receiving the second DL message. For example, the wireless device may determine the transmission time of the second UL signal being before (or within) the second processing window (or duration) after the third processing offset from/after receiving the second DL message. In some implementations, the wireless device may not transmit the second UL signal based on the transmission time of the second UL signal being within the delayed second processing window from/after the receiving the second DL message.

Example embodiments may allow the wireless device to reduce processing load (or complexity) for UL/DL transmissions/communication. Some embodiments may allow the wireless device to transmit the second UL signal when parallel processing of UL signals corresponding to the (same) HARQ process is not supported. Some embodiments may allow the wireless device to delay/defer processing of the second UL grant.

In the above description of FIGS. 20-27, operations between the base station and the wireless device may be performed in a different order than the example order shown, or the operations performed by the base station and the wireless device may be performed in different orders or at different times. For example, the operation with reference number 2000 in FIG. 20 may be performed prior to the transmitting a first DL message at/by the base station. In some cases, some operations, shown in FIGS. 20-27, may be performed in different orders that shown or may be performed optionally (e.g., operations with reference numbers 2130, 2140, and 2150 in FIG. 21), e.g., the base station and/or the wireless device may (or may not) omit performing one or more optional operations. In some cases, the operations between the base station and the wireless device may further comprise one or more UL/DL transmissions (e.g., PDSCH, PDCCH, MAC CE command, or the like) which are not shown in FIGS. 20-27. For example, the base station may transmit the one or more configuration parameters (e.g., the one or more RRC configuration parameters) to the wireless device prior to transmitting the first DL message. For example, the wireless device may receive the one or more configuration parameters from the base station prior to receiving the first DL message. In some cases, the one or more configuration parameters may comprise one or more random access (RA) configuration parameters.

An example method comprising: transmitting, by a base station to a wireless device, a first downlink control information (DCI) scheduling transmission of a first uplink signal corresponding to a hybrid automatic repeat request (HARQ) process; determining to reuse the HARQ process for a second DCI scheduling transmission of a second uplink signal based on scheduling transmission of (or determining to transmit) the second DCI after a time duration, for a non-terrestrial network (NTN), from the first DCI; transmitting, to the wireless device, based on the determining, the second DCI scheduling transmission of the second uplink signal corresponding to the HARQ process; receiving, from the wireless device, the first uplink signal; and receiving, from the wireless device, the second uplink signal.

The above example-method, wherein the determining is further in response to a timing advance (TA) of the wireless device being unknown at the base station.

One or more of the above-example methods, wherein the TA of the wireless device being unknown comprises at least one of: a user-equipment (UE) specific TA of the wireless device not being known; a TA information of the wireless device not being known, wherein the TA information comprises a location information of the wireless device or the UE-specific TA of the wireless device; not receiving, from the wireless device, a TA report medium access control (MAC) control element (CE); not transmitting a UE-specific timing offset to the wireless device; a predicator model of the wireless device for calculating the UE-specific TA not being known at the base station; the wireless device not having a GNSS capability; or an accuracy of a GNSS-acquired location information of the wireless device being lower than a threshold.

One or more of the above-example methods, further comprising transmitting one or more configuration parameters to the wireless device.

One or more of the above-example methods, wherein the one or more configuration parameters does not indicate reporting of the TA information to the base station by the wireless device.

One or more of the above-example methods, wherein the determining is further in response to at least one of: not transmitting a UE-specific timing offset to the wireless device; the first uplink signal and the second uplink signal comprising a same transport block; the first uplink signal and the second uplink signal comprising different transport blocks; the one or more configuration parameters indicating the HARQ process not being configured for a blind retransmission of a transport block, wherein the transport block is included in the first uplink signal; the one or more configuration parameters configuring a discontinuous reception (DRX) operation for the wireless device; a number of HARQ processes for uplink transmission being smaller than a threshold, wherein the threshold is indicated by the one or more configuration parameters; a number of HARQ processes for downlink transmission being smaller than a first threshold, wherein the first threshold is indicated by the one or more configuration parameters; the one or more configuration parameters indicating a minimum applicable K0 for the wireless device; the one or more configuration parameters indicating a minimum applicable K1 for the wireless device; a time difference between a transmission time of the first uplink signal and a reception time of the first DCI being larger than a second threshold, wherein the one or more configuration parameters indicate the second threshold; a priority index of the first uplink signal and a priority index of the second uplink signal; a priority of a first logical channel of the first uplink signal and a priority of a second logical channel of the second uplink signal; an antenna polarization at the wireless device; or an antenna polarization of an NTN node, wherein the base station and wireless device are communicating with each other via the NTN node.

One or more of the above-example methods, further comprising determining whether the antenna polarization of the wireless device and the antenna polarization of the NTN node matches or not.

One or more of the above-example methods, wherein the time duration is predefined or preconfigured.

One or more of the above-example methods, wherein the one or more configuration parameters indicate the time duration.

One or more of the above-example methods, further comprising determining the time duration based on at least one of: a propagation delay of a cell, wherein the base station is communicating with the wireless device via the cell; or a cell-specific timing offset.

One or more of the above-example methods, wherein the propagation delay of the cell is at least one of: a minimum round propagation delay (RTD) of the cell; a maximum RTD of the cell; or a common RTD of the cell.

One or more of the above-example methods, wherein the time duration is equal to the subtraction of the propagation delay of the cell from the cell-specific timing offset.

One or more of the above-example methods, wherein the time duration is equal to the cell-specific timing offset.

One or more of the above-example methods, wherein the time duration is equal to the propagation delay of the cell.

One or more of the above-example methods, wherein the determining the time duration is further based on a processing time of physical uplink shared channel (PUSCH).

One or more of the above-example methods, wherein the time duration is a maximum of a first value and the processing time of the PUSCH or a summation of the first value and the processing time of the PUSCH, wherein the first value is based on at least one of: the propagation delay of the cell; or the cell-specific timing offset.

One or more of the above-example methods, wherein the time duration is based on a numerology used for the first uplink signal or the second uplink signal.

One or more of the above-example methods, further comprising transmitting, to the wireless device, one or more configuration parameters indicating the time duration via a first downlink message, wherein the first downlink message is at least one of a radio resource control (RRC) signal, a third DCI, or a MAC CE, wherein the third DCI is different than the first DCI or is the first DCI.

One or more of the above-example methods, wherein the time duration is from: when (or a time/symbol/slot that) the wireless device receives the first DCI; or when (or a time/symbol/slot that) the first DCI is transmitted to the wireless device.

One or more of the above-example methods, wherein the first DCI comprises a first field with a first HARQ process number indicating an index of the HARQ process; and the second DCI comprises a second field with the first HARQ process number.

One or more of the above-example methods, wherein the wireless device and the base station are operating in an NTN.

An example method comprising: transmitting, by a base station to a wireless device, a first downlink control information (DCI) scheduling transmission of a first uplink signal corresponding to a first hybrid automatic repeat request (HARQ) process; determining to transmit, to the wireless device, a second DCI scheduling transmitting a second uplink signal corresponding to a second HARQ process; and based on the first HARQ process and the second HARQ process being the same, transmitting the second DCI after a time duration, for a non-terrestrial network, from the first DCI.

The above example-method, further comprising determining to reuse the HARQ process for the second DCI based on scheduling transmission of the second DCI after the time duration.

One or more of the above-example methods, wherein the determining to reuse the HARQ process for the second DCI is further in response to a timing advance (TA) of the wireless device being unknown at the base station.

One or more of the above-example methods, wherein the TA of the wireless device being unknown comprises at least one of: a user-equipment (UE) specific TA of the wireless device not being known; a TA information of the wireless device not being known, wherein the TA information comprises a location information of the wireless device or the UE-specific TA of the wireless device; not receiving, from the wireless device, a TA report medium access control (MAC) control element (CE); not transmitting a UE-specific timing offset to the wireless device; a predicator model of the wireless device for calculating the UE-specific TA not being known at the base station; the wireless device not having a GNSS capability; or an accuracy of a GNSS-acquired location information of the wireless device being lower than a threshold.

One or more of the above-example methods, further comprising transmitting one or more configuration parameters to the wireless device.

One or more of the above-example methods, wherein the one or more configuration parameters does not indicate reporting of the TA information to the base station by the wireless device.

One or more of the above-example methods, wherein the determining is further in response to at least one of: not transmitting a UE-specific timing offset to the wireless device; the first uplink signal and the second uplink signal comprising a same transport block; the first uplink signal and the second uplink signal comprising different transport blocks; the one or more configuration parameters indicating the HARQ process not being configured for a blind retransmission of a transport block, wherein the transport block is included in the first uplink signal; the one or more configuration parameters configuring a discontinuous reception (DRX) operation for the wireless device; a number of HARQ processes for uplink transmission being smaller than a threshold, wherein the threshold is indicated by the one or more configuration parameters; a number of HARQ processes for downlink transmission being smaller than a first threshold, wherein the first threshold is indicated by the one or more configuration parameters; the one or more configuration parameters indicating a minimum applicable K0 for the wireless device; the one or more configuration parameters indicating a minimum applicable K1 for the wireless device; a time difference between a transmission time of the first uplink signal and a reception time of the first DCI being larger than a second threshold, wherein the one or more configuration parameters indicate the second threshold; a priority index of the first uplink signal and a priority index of the second uplink signal; a priority of a first logical channel of the first uplink signal and a priority of a second logical channel of the second uplink signal; an antenna polarization at the wireless device; or an antenna polarization of an NTN node, wherein the base station and wireless device are communicating with each other via the NTN node.

One or more of the above-example methods, further comprising determining whether the antenna polarization of the wireless device and the antenna polarization of the NTN node matches or not.

One or more of the above-example methods, wherein the time duration is predefined or preconfigured.

One or more of the above-example methods, wherein the one or more configuration parameters indicate the time duration.

One or more of the above-example methods, further comprising determining the time duration based on at least one of: a propagation delay of a cell, wherein the base station is communicating with the wireless device via the cell; or a cell-specific timing offset.

One or more of the above-example methods, wherein the propagation delay of the cell is at least one of: a minimum round propagation delay (RTD) of the cell; a maximum RTD of the cell; or a common RTD of the cell.

One or more of the above-example methods, wherein the time duration is equal to the subtraction of the propagation delay of the cell from the cell-specific timing offset.

One or more of the above-example methods, wherein the time duration is equal to the cell-specific timing offset.

One or more of the above-example methods, wherein the time duration is equal to the propagation delay of the cell.

One or more of the above-example methods, wherein the determining the time duration is further based on a processing time of physical uplink shared channel (PUSCH).

One or more of the above-example methods, wherein the time duration is a maximum of a first value and the processing time of the PUSCH or a summation of the first value and the processing time of the PUSCH, wherein the first value is based on at least one of: the propagation delay of the cell; or the cell-specific timing offset.

One or more of the above-example methods, wherein the time duration is based on a numerology used for the first uplink signal or the second uplink signal.

One or more of the above-example methods, further comprising transmitting, to the wireless device, one or more configuration parameters indicating the time duration via a first downlink message, wherein the first downlink message is at least one of a radio resource control (RRC) signal, a third DCI, or a MAC CE, wherein the third DCI is different than the first DCI or is the first DCI.

One or more of the above-example methods, wherein the time duration is from: when (or a time/symbol/slot that) the wireless device receives the first DCI; or when (or a time/symbol/slot that) the first DCI is transmitted to the wireless device.

One or more of the above-example methods, wherein the first DCI comprises a first field with a first HARQ process number indicating an index of the HARQ process; and the second DCI comprises a second field with the first HARQ process number.

One or more of the above-example methods, wherein the wireless device and the base station are operating in an NTN.

An example method comprising: receiving, by a wireless device, a first downlink control information (DCI) scheduling transmission of a first uplink signal corresponding to a hybrid automatic repeat request (HARQ) process; receiving, after receiving the first DCI, a second DCI scheduling transmission of a second uplink signal corresponding to the HARQ process; transmitting the first uplink signal at a first time, wherein the first time is within or after a time duration, for a non-terrestrial network, from the receiving the first DCI; and transmitting the second uplink signal based on receiving the second DCI after the time duration from receiving the first DCI.

The above example-method, wherein: the first DCI comprises a first field with a first HARQ process number; and the second DCI comprises a second field with the first HARQ process number.

One or more of the above-example methods, wherein the time duration is preconfigured or predefined.

One or more of the above example methods, wherein the time duration is not based on the first time.

One or more of the above-example methods, wherein the first time is not based on the time duration.

One or more of the above-example methods, wherein the time duration is not based on a user-equipment (UE) specific timing advance (TA) of the wireless device.

One or more of the above-example methods, wherein the first time is based on a first scheduling offset indicated by the first DCI, a cell-specific timing offset, and a timing advance (TA) of the wireless device, wherein the cell-specific timing offset is indicated by the one or more NTN configuration parameters.

One or more of the above-example methods, further comprising determining the time duration based on the one or more NTN configuration parameters.

One or more of the above-example methods, wherein the time duration is based on at least one of a propagation delay of a cell, wherein the cell is provided by a base station that the wireless device is communicating with; a cell-specific timing offset; a numerology used for a first UL transmission; or a processing time of physical uplink shared channel (PUSCH).

One or more of the above-example methods, further comprising determining a user-equipment (UE) specific timing advance (TA) of the wireless device not being known at a base station, wherein: the wireless device and the base station are operating in a non-terrestrial network (NTN); and the UE-specific TA is estimated by the wireless device based on the location information of the wireless device and the location information of an NTN node, wherein the wireless device is communicating with the base station via the NTN node.

One or more of the above-example methods, wherein the determining the UE-specific TA of the wireless device not being known at the base station is based on at least one of: a UE-specific timing offset not being provided by the base station; or a configuration for a TA reporting information not being indicated.

One or more of the above-example methods, further comprising determining that the transmitting the first uplink signal is based on a cell-specific timing offset.

One or more of the above-example methods, wherein the transmitting the first uplink signal is after the receiving the second DCI.

One or more of the above-example methods, further comprising determining a reusing condition of the HARQ process being satisfied based on at least one of: a UE-specific timing offset has not been received; whether the first uplink signal and the second uplink signal comprising transmitting a same transport block or not; whether the HARQ process being configured for a blind retransmission of a transport block or not, wherein the transport block is included in the first uplink signal; whether a mode of the HARQ process is a HARQ mode B or not; whether a discontinuous reception (DRX) operation being configured or not; a number of HARQ processes for uplink transmission being smaller than a threshold; a number of HARQ processes for downlink transmission being smaller than a threshold; a minimum applicable K0 being configured; a minimum applicable K1 being configured; a time difference between a transmission time of the first uplink signal and a reception time of the first DCI being larger than a threshold; or whether an antenna polarization at the wireless device matches an antenna polarization of an NTN node, wherein the base station and wireless device are communicating with each other via the NTN node.

One or more of the above-example methods, further comprising: receiving, within the time duration from the receiving the first DCI, a third DCI indicating a third uplink signal corresponding to the HARQ process; and not transmitting the third uplink signal.

One or more of the above-example methods, further comprising determining whether a reusing condition of the HARQ process being satisfied or not.

One or more of the above-example methods, wherein the wireless device and the base station are operating in an NTN.

An example method comprising: receiving, by a wireless device, a first downlink control information (DCI) scheduling a first uplink signal corresponding to a hybrid automatic repeat request (HARQ) process; receiving, within a time duration from the first DCI, a second DCI scheduling a second uplink signal corresponding to the HARQ process; determining a transmission time of the second uplink signal being after the time duration from the first DCI; and transmitting the second uplink signal based on the determining.

The above-example method, further comprising receiving, within the time duration from the receiving the first DCI, a third DCI indicating a third uplink signal corresponding to the HARQ process; and not transmitting the third uplink signal based on a transmission time of the third uplink signal being before the time duration from the first DCI.

One or more of the above-example methods, further comprising transmitting the first uplink signal at a first time, wherein the first time is within or after the time duration from the receiving the first DCI.

One or more of the above-example methods, wherein the first time is not based on the time duration.

One or more of the above-example methods, wherein the time duration is not based on a user-equipment (UE) specific timing advance (TA) of the wireless device.

One or more of the above-example methods, wherein the first time is based on a first scheduling offset indicated by the first DCI, a cell-specific timing offset, and a timing advance (TA) of the wireless device, wherein the cell-specific timing offset is indicated by the one or more NTN configuration parameters.

One or more of the above-example methods, further comprising determining the time duration based on the one or more NTN configuration parameters.

One or more of the above-example methods, wherein the time duration is based on at least one of: a propagation delay of a cell, wherein the cell is provided by a base station that the wireless device is communicating with; a cell-specific timing offset; a numerology used for a first UL transmission; or a processing time of physical uplink shared channel (PUSCH).

One or more of the above-example methods, further comprising determining a user-equipment (UE) specific timing advance (TA) of the wireless device not being known at a base station, wherein: the wireless device and the base station are operating in a non-terrestrial network (NTN); and the UE-specific TA is estimated by the wireless device based on the location information of the wireless device and the location information of an NTN node, wherein the wireless device is communicating with the base station via the NTN node.

One or more of the above-example methods, wherein the determining the UE-specific TA of the wireless device not being known at the base station is based on at least one of: a UE-specific timing offset not being provided by the base station; or a configuration for a TA reporting information not being indicated.

One or more of the above-example methods, further comprising determining that the transmitting the first uplink signal is based on a cell-specific timing offset.

One or more of the above-example methods, wherein the transmitting the first uplink signal is after the receiving the second DCI.

One or more of the above-example methods, further comprising determining a reusing condition of the HARQ process being satisfied.

One or more of the above-example methods, wherein the wireless device and the base station are operating in an NTN.

An example method comprising: receiving, by a wireless device from a base station, a first downlink control information (DCI) scheduling a first uplink signal corresponding to a hybrid automatic repeat request (HARQ) process;

receiving, within a first time duration from receiving the first DCI, a second DCI scheduling a second uplink signal corresponding to the HARQ process; determining a user-equipment (UE) specific timing advance (TA) of the wireless device not being known at the base station; and transmitting the second uplink signal based on the determining.

The above-example method, wherein the first time duration is based on a transmission time of the first uplink signal.

One or more of the above-example methods, wherein the first time duration is preconfigured.

One or more of the above-example methods, wherein the transmitting the second uplink signal is further based on at least one of: a time difference between the second uplink transmission and the first uplink transmission being larger than a first threshold, wherein the time difference is based on a number of symbols of the first UL transmission, processing capability of the wireless device, a DM-RS pattern associated with the first UL transmission; a time difference between the second DCI and the first DCI being larger than a second threshold; or a difference between a first scheduling offset and a second scheduling offset being larger than a third threshold, wherein the first DCI indicates the first scheduling offset and the second DCI indicates the second scheduling offset.

One or more of the above-example methods, wherein the wireless device and the base station are operating in a non-terrestrial network (NTN), and the UE-specific TA is estimated by the wireless device based on the location information of the wireless device and the location information of an NTN node, wherein the wireless device is communicating with the base station via the NTN node.

One or more of the above-example methods, wherein the determining the UE-specific TA of the wireless device not being known at the base station is based on at least one of a UE-specific timing offset not being provided by the base station; or a configuration for a TA reporting information not being indicated.

One or more of the above-example methods, further comprising determining that the transmitting the first uplink signal is based on a cell-specific timing offset.

One or more of the above-example methods, wherein the transmitting the first uplink signal is after the receiving the second DCI.

One or more of the above-example methods, further comprising determining a reusing condition of the HARQ process being satisfied.

One or more of the above-example methods, wherein the wireless device and the base station are operating in an NTN.

An example method comprising: receiving, by a wireless device, a first downlink control information (DCI) scheduling a first uplink signal corresponding to a hybrid automatic repeat request (HARQ) process; receiving, within the first time duration from receiving the first DCI, a second DCI scheduling a second uplink signal corresponding to the HARQ process; determining a processing time of the second uplink signal based on a first offset and a processing time of physical uplink shared channel (PUSCH); and transmitting, based on the determining, the second uplink signal.

The above-example method, further comprising determining a transmission time of the second uplink signal being at least a threshold from the receiving the second DCI, wherein the threshold is based on the processing time of the second uplink signal.

One or more of the above-example methods, wherein the threshold is the determined processing time of the second uplink signal.

One or more of the above-example methods, wherein the determining the processing time of the second uplink signal is based on increasing the processing time of PUSCH by the first offset.

One or more of the above-example methods, wherein the first offset is based on the first time duration.

One or more of the above-example methods, wherein the first offset is based on a time difference between a transmission time of the first uplink signal and receiving the second DCI.

One or more of the above-example methods, wherein the first offset is preconfigured.

One or more of the above-example methods, further comprising receiving, within a first time duration from receiving the first DCI, a fourth DCI scheduling a fourth uplink signal corresponding to the HARQ process; increasing, based on the receiving the fourth DCI, the processing time of the fourth uplink signal by the first offset and the processing time of PUSCH; and determining, based on the increasing the processing time of the fourth uplink signal, whether to transmit the fourth uplink signal or refrain from transmitting the fourth uplink signal.

One or more of the above-example methods, wherein the first DCI comprises a first field with a first HARQ process number and the second DCI comprises a second field with the first HARQ process number.

One or more of the above-example methods, further comprising determining a user-equipment (UE) specific timing advance (TA) of the wireless device not being known at a base station.

One or more of the above-example methods, wherein the determining the UE-specific TA of the wireless device not being known at the base station is based on at least one of: a UE-specific timing offset not being provided by the base station; or a configuration for a TA reporting information not being indicated.

One or more of the above-example methods, further comprising determining that the transmitting the first uplink signal is based on a cell-specific timing offset.

One or more of the above-example methods, wherein the transmitting the first uplink signal is after the receiving the second DCI.

One or more of the above-example methods, further comprising determining a reusing condition of the HARQ process being satisfied.

One or more of the above-example methods, wherein the wireless device and the base station are operating in an NTN.

An example method comprising: receiving, by a wireless device, a first downlink control information (DCI) scheduling a first uplink transmission corresponding to a hybrid automatic repeat request (HARQ) process; receiving, within the first time duration from receiving the first DCI, a second DCI scheduling a second uplink signal corresponding to the HARQ process; deferring/postponing processing of the second uplink signal by a second offset; and determining, based on the deferring the processing the second uplink signal, whether to transmit the second uplink signal or to refraining from transmitting the second uplink signal.

The above-example method, wherein determining to transmit the second uplink signal is based on a transmission time of the second uplink signal being at least a threshold from the receiving the second DCI, wherein the threshold is based on the processing time of the second uplink signal.

One or more of the above-example methods, wherein determining to refraining from transmitting the second uplink signal is based on a transmission time of the second uplink signal being less than a threshold from the receiving the second DCI, wherein the threshold is based on the processing time of the second uplink signal.

One or more of the above-example methods, wherein the second offset is based on the first time duration.

One or more of the above-example methods, wherein the second offset is based on a time difference between a transmission time of the first uplink signal and receiving the second DCI.

One or more of the above-example methods, wherein the second offset is preconfigured.

One or more of the above-example methods, further comprising determining a user-equipment (UE) specific timing advance (TA) of the wireless device not being known at a base station.

One or more of the above-example methods, wherein the determining the UE-specific TA of the wireless device not being known at the base station is based on at least one of: a UE-specific timing offset not being provided by the base station; or a configuration for a TA reporting information not being indicated.

One or more of the above-example methods, further comprising determining that the transmitting the first uplink signal is based on a cell-specific timing offset.

One or more of the above-example methods, wherein the transmitting the first uplink signal is after the receiving the second DCI.

One or more of the above-example methods, further comprising determining a reusing condition of the HARQ process being satisfied.

One or more of the above-example methods, wherein the wireless device and the base station are operating in an NTN.

An example method comprising: receiving, by a wireless device, a first downlink control information (DCI) indicating a first timing offset for a transmission of a first uplink signal corresponding to a HARQ process; receiving, within the first time duration from receiving the first DCI, a second DCI indicating a second timing offset for a transmission of a second uplink signal corresponding to the HARQ process; increasing the second timing offset based on at least: a time difference between the second DCI and the first DCI; or the first timing offset; and determining, based on the increasing the second timing offset, whether to transmit the second uplink signal or to refraining from transmitting the second uplink signal The above-example method, wherein the first DCI comprises a first field with a first HARQ process number and the second DCI comprises a second field with the first HARQ process number.

One or more of the above-example methods, further comprising determining a user-equipment (UE) specific timing advance (TA) of the wireless device not being known at a base station.

One or more of the above-example methods, wherein the determining the UE-specific TA of the wireless device not being known at the base station is based on at least one of: a UE-specific timing offset not being provided by the base station; or a configuration for a TA reporting information not being indicated.

One or more of the above-example methods, further comprising determining that the transmitting the first uplink signal is based on a cell-specific timing offset.

One or more of the above-example methods, wherein the transmitting the first uplink signal is after the receiving the second DCI.

One or more of the above-example methods, further comprising determining a reusing condition of the HARQ process being satisfied.

One or more of the above-example methods, wherein the wireless device and the base station are operating in an NTN.

What is claimed:

1. A wireless device comprising:

one or more processors; and memory storing instructions that, when executed by the one or more processors, cause the wireless device to:

receive one or more configuration parameters indicating:

a first hybrid automatic repeat request (HARQ) process;

a second HARQ process; and

HARQ feedback of the first HARQ process is disabled;

receive a first physical downlink shared channel (PDSCH) carrying a first transport block (TB) corresponding to the first HARQ process;

determine a first PDSCH processing time for the first PDSCH based on:

the HARQ feedback of the first HARQ process being disabled; and processing time parameters, wherein a starting symbol of a first physical uplink control channel (PUCCH) carrying a first HARQ acknowledgment starts no earlier than the first PDSCH processing time from a last symbol of the first PDSCH;

receive a second PDSCH carrying a second TB corresponding to the second HARQ process;

in response to HARQ feedback of the second HARQ process not being disabled, determine a second PDSCH processing time for the second PDSCH based on:

the processing time parameters; and a second parameter indicating a value; and transmit, via a second PUCCH, a second HARQ acknowledgement of the second TB, wherein a starting symbol of the second PUCCH carrying the second HARQ acknowledgment starts no earlier than the second PDSCH processing time from a last symbol of the second PDSCH.

2. The wireless device of claim 1, wherein the instructions further cause the wireless device to:

receive a third PDSCH carrying a third TB corresponding to the first HARQ process; and not transmit, via a third PUCCH, a third HARQ acknowledgement of the third TB, wherein a starting symbol of the third PUCCH carrying the third HARQ acknowledgment starts earlier than the first PDSCH processing time from a last symbol of the third PDSCH.

3. The wireless device of claim 1, wherein the instructions further cause the wireless device to:

receive a fourth PDSCH carrying a fourth TB corresponding to the second HARQ process; and not transmit, via a fourth PUCCH, a fourth HARQ acknowledgement of the fourth TB, wherein a starting symbol of the fourth PUCCH carrying the fourth HARQ acknowledgment starts earlier than the second PDSCH processing time from a last symbol of the fourth PDSCH.

4. The wireless device of claim 1, wherein the one or more configuration parameters indicate the HARQ feedback of the second HARQ process is not disabled.

5. The wireless device of claim 1, wherein the second PDSCH processing time is larger than the first PDSCH processing time.

6. The wireless device of claim 1, wherein the processing time parameters are based on at least one of:

a processing capability of the wireless device;

a downlink numerology, wherein the downlink numerology is a numerology of the PDSCH; and an uplink numerology, wherein the uplink numerology is a numerology of the PUCCH carrying the HARQ acknowledgement.

7. The wireless device of claim 1, wherein the instructions further cause the wireless device to:

transmit, via the first PUCCH, a first HARQ acknowledgement of the first TB.

8. The wireless device of claim 1, wherein the instructions further cause the wireless device to:

not transmit, via the first PUCCH, a first HARQ acknowledgment of the first TB.

9. A non-transitory computer-readable medium comprising instructions that, when executed by one or more processors of a wireless device, cause the wireless device to:

receive one or more configuration parameters indicating:

a first hybrid automatic repeat request (HARQ) process;

a second HARQ process; and

HARQ feedback of the first HARQ process is disabled;

receive a first physical downlink shared channel (PDSCH) carrying a first transport block (TB) corresponding to the first HARQ process;

determine a first PDSCH processing time for the first PDSCH based on:

the HARQ feedback of the first HARQ process being disabled; and processing time parameters, wherein a starting symbol of a first physical uplink control channel (PUCCH) carrying a first HARQ acknowledgment starts no earlier than the first PDSCH processing time from a last symbol of the first PDSCH;

receive a second PDSCH carrying a second TB corresponding to the second HARQ process;

in response to HARQ feedback of the second HARQ process not being disabled, determine a second PDSCH processing time for the second PDSCH based on:

the processing time parameters; and a second parameter indicating a value; and transmit, via a second PUCCH, a second HARQ acknowledgement of the second TB, wherein a starting symbol of the second PUCCH carrying the second HARQ acknowledgment starts no earlier than the second PDSCH processing time from a last symbol of the second PDSCH.

10. The non-transitory computer-readable medium of claim 9, wherein the instructions further cause the wireless device to:

receive a third PDSCH carrying a second-third TB corresponding to the first HARQ process; and not transmit, via a third PUCCH, a third HARQ acknowledgement of the third TB, wherein a starting symbol of the third PUCCH carrying the third HARQ acknowledgment starts earlier than the first PDSCH processing time from a last symbol of the third PDSCH.

11. The non-transitory computer-readable medium of claim 9, wherein the instructions further cause the wireless device to:

receive a fourth PDSCH carrying a fourth TB correspond-
ing to the second HARQ process; and not transmit, via a fourth PUCCH, a fourth HARQ
acknowledgement of the fourth TB, wherein a starting
symbol of the fourth PUCCH carrying the fourth
HARQ acknowledgment starts earlier than the second
PDSCH processing time from a last symbol of the
fourth PDSCH.

12. The non-transitory computer-readable medium of
claim 9, wherein the one or more configuration parameters
indicate the HARQ feedback of the second HARQ process
is not disabled.

13. The non-transitory computer-readable medium of
claim 9, wherein the processing time parameters are based
on at least one of:

a processing capability of the wireless device;

a downlink numerology, wherein the downlink numerol-
ogy is a numerology of the PDSCH; and an uplink numerology, wherein the uplink numerology is
a numerology of the PUCCH carrying the HARQ
acknowledgement.

14. The non-transitory computer-readable medium of
claim 9, wherein the instructions further cause the wireless
device to:

transmit, via the first PUCCH, a first HARQ acknowl-
edgement of the first TB.

15. The non-transitory computer-readable medium of
claim 9, wherein the instructions further cause the wireless
device to:

not transmit, via the first PUCCH, a first HARQ acknowl-
edgment of the first TB.

16. A method comprising:

receiving, by a wireless device, one or more configuration
parameters indicating:

a first hybrid automatic repeat request (HARQ) pro-
cess;

a second HARQ process; and

HARQ feedback of the first HARQ process is disabled;

receiving a first physical downlink shared channel
(PDSCH) carrying a first transport block (TB) corre-
sponding to the first HARQ process;

determining a first PDSCH processing time for the first
PDSCH based on:

the HARQ feedback of the first HARQ process being
disabled; and processing time parameters, wherein a starting symbol
of a first physical uplink control channel (PUCCH)
carrying a first HARQ acknowledgment starts no
earlier than the first PDSCH processing time from a
last symbol of the first PDSCH;

receiving a second PDSCH carrying a second TB corre-
sponding to the second HARQ process;

in response to HARQ feedback of the second HARQ
process not being disabled, determining a second
PDSCH processing time for the second PDSCH based
on:

the processing time parameters; and a second parameter indicating a value; and transmitting, via a second PUCCH, a second HARQ
acknowledgement of the second TB, wherein a starting
symbol of the second PUCCH carrying the second
HARQ acknowledgment starts no earlier than the sec-
ond PDSCH processing time from a last symbol of the
second PDSCH.

17. The method of claim 16, further comprising transmit-
ting, via the first PUCCH, a first HARQ acknowledgment of
the first TB.

18. The method of claim 16, further comprising not
transmitting, via the first PUCCH, a first HARQ acknowl-
edgment of the first TB.

19. The method of claim 16, wherein the second PDSCH
processing time is larger than the first PDSCH processing
time.

20. The method of claim 16, wherein the processing time
parameters are based on at least one of:

a processing capability of the wireless device;

a downlink numerology, wherein the downlink numerol-
ogy is a numerology of the PDSCH; and an uplink numerology, wherein the uplink numerology is
a numerology of the PUCCH carrying the HARQ
acknowledgement.

* * * * *